United States Patent
Wang et al.

(10) Patent No.: US 9,621,401 B1
(45) Date of Patent: Apr. 11, 2017

(54) PERFORMING DYNAMIC DATA ANALYSIS WITHIN A DYNAMIC NETWORK

(71) Applicant: The Boeing Company, Chicago, IL (US)

(72) Inventors: Guijun Wang, Issaquah, WA (US); Changzhou Wang, Bellevue, WA (US); Haiqin Wang, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 509 days.

(21) Appl. No.: 13/962,774

(22) Filed: Aug. 8, 2013

(51) Int. Cl.
  *G06F 15/173* (2006.01)
  *H04L 29/08* (2006.01)

(52) U.S. Cl.
  CPC ............... *H04L 29/08081* (2013.01)

(58) Field of Classification Search
  USPC ............... 709/224, 226, 203, 217, 220
  See application file for complete search history.

(56) References Cited

U.S. PATENT DOCUMENTS 7,936,687 B1 * 5/2011 Parker et al. ................. 370/252
2008/0281982 A1 * 11/2008 Yanagihara et al. .......... 709/242

OTHER PUBLICATIONS

Ren et al., "Information Consensus in Multivehicle Cooperative Control," IEEE Control Systems Magazine, Apr. 2007, pp. 71-82.
Moallemi et al., "Consensus Propagation," IEEE Transactions on Information Theory, vol. 52, No. 11, Nov. 2006, pp. 1-13.
Beard et al., "Information Consensus in Distributed Multiple Vehicle Coordinated Control," 42nd Conference on Decision and Control, Dec. 2003, pp. 2029-2034.
Choi et al., "Consensu-Based Decentralized Auctions for Robust Task Allocation," IEEE Transactions on Robotics, vol. 25 No. 4, Aug. 2009, pp. 1-15.
Chan et al., "Secure Hierarchical In-Network Aggregation in Sensor Networks," 13th ACM Conference on Computer and Communications, Oct. 2006, pp. 1-10.
Pradhan et al., "A Fault Tolerant Approach for Data Aggregation in Wireless Sensor Networks," Proceedings of the International Conference on Advances in Computing, Communications, and Infomatics, Aug. 2012, pp. 382-386.
Larrea et al., "Hierachical and Fault-Tolerant Data Aggregation in Wireless Sensor Networks," 2nd International Symposium, on Wireless Pervasive Computing, Feb. 2007, pp. 531-536.

* cited by examiner

*Primary Examiner* — El Hadji Sall
(74) *Attorney, Agent, or Firm* — Yee & Associates, P.C.

(57) ABSTRACT

A dynamic network and a method for performing data analysis within a dynamic network. A query request generated by a root node in the dynamic network is propagated through other nodes in the dynamic network in a number of request messages. A number of response messages responding to the query request are received at the root node from the other nodes in the dynamic network. Data analysis is performed using data contained in the number of response messages as the number of response messages is received. A request index that keeps count of the number of request messages propagated through the dynamic network is updated using a tracking parameter in each of the number of response messages.

20 Claims, 36 Drawing Sheets

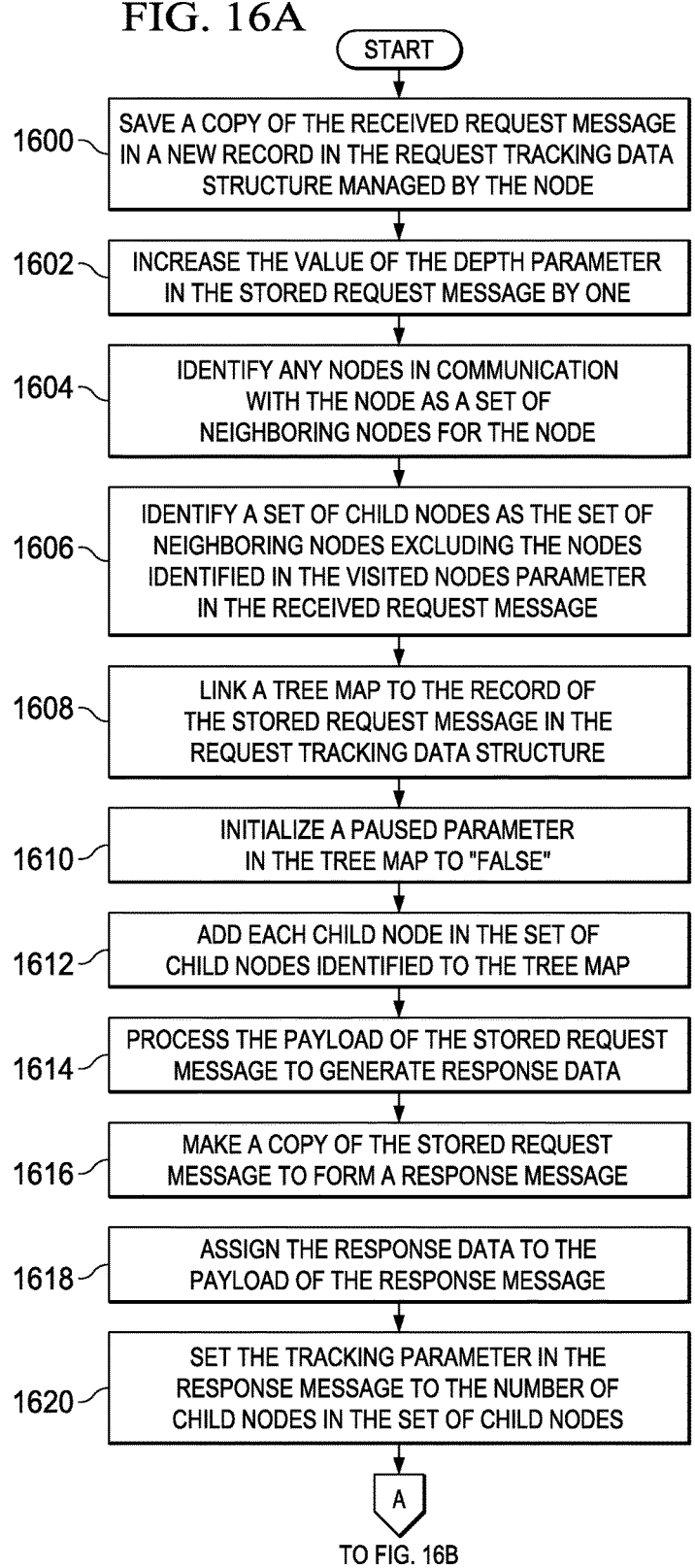

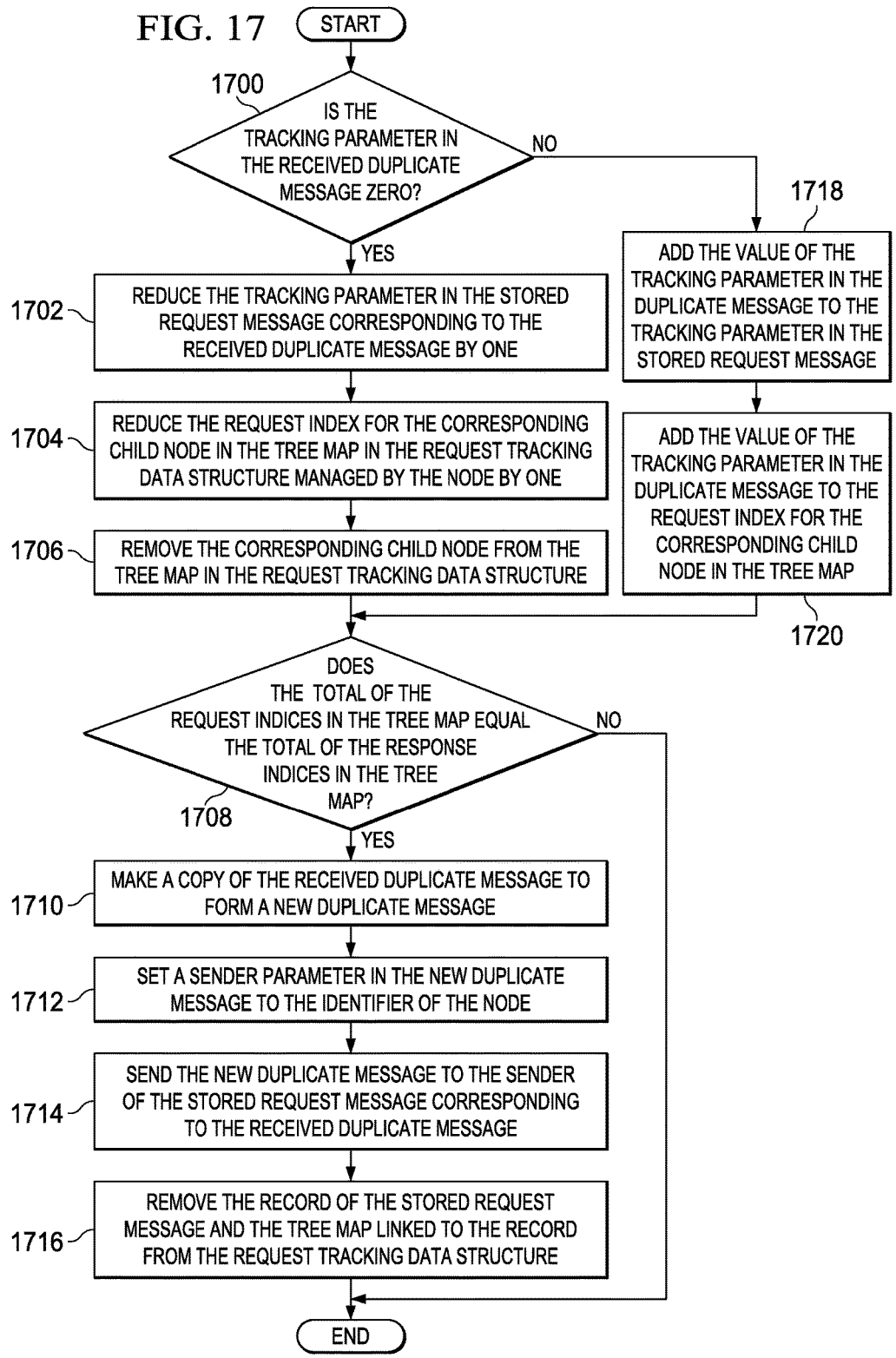

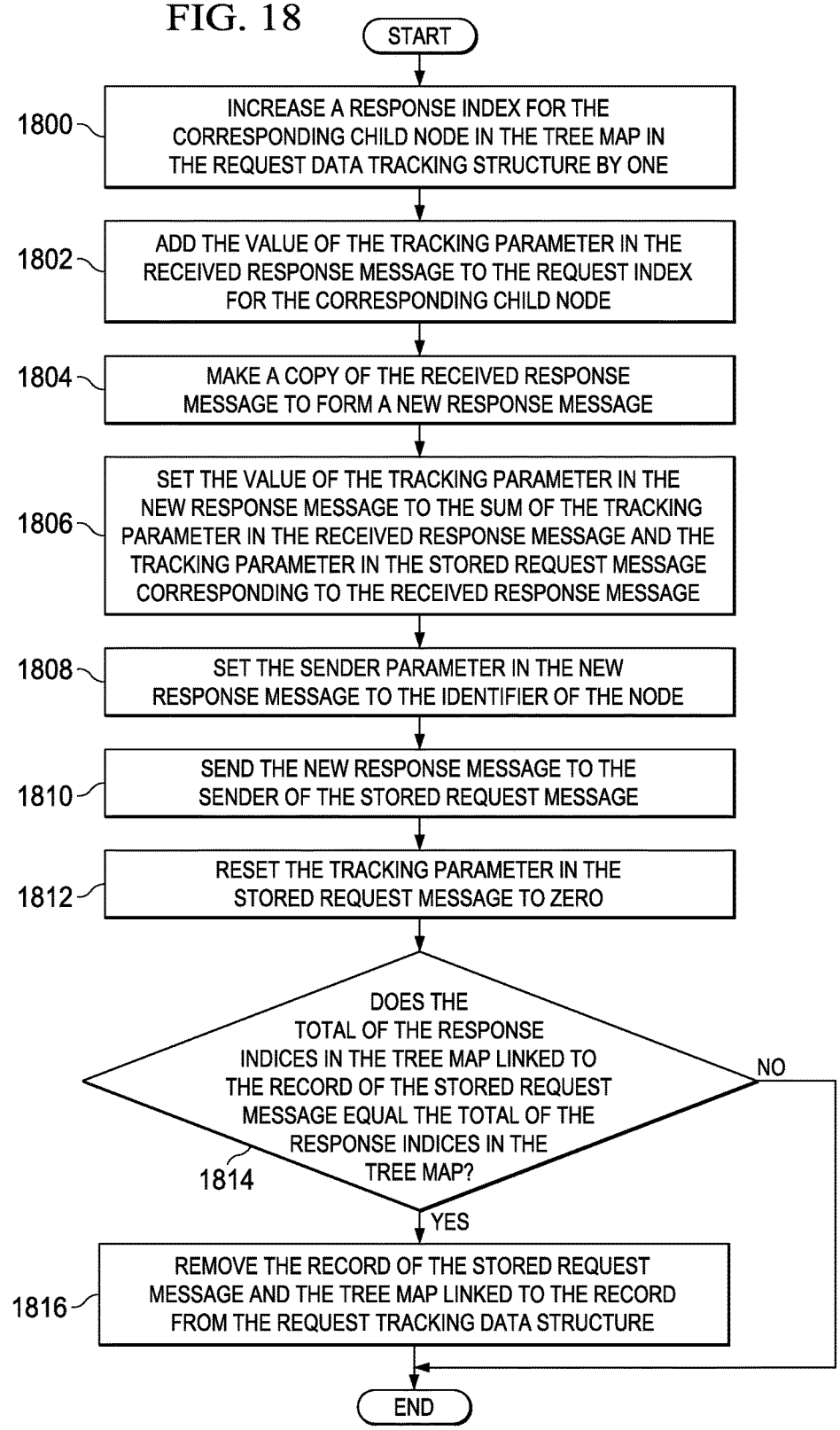

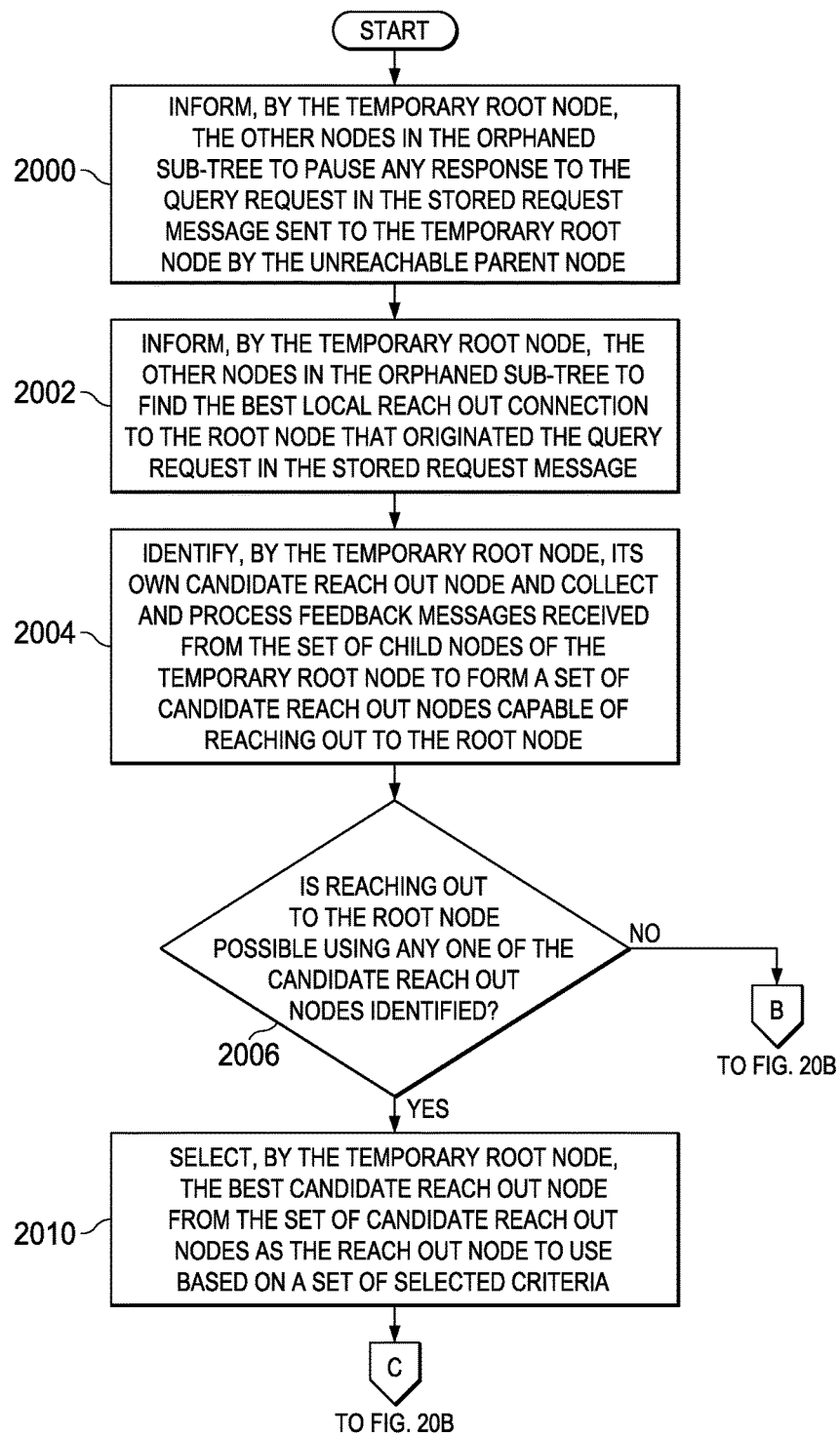

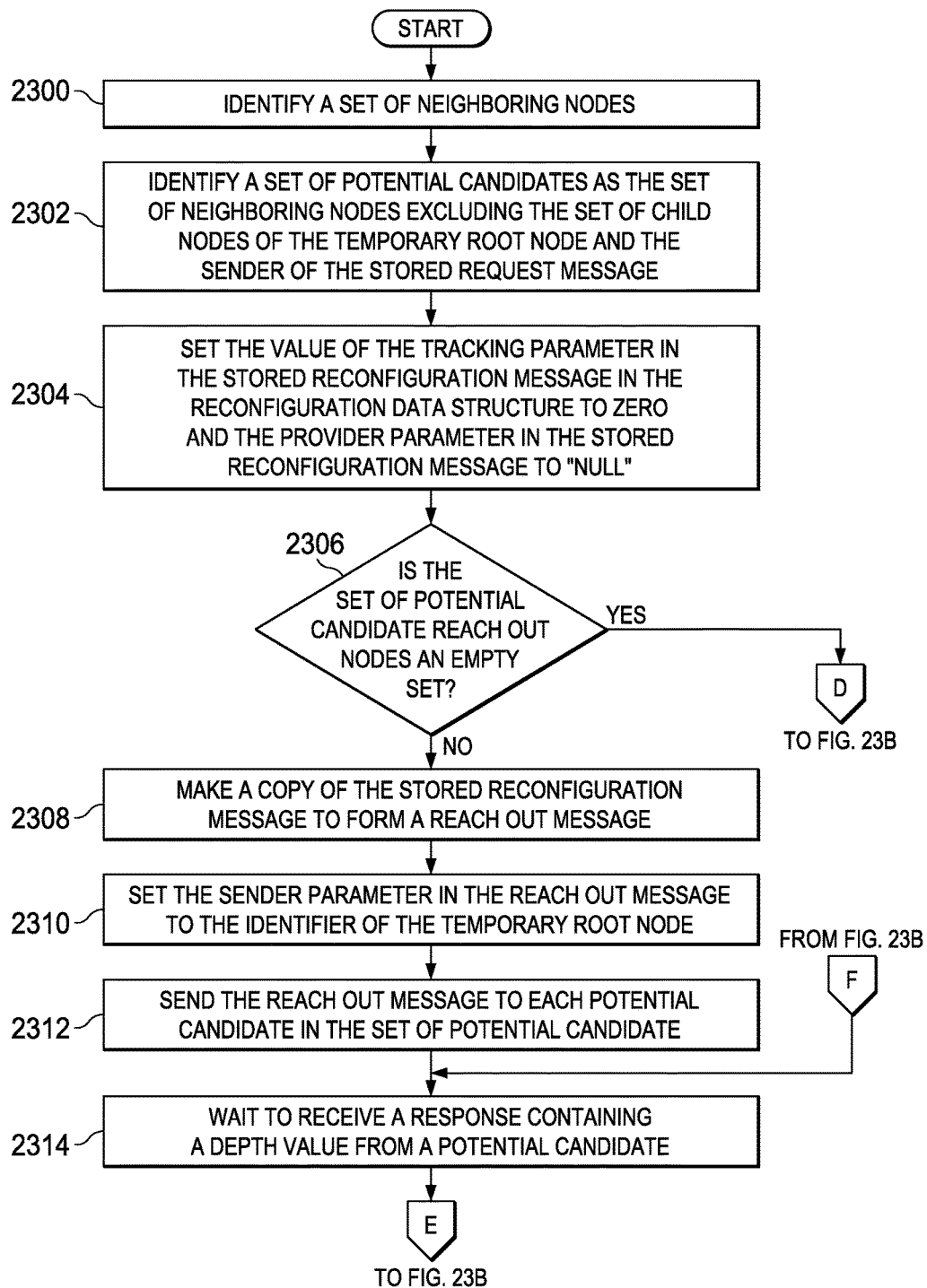

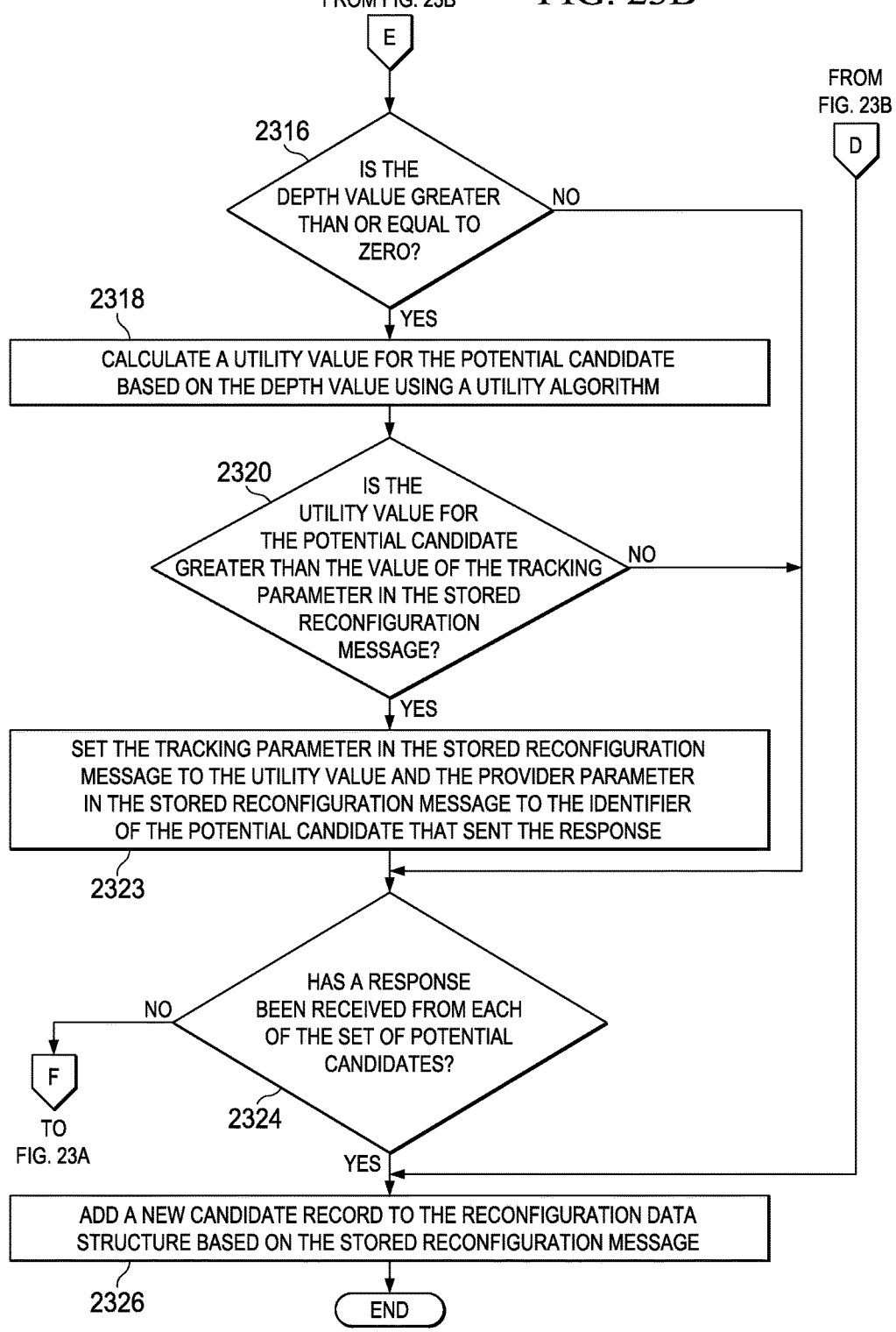

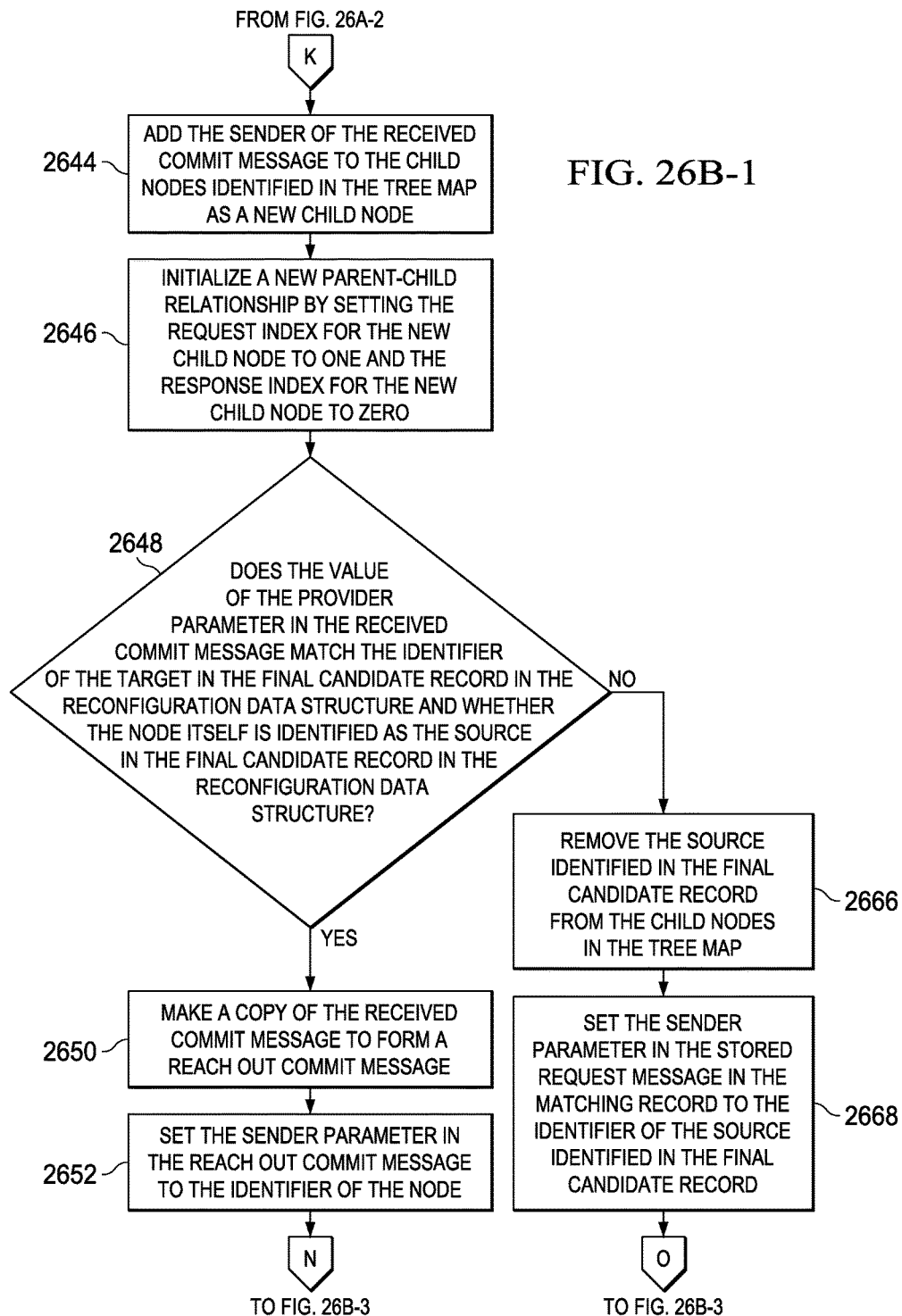

PERFORMING DYNAMIC DATA ANALYSIS WITHIN A DYNAMIC NETWORK

BACKGROUND INFORMATION

1. Field

The present disclosure relates generally to dynamic networks and, in particular, to the interactions of plural nodes on dynamic networks. Still more particularly, the present disclosure relates to a method and apparatus for performing dynamic data analysis on a dynamic network that are capable of handling undesired events that occur within the dynamic network.

2. Background

As used herein, a "network" may be comprised of two or more nodes that may be capable of collecting and storing data, performing computation tasks and communicating with each other using communications links. In a network, one node may be capable of communicating with another node using a direct communications link between the two nodes. However, in some instances, one node may communicate with another node indirectly using neighbor-to-neighbor routing through one or more nodes and communications links.

A node, which may be referred to as a "communications node" in some cases, may take a number of different forms. For example, a node may take the form of a wireless communications device, a sensor device, a computer system, a robotic vehicle, a radio frequency identification tag, a global positioning system unit, a nondestructive inspection system, a cellular phone, a tablet, a switch, a router, or some other type of device capable of communicating with another device. Further, a node may be capable of establishing wireless, wired, optical, and/or other types of communications links.

Typically, a node in a network may be in communication with at least one other node in the network. A dynamic network, as used herein, may be a network in which a number of factors about the network may change over time. These factors may include, for example, without limitation, a size of the network, a number of nodes in the network, and/or other types of factors. Examples of dynamic networks may include, but are not limited to, sensor networks, social networks, cyber-attack botnets, a publisher and subscriber network, a health monitoring system, a cloud server network, a distributed data storage system, and other types of networked systems.

Oftentimes, data analysis may be performed using data compiled from various nodes in a dynamic network. For example, a node in a dynamic network or a node that has just joined the dynamic network may send a query request to other nodes in the network to collect response data from these nodes. The node that sent the query request may combine the data and perform analysis of the data as the response data is received in response to the original query request.

However, performing this type of data analysis within a dynamic network may be more difficult than desired due to a number of unknown factors related to the dynamic network. These unknown factors may include, for example, without limitation, the size of the dynamic network at a given point in time, the number of nodes participating in the dynamic network at a given point in time, the number of nodes unable to participate in responding to a request, the number of concurrent query requests being processed within the dynamic network at a given point in time, and/or other types of factors.

Further, in some situations, undesired events may occur within a dynamic network. For example, a node in a network may become unable to receive and/or respond to query requests. In another example, the communications link between two nodes may become inactive or unusable. These undesired events may affect the manner in which data analysis may be performed within a network. Therefore, it would be desirable to have a method and apparatus that take into account at least some of the issues discussed above, as well as other possible issues.

SUMMARY

In one illustrative embodiment, a dynamic network comprises a plurality of nodes. A root node in the plurality of nodes is configured to generate a query request and propagate the query request through the plurality of nodes in a number of request messages. The root node is configured to receive a number of response messages responding to the query request from other nodes in the dynamic network and to perform data analysis using data contained in the number of response messages. Each response message in the number of response messages includes a tracking parameter that is used to update a request index that keeps count of the number of request messages propagated through the dynamic network.

In another illustrative embodiment, a dynamic network comprises a plurality of nodes. A root node in the plurality of nodes is configured to generate a query request and propagate the query request through the plurality of nodes in a number of request messages in a manner that dynamically forms a spanning tree that is rooted at the root node. The root node is configured to receive a number of response messages responding to the query request from other nodes in the dynamic network and to perform data analysis using data contained in the number of response messages. Each response message in the number of response messages includes a tracking parameter that is used to update a request index that keeps count of the number of request messages propagated through the dynamic network. The root node increments a response index keeping count of the number of response messages received at the root node each time a response message is received at the root node. The data analysis is completed when the request index equals the response index.

In yet another illustrative embodiment, a method for performing data analysis within a dynamic network is provided. A query request generated by a root node in the dynamic network is propagated through other nodes in the dynamic network in a number of request messages. A number of response messages responding to the query request are received at the root node from the other nodes in the dynamic network. Data analysis is performed using data contained in the number of response messages as the number of response messages is received. A request index that keeps count of the number of request messages propagated through the dynamic network is updated using a tracking parameter in each of the number of response messages.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 16A and 16B are an illustration of a response process in the form of a flowchart in accordance with an illustrative embodiment;

FIG. 17 is an illustration of a duplicate handling process in the form of a flowchart in accordance with an illustrative embodiment;

FIG. 18 is an illustration of a response propagation process in the form of a flowchart in accordance with an illustrative embodiment;

FIGS. 20A and 20B are an illustration of a rerouting process for handling an unreachable parent node in the form of a flowchart in accordance with an illustrative embodiment;

FIGS. 23A and 23B are an illustration of a process for the temporary root node to identify its own candidate reach out node in the form of a flowchart in accordance with an illustrative embodiment;

FIGS. 26A-1, 26A-2, 26A-3, 26B-1, and 26B-2 are an illustration of a process for receiving and responding to messages involved in the rerouting process in the form of a flowchart in accordance with an illustrative embodiment;

DETAILED DESCRIPTION

The illustrative embodiments recognize and take into account different considerations. For example, the illustrative embodiments recognize and take into account that it may be desirable to have a method for performing data analysis within a dynamic network. In particular, it may be desirable to have a method for performing data analysis that is able to take into account the factors of uncertainty and undesired events associated with a dynamic network.

Thus, the illustrative embodiments provide a method and apparatus for performing data analysis within a dynamic network. In one illustrative example, a method for performing data analysis within a dynamic network is provided. A query request generated by a root node in the dynamic network is propagated through other nodes in the dynamic network in a number of request messages. A number of response messages responding to the query request are received at the root node from the other nodes in the dynamic network. Data analysis is performed using data contained in the number of response messages as the number of response messages is received. A request index that keeps count of the number of request messages propagated through the dynamic network is updated using a tracking parameter in each of the number of response messages.

The completion of the data analysis may be precisely determined based on a dynamic accounting algorithm. In this manner, data analysis may be performed without interruption and without having to restart. Further, the illustrative embodiments may provide a method and apparatus for detecting undesired events that may occur within the dynamic network and for handling these undesired events without having to restart the entire data analysis process.

Figure 1:
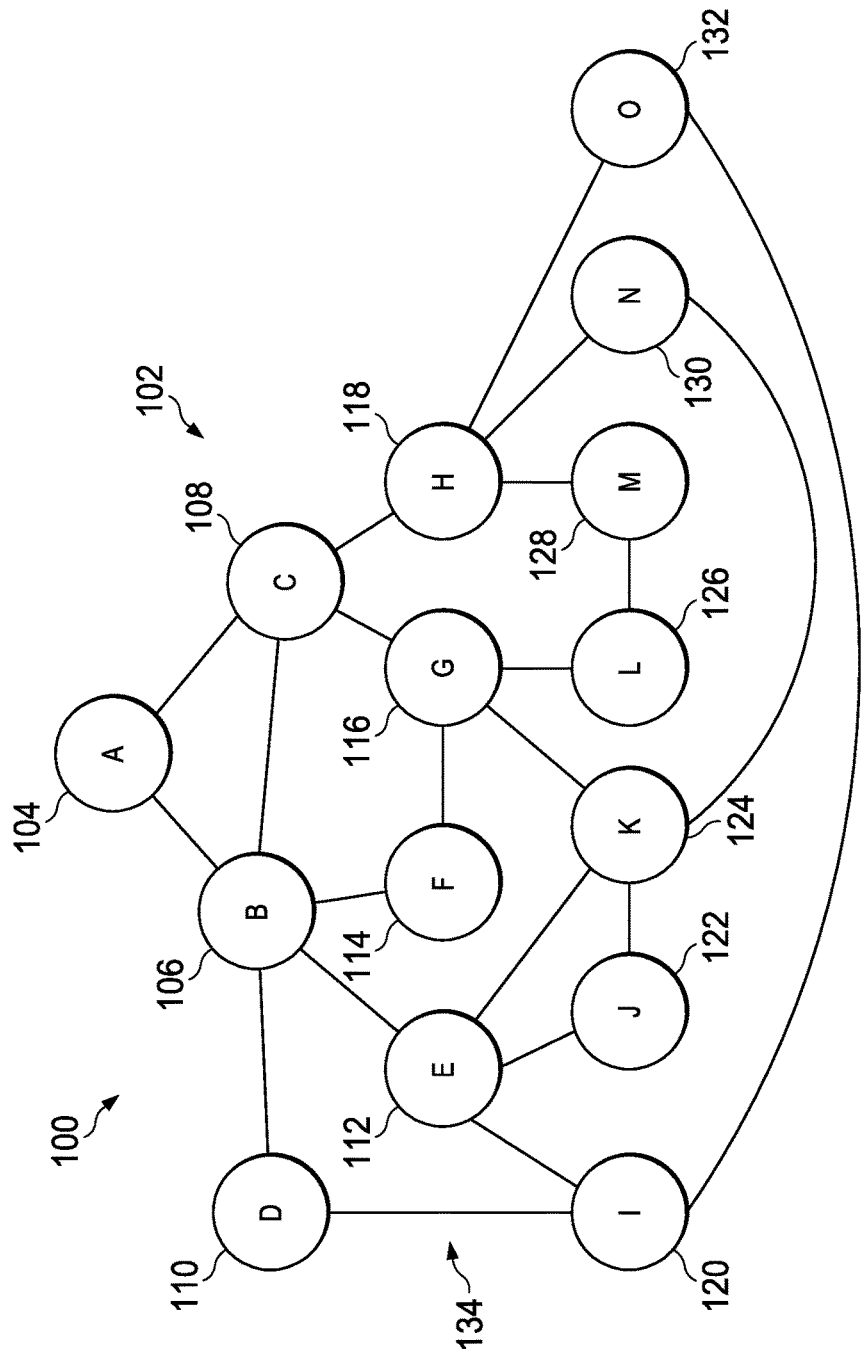
FIG. 1 is an illustration of a dynamic network in accordance with an illustrative embodiment.

Referring now to the figures and, in particular, with reference to FIG. 1, an illustration of a dynamic network is depicted in accordance with an illustrative embodiment. In this illustrative example, dynamic network 100 may include plurality of nodes 102. In this illustrative example, plurality of nodes 102 includes node A 104, node B 106, node C 108, node D 110, node E 112, node F 114, node G 116, node H 118, node I 120, node J 122, node K 124, node L 126, node M 128, node N 130, and node O 132.

Further, communications links 134 may be present between the nodes in plurality of nodes 102. As depicted, a node in plurality of nodes 102 may be configured to communicate with one or more other nodes in plurality of nodes 102, but not necessarily all of the other nodes in plurality of nodes 102.

Dynamic network 100 may be dynamic in that a node may join plurality of nodes 102, leave plurality of nodes 102, or disconnect from dynamic network 100 at any time. In this manner, the size of dynamic network 100 may change over time. The size of dynamic network 100 at any given point in time may be the number of nodes in plurality of nodes 102 at that point in time.

Any node in plurality of nodes 102 may generate a request, such as, for example, a query request, and propagate that request through dynamic network 100. The node may collect responses to this request from the other nodes in dynamic network 100 and perform data analysis based on these responses as the responses are received. At any given point in time, any number of data analysis processes for any number of requests may be running concurrently within dynamic network. For example, multiple query requests may be generated by multiple root nodes and propagated through dynamic network 100.

Figure 2:
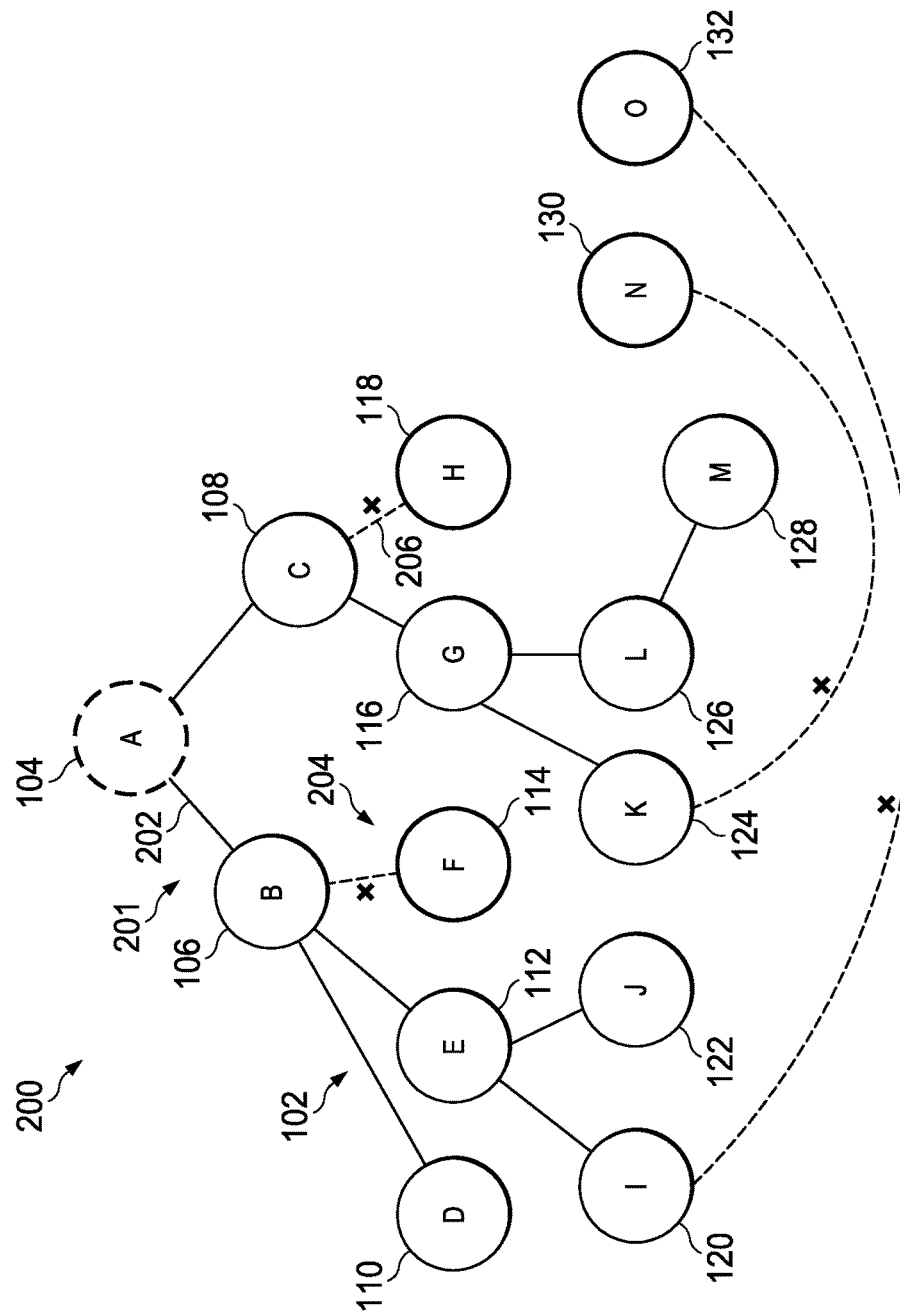
FIG. 2 is an illustration of a spanning tree in accordance with an illustrative embodiment.

With reference now to FIG. 2, an illustration of a spanning tree is depicted in accordance with an illustrative embodiment. In this illustrative example, spanning tree 200 may be used to represent the tree-like manner in which a request may be propagated through dynamic network 100 from FIG. 1.

As depicted, spanning tree 200 may include at least a portion of plurality of nodes 102 from FIG. 1. In this illustrative example, spanning tree 200 includes all of plurality of nodes 102. Node A 104 may be the node that generates a query request that is then propagated through plurality of nodes 102 in the form of a set of request messages. Node A 104 may be referred to as the root node.

In this illustrative example, a parent node is a node that sends a request message to another node over a direct communications link. This other node may be the child node of the parent node. If the child node then sends that request message to a third node, the child node may become a parent of the third node. Further, the third node may be an indirect child node of the first parent node.

Participating links 201 in spanning tree 200 indicate the links between parent nodes and child nodes in spanning tree 200 in which each child node has agreed to participate in responding to a request message sent from the parent node. For example, participating link 202 indicates that a request message was sent from node A 104 to node B 106 and that node B 106 agreed to participate in responding to this request message.

In this illustrative example, nonparticipating links 204 in spanning tree 200 indicate the links between parent nodes and child nodes in which each child node declined to participate in responding to a request message sent from the parent node. For example, nonparticipating link 206 indicates that a request message was sent from node C 108 to node H 118 but that node H 118 declined to participate in responding to the request message.

Figure 3:
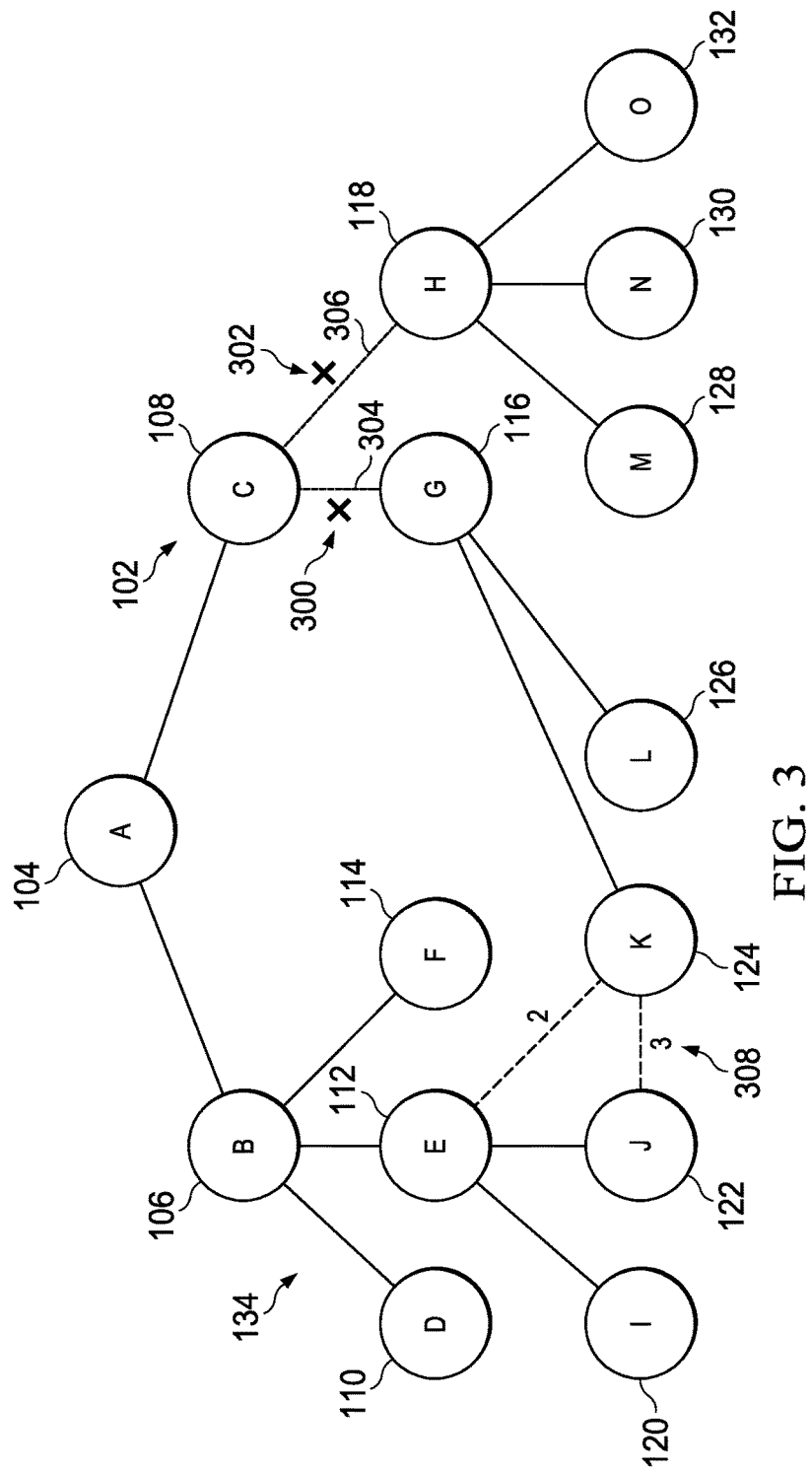
FIG. 3 is an illustration of undesired events that occurred within a dynamic network in accordance with an illustrative embodiment.

With reference now to FIG. 3, an illustration of undesired events that occurred within dynamic network 100 from FIG. 1 is depicted in accordance with an illustrative embodiment. In this illustrative example, indicator 300 and indicator 302 identify the occurrence of undesired events. These undesired events may be, for example, loss of communications.

Indicator 300 identifies that communication between node C 108 and node G 116 has been lost due to an issue with communications link 304. Indicator 302 indicates that communication between node C 108 and node H 118 has been lost due to an issue with communications link 306. In response to a detection of these undesired events, dynamic network 100 may be configured to reconfigure itself and identify new routes for sending request messages and/or receiving response messages.

For example, without communication between node C 108 and node G 116, an orphaned sub-tree may be formed of node G 116, node K 124, and node L 126. Further, without communication between node C 108 and node H 118, an orphaned sub-tree may be formed of node H 118, node M 128, node N 130, and node O 132. In one illustrative example, node E 112 and node J 122 may be identified as candidate reach out nodes that node G 116 may use to receive request messages and/or send response messages back up to node A 104 indirectly through node K 124.

The illustrative embodiments provide a method for managing the data analysis performed within a dynamic network, such as dynamic network 100 in FIG. 1, based on a particular request, while concurrently managing the changing size of the dynamic network. Further, the illustrative embodiments provide a method for managing the occurrence of any undesired events within the dynamic network while the data analysis is being performed.

Figure 4:
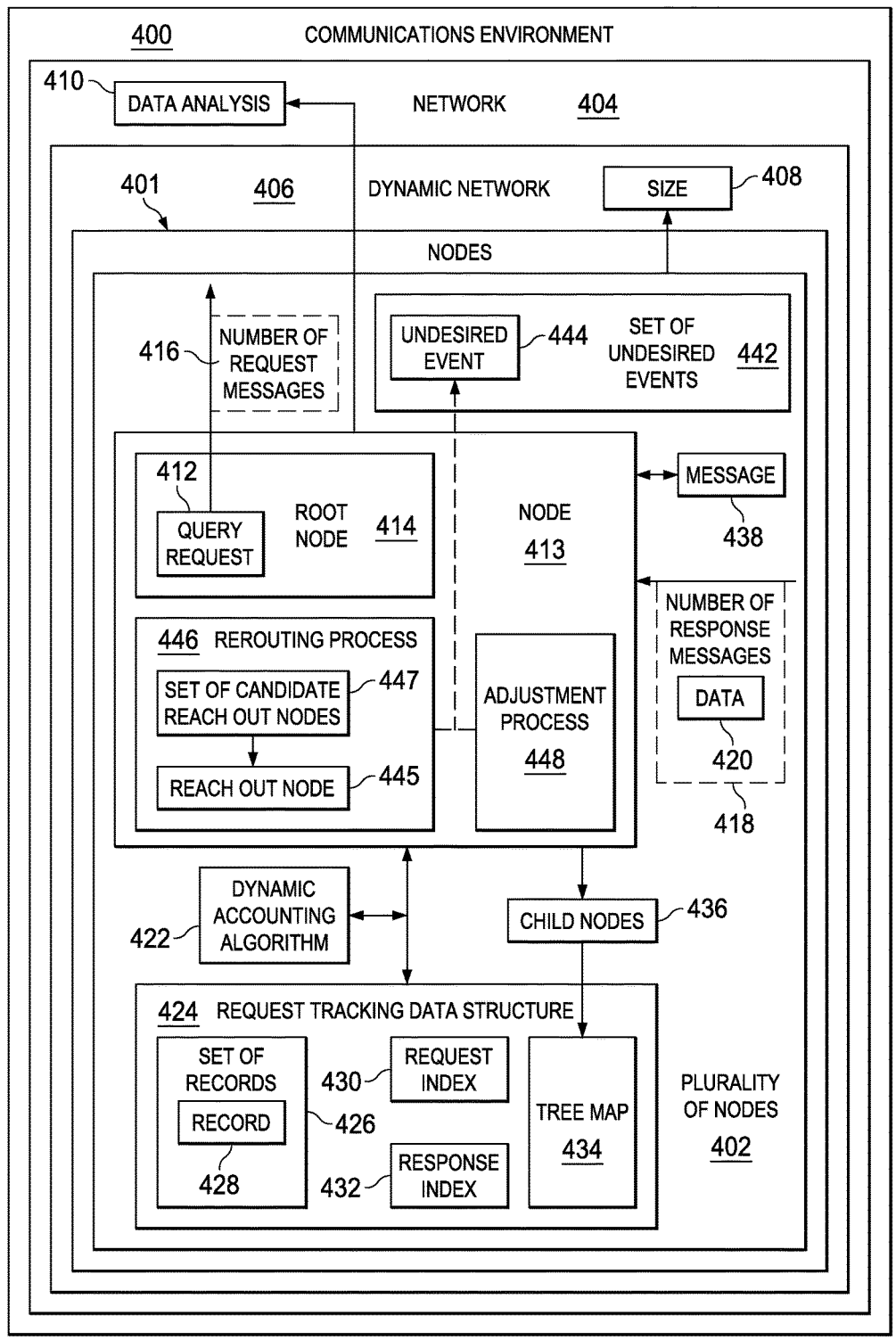
FIG. 4 is an illustration of a communications environment in the form of a block diagram in accordance with an illustrative embodiment.

Turning now to FIG. 4, an illustration of a communications environment is depicted in the form of a block diagram in accordance with an illustrative embodiment. In this illustrative example, communications environment 400 may be an environment in which nodes 401 may communicate with each other.

As used herein, a "node," such as a node in nodes 401, may be any type of device configured to communicate with at least one other device. In particular, a node may be any device configured to establish at least one communications link with at least one other device. The communications link may take the form of a wireless communications link, a wired communications link, an optical communications link, or some other type of communications link.

A node may take a number of different forms. A node may take the form of a wireless communications device, a sensor device, a computer system, a robotic vehicle, a radio frequency identification tag, a global positioning system unit, a nondestructive inspection system, a cellular phone, a tablet, a switch, a router, or some other type of device capable of communicating with another device.

Nodes 401 may form any number of networked systems within communications environment 400. As depicted, plurality of nodes 402 in nodes 401 may form network 404. A node may only be considered part of plurality of nodes 402, and thus network 404, when the node is capable of communicating with at least one other node in plurality of nodes 402. A node may join plurality of nodes 402, leave plurality of nodes 402, or disconnect from network 404 at any time.

In this manner, network 404 may take the form of dynamic network 406. In other words, size 408 of network 404 may change over time. As used herein, size 408 of network 404 may be the number of nodes in plurality of nodes 402. Dynamic network 100 and plurality of nodes 102 in FIG. 1 may be an example of one implementation for dynamic network 406 and plurality of nodes 402, respectively.

Any node in plurality of nodes 402 may be configured to perform data analysis 410 within network 404. Performing data analysis 410 within network 404 may mean performing analysis of data received from at least one other node in plurality of nodes 402 in network 404.

Node 413 may be an example of one of plurality of nodes 402. In one example, node 413 may generate query request 412. Query request 412 may be a request to collect data from other nodes in plurality of nodes 402. For example, query request 412 may be a request for a querying action and may indicate parameters, such as, for example, without limitation, temperature and location, for the querying action.

When node 413 generates query request 412, node 413 may be referred to as root node 414. In other illustrative examples, root node 414 may be referred to as an originator node or a query request originator.

Query request 412 may be propagated throughout dynamic network 406 in the form of number of request messages 416. As used herein, a "number of" items may be one or more items. In this manner, number of request messages 416 may include one or more request messages. Number of request messages 416 may be propagated through dynamic network 406 in a manner that forms a dynamically formed spanning tree that is rooted at root node 414.

Each request message in number of request messages 416 may contain query request 412 or some form of query request 412 within the payload of the request message. Number of request messages 416 may be propagated through dynamic network 406 in a manner that resembles a spanning tree.

Number of response messages 418 may be generated by the nodes in plurality of nodes 402 in response to the propagation of number of request messages 416. Each of number of response messages 418 may contain response data generated by the sender of the response message based on query request 412. Number of response messages 418 may be returned upwards back to root node 414. Root node 414 uses the response data in the response messages received at root node 414 to perform data analysis 410.

In particular, root node 414 may aggregate data 420 received in number of response messages 418 and perform data analysis 410 using data 420. Data analysis 410 may be performed as data 420 in number of response messages 418 is received. In this manner, data analysis 410 may be referred to as dynamic data analysis.

During the propagation of number of request messages 416 down throughout dynamic network 406 and the returning of number of response messages 418 back up to root node 414, root node 414 may be configured to keep track of number of request messages 416 and number of response messages 418. Root node 414 may keep track of number of request messages 416 and number of response messages 418 to determine when data analysis 410 is complete.

Data analysis 410 may be considered complete when a response message has been received at root node 414 for every request message sent out by root node 414. However, keeping track of request messages and response messages may be made more complex because the total number of request messages that will be sent out and the total number of response messages that will be received are unknown to root node 414 at the time that query request 412 is generated.

Each node in plurality of nodes 402 may use dynamic accounting algorithm 422 to keep track of messages that are sent from and received at the node. For example, node 413 may use dynamic accounting algorithm 422 with request tracking data structure 424 to track request messages that are received at node 413, the number of request messages propagated down from node 413, and the number of response messages received back at node 413.

For example, request tracking data structure 424 may include set of records 426. As used herein, a "set of" items may be zero or more items. In this manner, a set of items may be an empty or null set or a set containing one item, two items, three items, five items, or some other number of items.

Each record in set of records 426 may be linked to a request index and a response index in request tracking data structure 424. For example, record 428 in set of records 426 may be linked to request index 430 and response index 432. Request index 430 may be a variable that keeps count of how many request messages have been sent from node 413 for query request 412, while response index 432 may be a variable that keeps count of how many response messages have been received at node 413 for query request 412.

In some cases, each record in set of records 426 may be linked to a tree map. For example, record 428 may be linked to tree map 434. Tree map 434 may include a listing of set of child nodes 436 of node 413. Set of child nodes 436 may include any child node to which node 413 may send a request message. When request tracking data structure 424 includes a tree map linked to each of set of records 426, each child node in the tree map may be linked to a request index and a response index. The request index keeps count of how many request messages are sent to that child node and the response index keeps count of how many response messages are received back from that child node.

Message 438 may be an example of a message that may be sent from or received at node 413. Dynamic accounting algorithm 422 may use the metadata in message 438 to track the request messages sent from node 413 and response messages received at node 413. A more detailed description of message 438 is provided in FIG. 5 below.

When node 413 takes the form of root node 414, root node 414 sends a request message containing query request 412 to each child node in set of child nodes 436 of root node 414. For each child node in set of child nodes 436 that receives a request message, the child node decides whether it wants to participate in responding to query request 412.

If the child node does not want to participate, the child node informs the sender of the request message as such. However, if the child node does want to participate, the child node generates response data and sends that response data back to the sender of the request message in a response message. Further, the child node, which may be considered the current node, then processes the request message and propagates the request message along a dynamically formed spanning tree.

In particular, if the current node is a leaf node, meaning the current node has no child nodes, then the current node completes processing of the request message. However, if the current node has one or more child nodes, the current node then sends a copy of the request message to each of these child nodes.

Concurrently, the current node provides updates and returns response messages received from its one or more child nodes back up to root node 414. Further, the current node uses a dynamic accounting algorithm and request tracking data structure to keep track of request messages sent from and response messages received at the current node.

Root node 414 aggregates the response data received in the various response messages as the response messages are received at root node 414. Root node 414 performs data analysis 410 using this aggregated response data.

In some cases, set of undesired events 442 may occur within dynamic network 406. An undesired event in set of undesired events 442 may be, for example, without limitation, an event that may be detected at a node as occurring at the node or at a communications link between the node and another node. The event may hinder or prevent communications between the node and at least one other node.

A particular node in plurality of nodes 402, such as node 413, may be configured to determine whether an undesired event has occurred at the node that sent a request to node 413 or at a node to which node 413 has sent a request or from which node 413 is expecting a response. For example, node 413 may determine whether undesired event 444 has occurred.

Node 413 may then determine whether undesired event 444 has occurred in association with a parent node of node 413 or a child node of node 413. When undesired event 444 has occurred at the parent node, node 413 initiates rerouting process 446.

Rerouting process 446 may be configured to find and identify a node in plurality of nodes 402 that node 413 can communicate with, directly or indirectly, and that can send responses to root node 414 on behalf of node 413. This other node may be referred to as reach out node 445. Reach out node 445 may be identified by evaluating set of candidate reach out nodes 447 in plurality of nodes 402.

Reach out node 445 may be selected as the node in set of candidate reach out nodes 447 that can send responses to root node 414 the most quickly and efficiently. In particular, reach out node 445 may be the node in set of candidate reach out nodes 447 that has the shortest path to root node 414.

When undesired event 444 has occurred at a child node of node 413, node 413 initiates adjustment process 448. Adjustment process 448 may be used to adjust the number of responses expected at node 413. For example, when node 413 loses communication with a child node, adjustment process 448 may be used to reduce the total number of responses expected at node 413 by one. In particular, adjustment process 448 adjusts the request index for that child node such that a response message from the child node is longer expected. Furthermore, node 413 may also use adjustment process 448 to remove the child node from the list of nodes to which request messages were sent.

In this manner, data analysis 410 performed at root node 414 may be capable of accounting for a number of factors that may result in dynamic changes within dynamic network 406. Furthermore, data analysis 410 may be performed within dynamic network 406 in a manner that takes into account the possibility of set of undesired events 442 occurring. When an undesired event is detected by a receiving node, an automated rerouting process and/or adjustment process may be used to keep data analysis 410 going such that the process may not need to be terminated and restarted.

Figure 5:
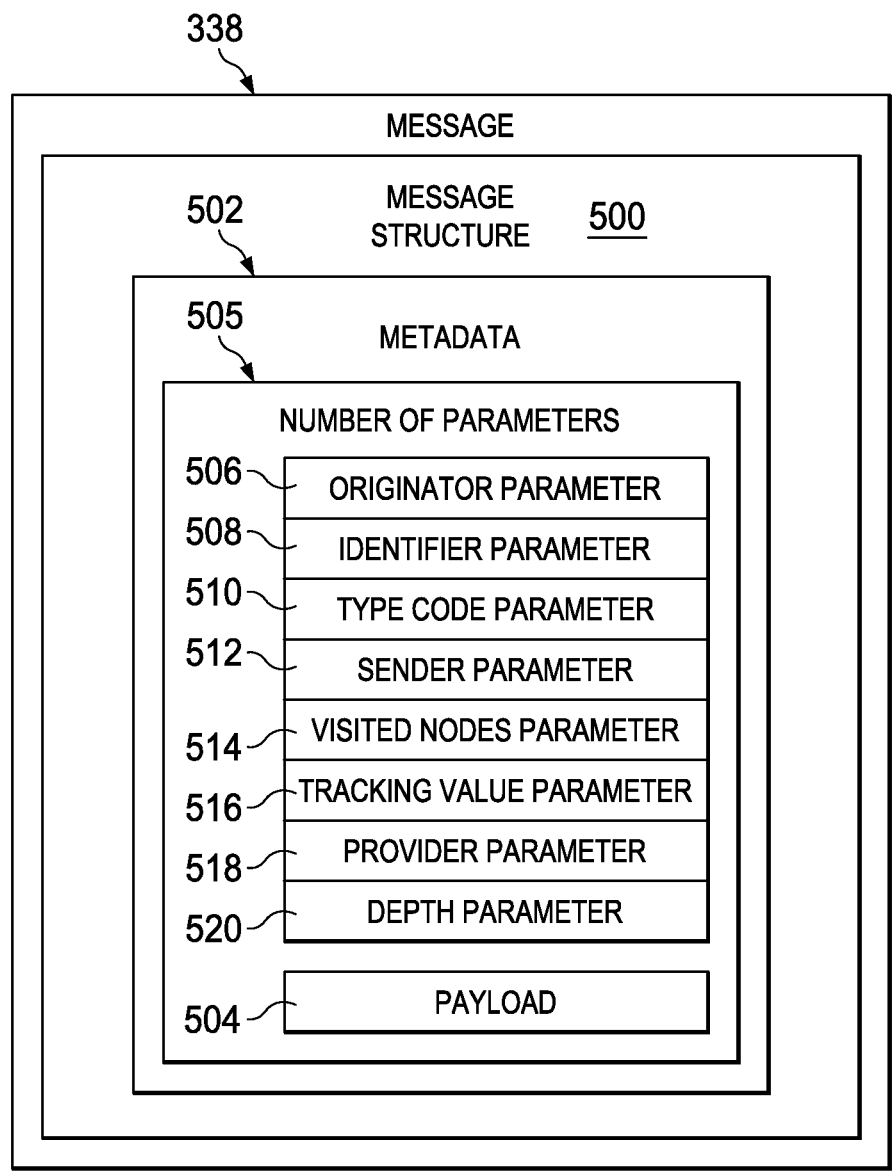
FIG. 5 is an illustration of a message and a message structure in the form of a block diagram in accordance with an illustrative embodiment.

With reference now to FIG. 5, an illustration of a message and a message structure is depicted in the form of a block diagram in accordance with an illustrative embodiment. In this illustrative example, message 438 has message structure 500.

As depicted, message structure 500 may include metadata 502 and payload 504. Metadata 502 may include number of parameters 505. Number of parameters 505 may include, for example, without limitation, originator parameter 506, identifier parameter 508, type code parameter 510, sender parameter 512, visited nodes parameter 514, tracking parameter 516, provider parameter 518, depth parameter 520, and/or other types of parameters, depending on the implementation.

In this illustrative example, originator parameter 506 identifies the node from which a query request is originated. In other words, originator parameter 506 may identify the root node for all of the request messages associated with a query request, such as query request 412. Identifier parameter 508 identifies the identifier assigned to the request message sent from a root node, and thereby, query request 412 in particular. Together, originator parameter 506 and identifier parameter 508 uniquely identify query request 412 that is being propagated through dynamic network 406 in FIG. 4.

Type code parameter 510 is a value that indicates the type of message 438. Type code parameter 510 may be set to a value that indicates that message 438 is one of, for example, without limitation, a request message, a response message, a duplicate message, a pause message, a reconfiguration message, a reconfiguration result message, a commit message, a reach out message, a reach out commit message, a reset message, a cancel message, or some other type of message.

As used herein, creating a message of a particular type may mean creating a message having a type code parameter that defines that type of message. For example, creating message 438 in the form of a duplicate message means creating message 438 with type code parameter 510 set to "duplicate." Similarly, creating message 438 in the form of a response message means creating message 438 with type code parameter 510 set to "response."

Sender parameter 512 identifies the identifier of the node that directly sends or forwards message 438. Visited nodes parameter 514 identifies the set of nodes to which message 438 has passed. Tracking parameter 516 is an integer value that tracks request messages and is used by dynamic accounting algorithm 422 in FIG. 4.

Provider parameter 518 identifies the child node that provided a response to the current node. Depth parameter 520 may be a value identifying the depth of the sender of message 438 relative to the root node within dynamic network 406. In other words, depth parameter 520 may identify the number of nodes through which communications may be passed in order for the sender of message 438 to communicate with root node 414.

Payload 504 may include detailed information about message 438. When message 438 takes the form of a request message, payload 504 may identify an action and one or more parameters for the action. For example, payload 504 may include query request 412 in FIG. 4. When message 438 takes the form of a response message, payload 504 may include data that has been collected in response to an action that was requested. In other words, payload 504 may include response data.

In some situations, payload 504 may be encrypted. In this manner, payload 504 may be protected such that only authorized recipients, such as the root node and/or the sender of message 438 may be able to access and/or process payload 504.

Figure 6:
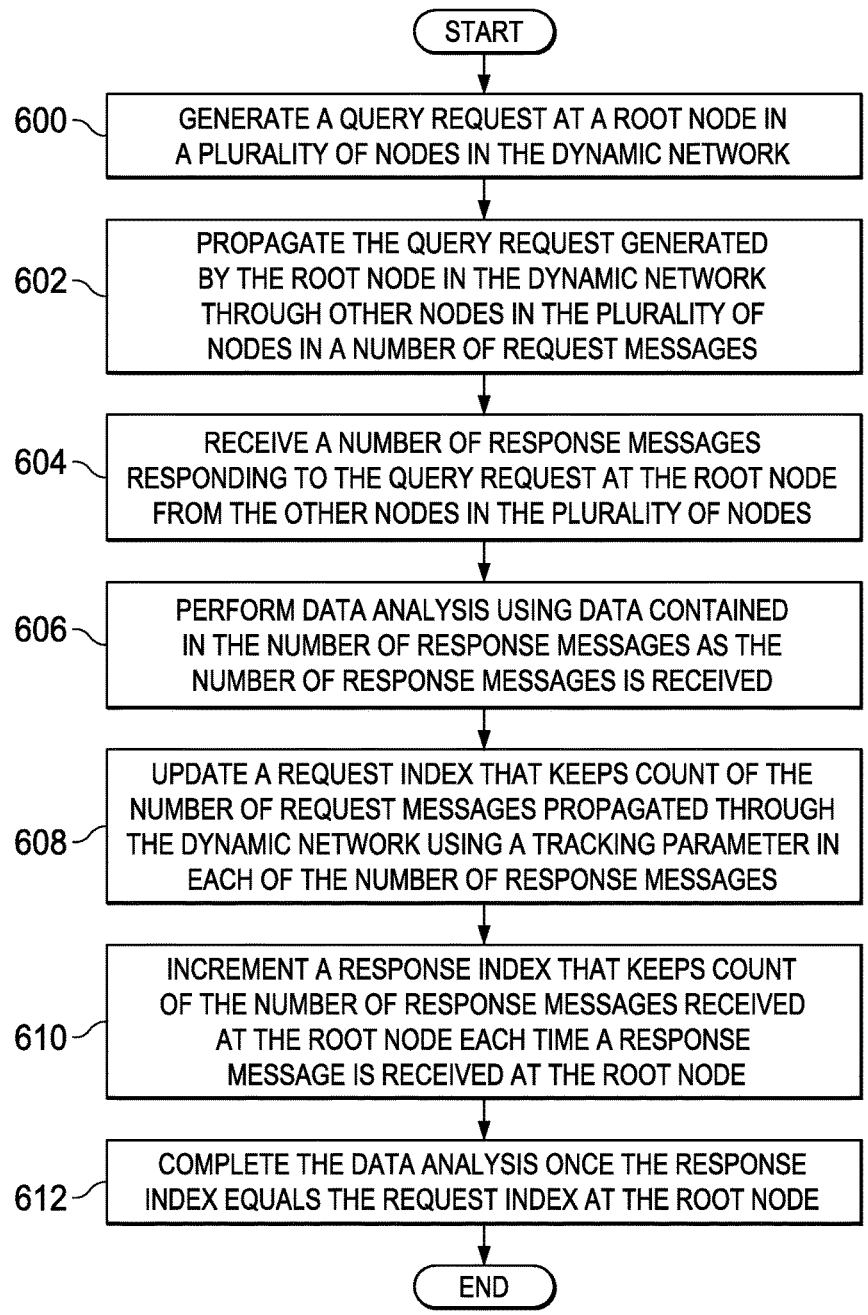
FIG. 6 is an illustration of a process for performing data analysis in a dynamic network in the form of a flowchart in accordance with an illustrative embodiment.

The illustrations of communications environment 400 and dynamic network 406 in FIG. 4 and message 438 in FIG. 5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment With reference now to FIG. 6, an illustration of a process for performing data analysis in a dynamic network is depicted in the form of a flowchart in accordance with an illustrative embodiment. The process illustrated in FIG. 6 may be implemented within dynamic network 406 in FIG. 4.

The process may begin by generating a query request at a root node in a plurality of nodes in the dynamic network (operation 600). The query request generated by the root node in the dynamic network may be propagated through other nodes in the plurality of nodes in a number of request messages (operation 602). Next, a number of response messages may be received in response to the set of requests at the root node (operation 604).

Data analysis is performed using data contained in the number of response messages as the number of response messages is received (operation 606). A request index that keeps count of the number of request messages propagated through the dynamic network is updated using a tracking parameter in each of the number of response messages (operation 608).

Further, a response index that keeps count of the number of response messages received at the root node is incremented each time a response message is received at the root node (operation 610). The data analysis is completed once the response index equals the request index at the root node (operation 612), with the process terminating thereafter.

With reference now to FIGS. 7-12, illustrations of the processes used in a dynamic network for performing data analysis are depicted in the form of flowcharts in accordance with an illustrative embodiment. These processes may describe a method for performing data analysis within a dynamic network without taking into consideration the potential occurrence of undesired events.

Figure 7:
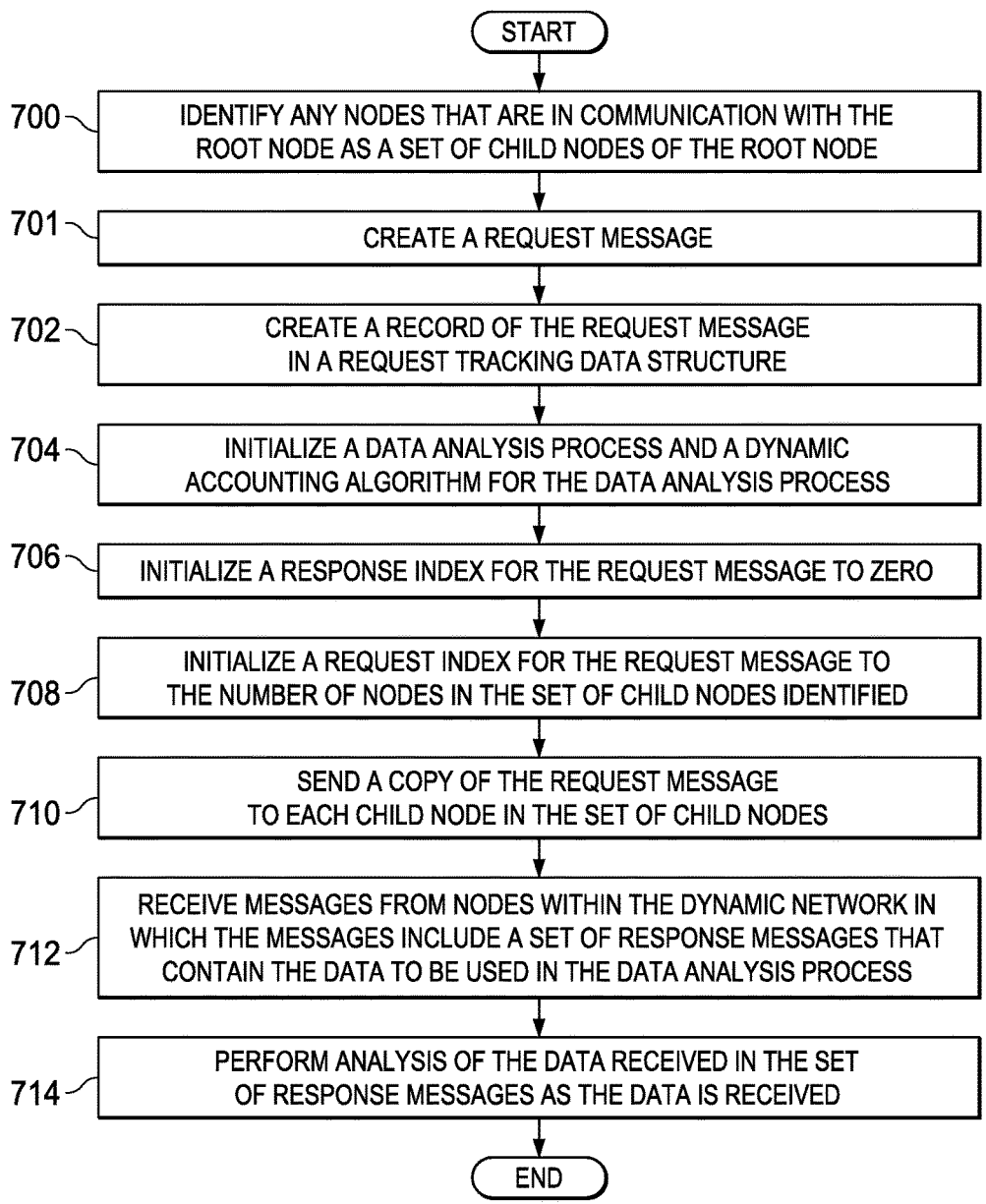
FIG. 7 is an illustration of a process of a root node performing data analysis within a dynamic network in the form of a flowchart in accordance with an illustrative embodiment.

Turning now to FIG. 7, an illustration of a process of a root node performing data analysis within a dynamic network is depicted in the form of a flowchart in accordance with an illustrative embodiment. The process illustrated in FIG. 7 may be implemented to perform data analysis 410 within dynamic network 406 in FIG. 4. The process illustrated in FIG. 7 may be performed by, for example, root node 414 in FIG. 4.

The process begins by identifying any nodes that are in communication with the root node as a set of child nodes of the root node (operation 700). Thereafter, the root node creates a request message (operation 701). In operation 701, the request message is created having a payload that includes a requested action type and a number of parameters for this action. In this illustrative example, the requested action type is a query action. In other words, the request message contains a query request. This request message may be referred to as the original request message or the root request message.

The number of parameters in the request message is initialized when the request message is created. In this illustrative example, an originator parameter in the request message is initialized to the identifier of the root node. An identifier parameter is initialized to a unique identifier for the request message and, in particular, the query request contained in the request message. Further, a visited nodes parameter is initialized to include the root node and each child node in the set of child nodes identified in operation 700. Additionally, a tracking parameter is initialized to the number of child nodes in the set of child nodes identified in operation 700. The type code parameter is initialized to "request."

The root node creates a record of the request message in a request tracking data structure (operation 702). This request tracking data structure is managed solely by the root node and used to keep track of request messages created by, received by, and/or otherwise being handled by the root node. A record in the request tracking data structure may include the request message, a request index for the request message, and a response index for the request message. In some cases, the record may include other information about the request message.

The process then initializes a data analysis process and a dynamic accounting algorithm for the data analysis process (operation 704). This dynamic accounting algorithm may be, for example, dynamic accounting algorithm 142 in FIG. 1.

Next, the root node initializes the response index for the request message to zero (operation 706). The root node initializes the request index for the request message to the number of nodes in the set of child nodes identified (operation 708). The root node then sends a copy of the request message to each child node in the set of child nodes (operation 710). Thereafter, the process receives messages from nodes within the dynamic network in which the messages include a set of response messages that contain the data to be used in the data analysis process (operation 712). The root node performs analysis of the data received in the set of response messages as the data is received (operation 714), with the process terminating thereafter.

Figure 8:
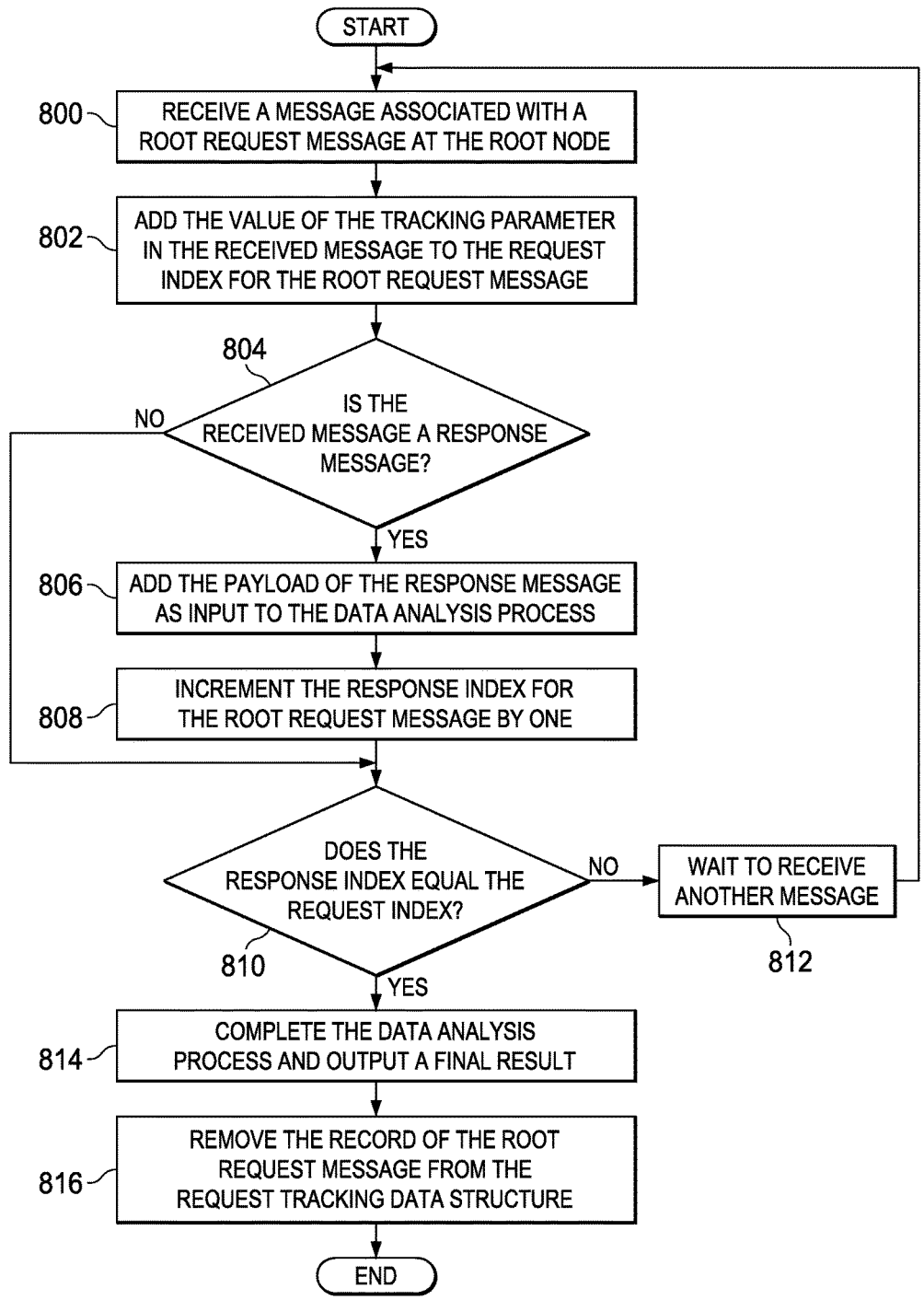
FIG. 8 is an illustration of a process for receiving and processing messages at the root node in the form of a flowchart in accordance with an illustrative embodiment.

With reference now to FIG. 8, an illustration of a process for receiving and processing messages at the root node is depicted in the form of a flowchart in accordance with an illustrative embodiment. The process illustrated in FIG. 8 may be implemented by root node 414 in FIG. 4 to perform operations 712 and 714 described in FIG. 7.

The process begins by receiving a message associated with the root request message at the root node (operation 800). A message associated with the root request message is a message having a same identifier parameter as the request message originally created by the root node in operation 701 in FIG. 7.

The process then adds the value of the tracking parameter in the received message to the request index for the root request message (operation 802). Next, the root node determines whether the received message is a response message (operation 804). Operation 804 and other types of similar operations may be performed by evaluating the value of the type code parameter in the message to identify the type of message. For example, if the value of the type code parameter in a message is "response," then that message is a response message.

With reference to operation 804, if the received message is a response message, the root node adds the payload of the response message as input to the data analysis process (operation 806). The root node then increments the response index for the root request message by one (operation 808).

The root node then determines whether the response index equals the request index (operation 810). If the response index does not equal the request index, the process waits to receive another message (operation 812), with the process then returning to operation 800 as described above.

Otherwise, if the response index equals the request index, the root node completes the data analysis process and outputs a final result (operation 814). The process then removes the record of the root request message from the request tracking data structure (operation 816), with the process then terminating. Removing the record of the root request message from the request tracking data structure also removes the response index and request index in the record.

With reference again to operation 804, if the received message is not a response message, the message may be a duplicate message. Therefore, the process proceeds to operation 810 as described above.

Figure 9:
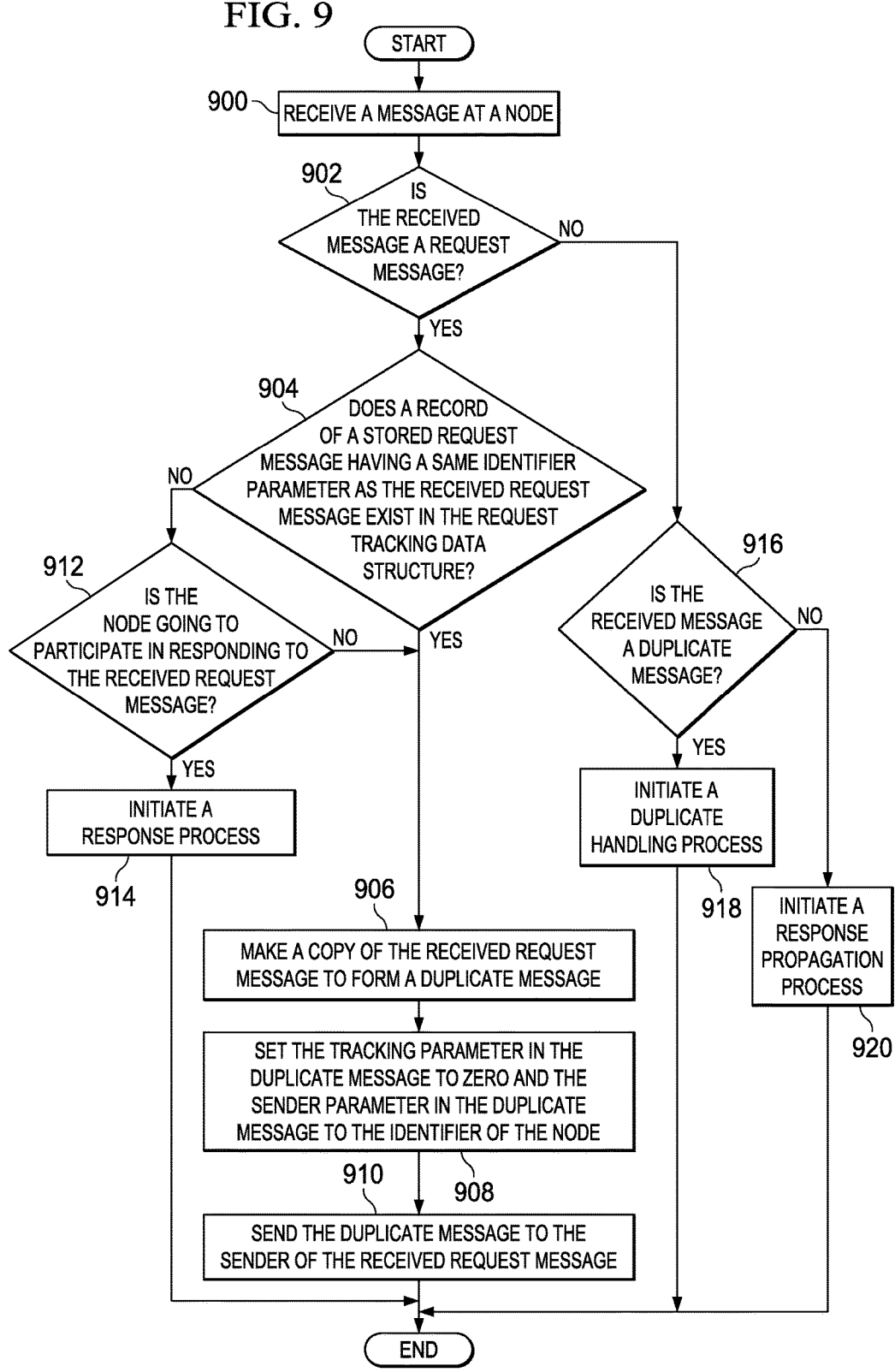
FIG. 9 is an illustration of a process for receiving and processing a message received at a node other than the root node within a dynamic network in the form of a flowchart in accordance with an illustrative embodiment.

With reference now to FIG. 9, an illustration of a process for receiving and processing a message received at a node other than the root node within a dynamic network is depicted in the form of a flowchart in accordance with an illustrative embodiment. The process illustrated in FIG. 9 may be implemented by any node, other than the root node, that receives a message within the dynamic network. The process illustrated in FIG. 9 may be implemented by, for example, without limitation, receiving node 144 in FIG. 1.

The process begins by receiving a message at a node (operation 900). The node then determines whether the received message is a request message (operation 902). If the received message is a request message, a record of a request message having a same identifier parameter as the received request message may or may not exist in the request tracking data structure managed by the node.

With reference to operation 902, if the received message is a request message, the node determines whether a record of a stored request message having a same identifier parameter as the received request message exists in the request tracking data structure (operation 904). If the record exists, the node makes a copy of the received request message to form a duplicate message (operation 906).

Next, the node sets the tracking parameter in the duplicate message to zero and the sender parameter in the duplicate message to the identifier of the node (operation 908). The node then sends the duplicate message to the sender of the received request message (operation 910), with the process terminating thereafter. The sender of the received request message is identified by the sender parameter in the received request message.

With reference again to operation 904, if the record does not exist, a determination is made as to whether the node is going to participate in responding to the received request message (operation 912). If the node is not going to participate in responding to the received request message, the process proceeds to operation 906 as described above. Otherwise, if the node decides to participate in responding to the received request message, the node initiates a response process (operation 914), with the process terminating thereafter.

With reference again to operation 902, if the received message is not a request message, the node determines whether the received message is a duplicate message (operation 916). When the received message is a duplicate message, a record of a stored request message having a same identifier parameter as the duplicate message must exist. If the received message is a duplicate message, the node initiates a duplicate handling process (operation 918), with the process terminating thereafter.

With reference again to operation 916, if the received message is not a duplicate message, the received message is a response message and thus, the node initiates a response propagation process (operation 920), with the process terminating thereafter. When the received message is a response message, a record of a stored request message having a same identifier parameter as the response message must exist.

Figure 10:
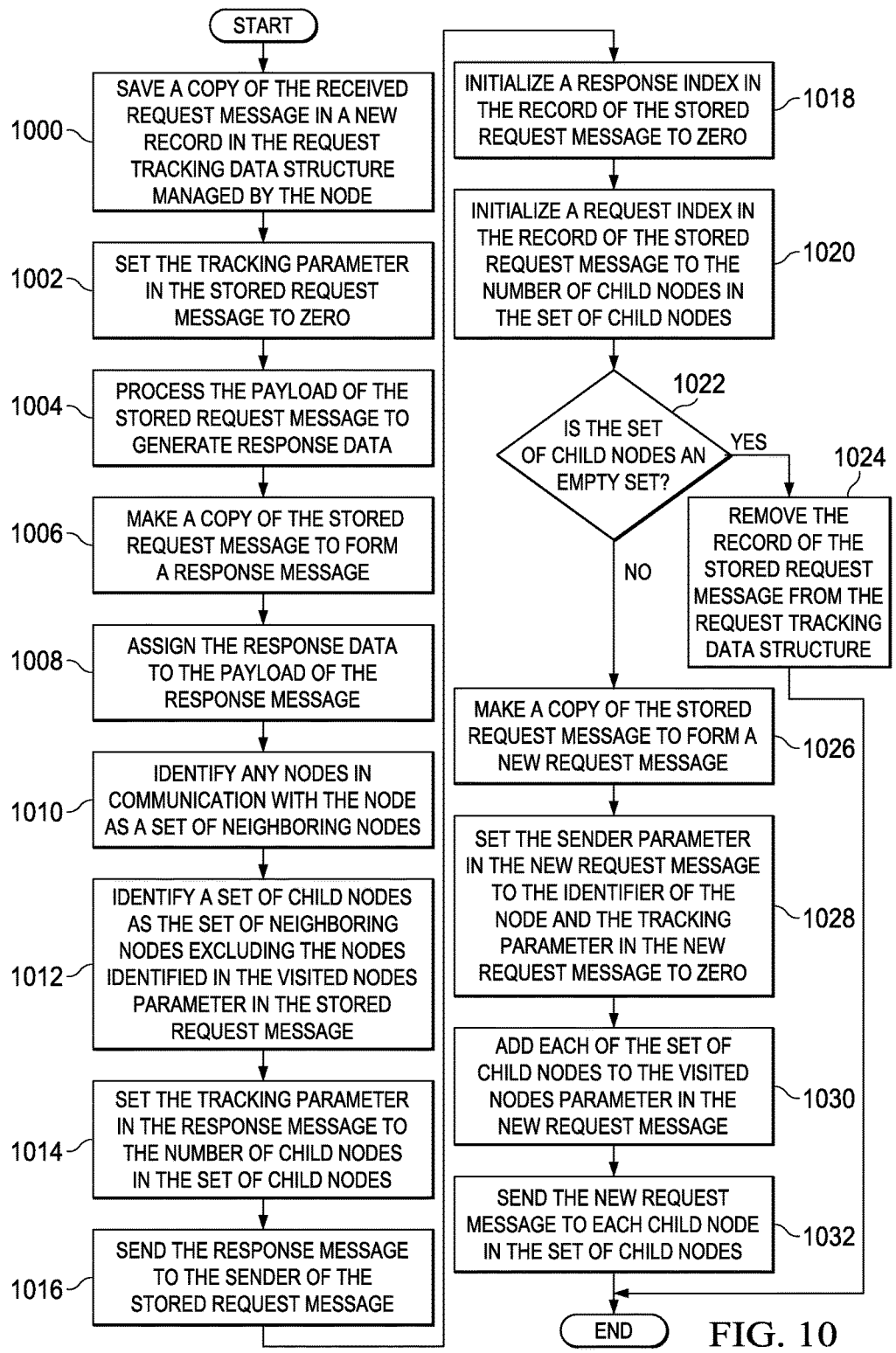
FIG. 10 is an illustration of a response process in the form of a flowchart in accordance with an illustrative embodiment.

With reference now to FIG. 10, an illustration of a response process is depicted in the form of a flowchart in accordance with an illustrative embodiment. The process illustrated in FIG. 10 may be an example of one implementation for the response process initiated in operation 914 in FIG. 9 when the message received at the node is a request message.

The process begins by the node saving a copy of the received request message in a new record in the request tracking data structure managed by the node (operation 1000). In operation 1000, the copy of the request message saved in this new record may be referred to as the stored request message.

The node sets the tracking parameter in the stored request message to zero (operation 1002). Next, the node processes the payload of the stored request message to generate response data (operation 1004). The node then makes a copy of the stored request message to form a response message (operation 1006). The node assigns the response data to the payload of the response message (operation 1008).

The node identifies any nodes in communication with the node as a set of neighboring nodes (operation 1010). The node then identifies a set of child nodes as the set of neighboring nodes excluding the nodes identified in the visited nodes parameter in the stored request message (operation 1012). Next, the node sets the tracking parameter in the response message to the number of child nodes in the set of child nodes (operation 1014). The node then sends the response message to the sender of the stored request message (operation 1016).

Thereafter, the node initializes a response index in the record of the stored request message to zero (operation 1018). Further, the node initializes a request index in the record of the stored request message to the number of child nodes in the set of child nodes (operation 1020).

Next, the node determines whether the set of child nodes is an empty set (operation 1022). If the set of child nodes is an empty set, the node removes the record of the stored request message from the request tracking data structure (operation 1024), with the process then terminating. Removing the record of the stored request message from the request tracking data structure also removes the response index and request index for the stored request message in the record. Once operation 1024 has been performed, the node is done with all responsibilities associated with the stored request message and may begin performing any cleanup operations required.

With reference again to operation 1022, if the set of child nodes is not an empty set, the node makes a copy of the stored request message to form a new request message (operation 1026). The node sets the sender parameter in the new request message to the identifier of the node and the tracking parameter in the new request message to zero (operation 1028). Then, the node adds each of the set of child nodes to the visited nodes parameter in the new request message (operation 1030). The node sends the new request message to each child node in the set of child nodes (operation 1032), with the process terminating thereafter.

Figure 11:
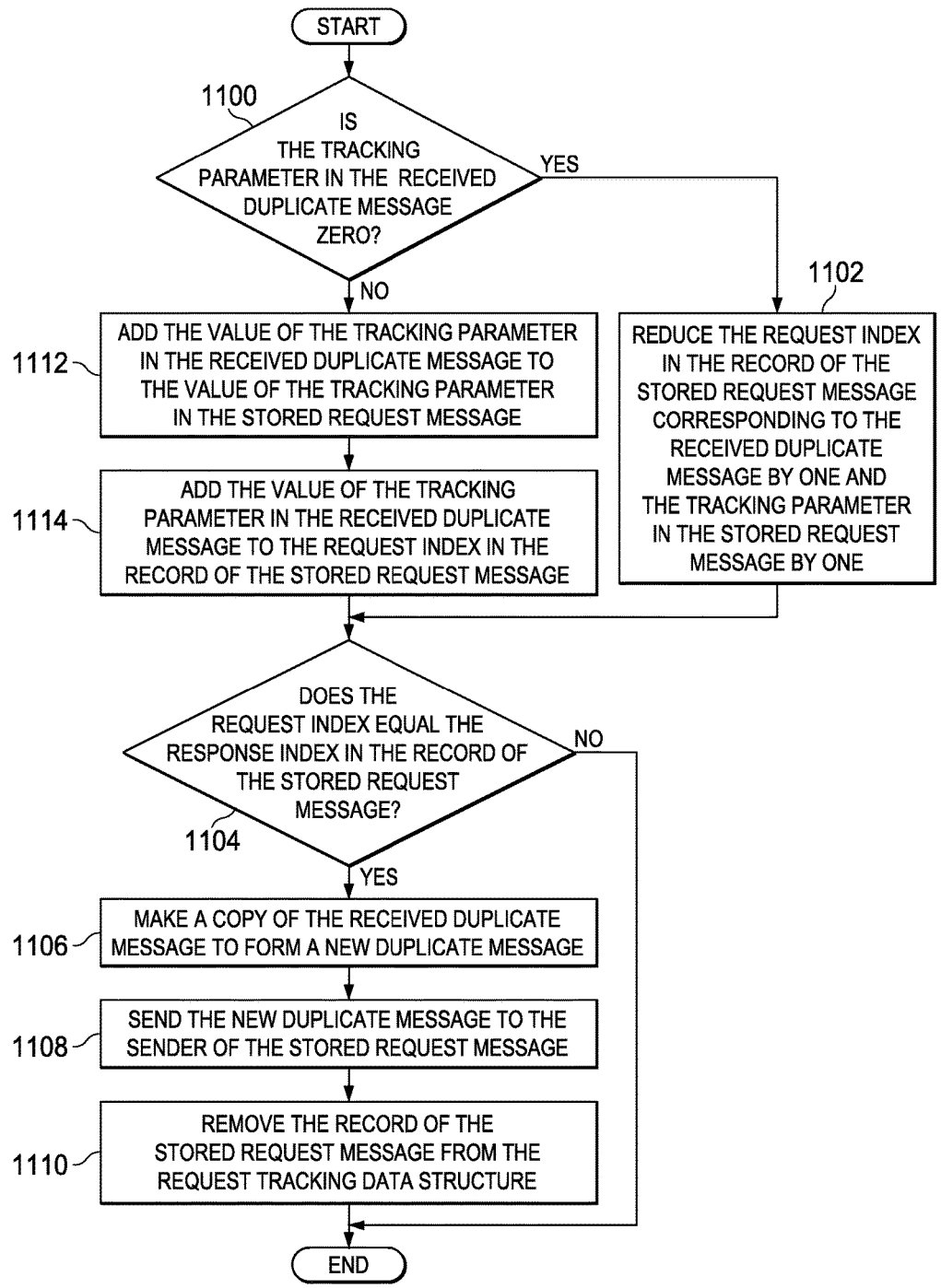
FIG. 11 is an illustration of a duplicate handling process in the form of a flowchart in accordance with an illustrative embodiment.

With reference now to FIG. 11, an illustration of a duplicate handling process is depicted in the form of a flowchart in accordance with an illustrative embodiment.

The process illustrated in FIG. 11 may be an example of one implementation for the duplicate handling process initiated in operation 918 in FIG. 9 when the message received at the node is a duplicate message.

When the message is a duplicate message, a record in the request tracking data structure managed by the node contains a stored request message having a same identifier parameter as the duplicate message. This stored request message is considered as corresponding to the duplicate message.

The process begins by determining whether the tracking parameter in the received duplicate message is zero (operation 1100). If the tracking parameter in the received duplicate message is zero, the node reduces the request index in the record of the stored request message corresponding to the received duplicate message by one and the tracking parameter in the stored request message by one (operation 1102). The process then determines whether the request index equals the response index in the record of the stored request message (operation 1104).

If the request index does not equal the response index, the process terminates. Otherwise, the node makes a copy of the received duplicate message to form a new duplicate message (operation 1106). The node then sends the new duplicate message to the sender of the stored request message (operation 1108). The node removes the record of the stored request message from the request tracking data structure (operation 1110), with the process terminating thereafter. The node has now finished handling all responsibilities associated with this stored request message.

With reference again to operation 1100, if the tracking parameter in the received duplicate message is not zero, the node adds the value of the tracking parameter in the received duplicate message to the value of the tracking parameter in the stored request message (operation 1112). The node also adds the value of the tracking parameter in the received duplicate message to the request index in the record of the stored request message (operation 1114). The process then proceeds to operation 1104 as described above.

Figure 12:
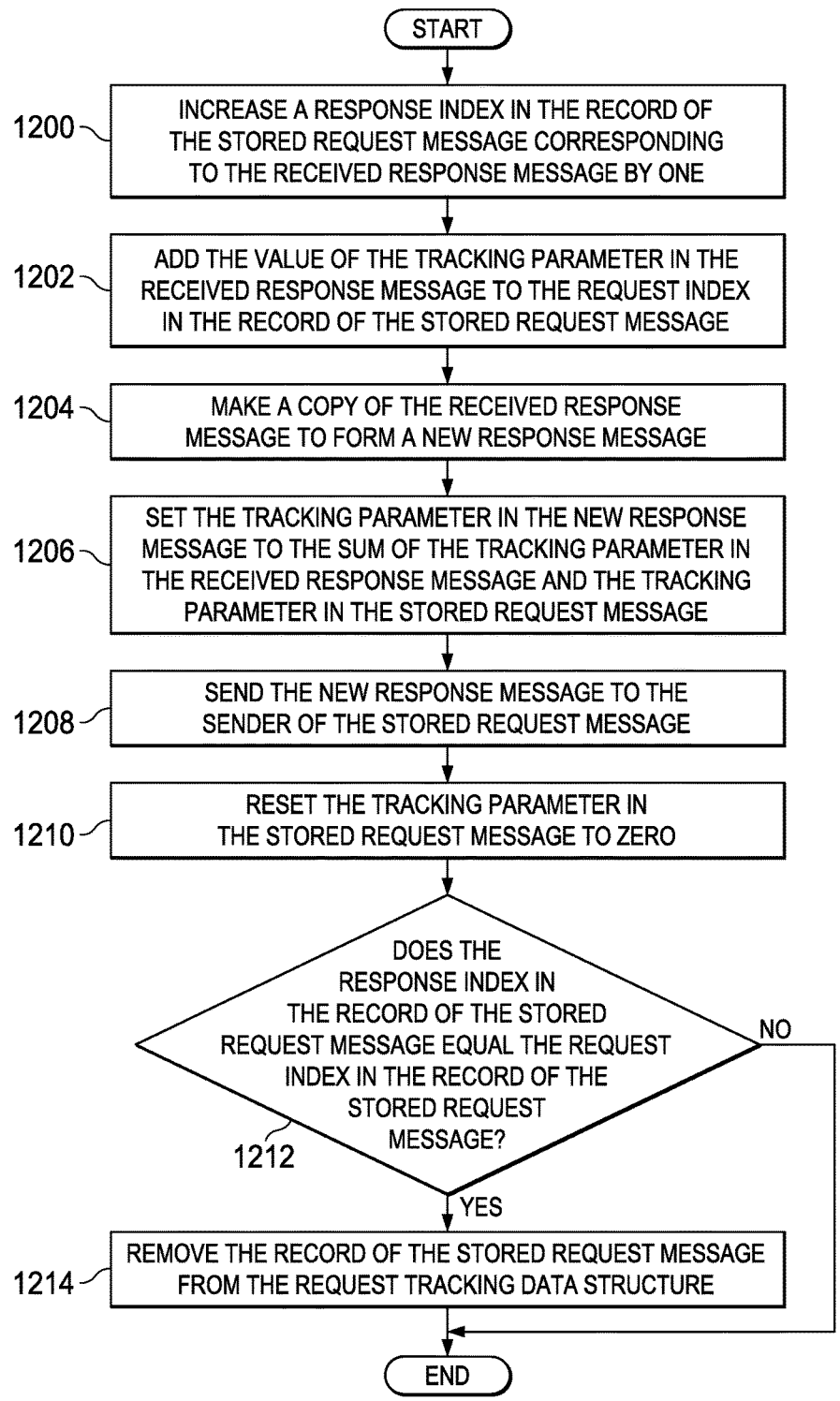
FIG. 12 is an illustration of a response propagation process at a node within a dynamic network in the form of a flowchart in accordance with an illustrative embodiment.

With reference now to FIG. 12, an illustration of a response propagation process at a node within a dynamic network is depicted in the form of a flowchart in accordance with an illustrative embodiment. The process illustrated in FIG. 12 may be an example of one implementation for the response propagation process initiated in operation 920 in FIG. 9 when the message received at the node is a response message.

A response propagation process may be invoked when a particular node, within the spanning tree formed for a particular request message, receives a response from a child node of the particular node and performs housekeeping before passing the response of the child node to the parent node of the particular node. The parent node of the particular node may be referred to as the grandparent of the child node of the particular node. In this manner, response messages will eventually reach the root node of the spanning tree formed for a request message originated by the root node.

When the message is a response message, a record in the request tracking data structure managed by the node contains a stored request message having a same identifier parameter as the response message. This stored request message is considered as corresponding to the response message.

The process begins by increasing a response index in the record of the stored request message corresponding to the received response message by one (operation 1200). The node then adds the value of the tracking parameter in the received response message to the request index in the record of the stored request message (operation 1202).

Next, the node makes a copy of the received response message to form a new response message (operation 1204). The node sets the tracking parameter in the new response message to the sum of the tracking parameter in the received response message and the tracking parameter in the stored request message (operation 1206). The node then sends the new response message to the sender of the stored request message (operation 1208). The sender may be the parent node of the node with respect to the spanning tree formed for the request message.

Thereafter, the node resets the tracking parameter in the stored request message to zero (operation 1210). The node then determines whether the response index in the record of the stored request message equals the request index in the record of the stored request message (operation 1212). If the response index does not equal the request index, the process terminates. The process described in FIG. 12 may be repeated for each response message received at the node. Otherwise, if the response index does equal the request index in operation 1212, the node removes the record of the stored request message from the request tracking data structure (operation 1214), with the process terminating thereafter. In operation 1214, the node's processing of this stored request message is considered complete and the node cleans up by removing the record of the stored request message.

With reference now to FIGS. 13-18, illustrations of the processes used in a dynamic network for performing data analysis are depicted in the form of flowcharts in accordance with an illustrative embodiment. The processes in FIGS. 13-18 may describe a method for performing data analysis within a dynamic network while taking into account any undesired events that may occur within the dynamic network.

Figure 13:
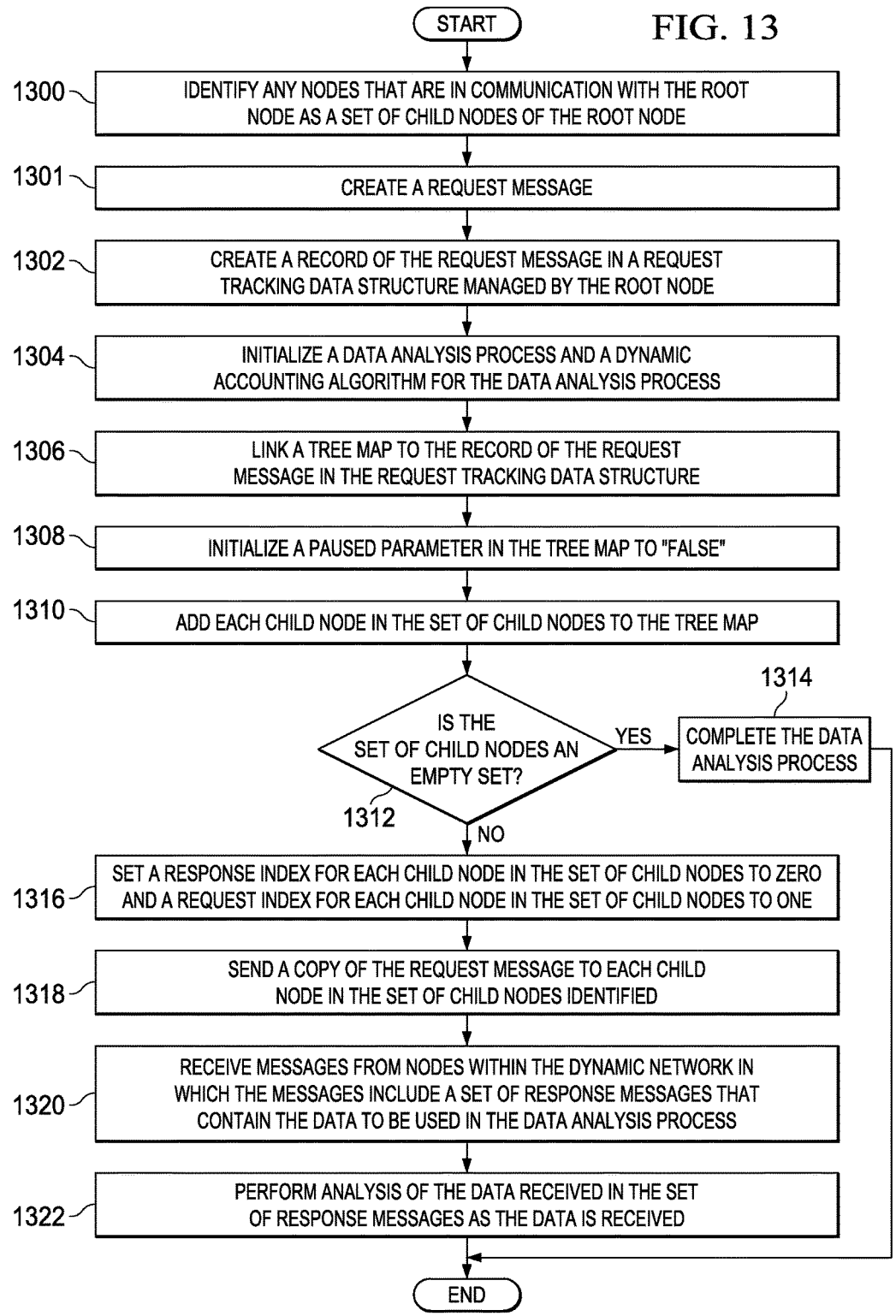
FIG. 13 is an illustration of a process for performing data analysis within a dynamic network in the form of a flowchart in accordance with an illustrative embodiment.

Turning now to FIG. 13, an illustration of a process for performing data analysis within a dynamic network is depicted in the form of a flowchart in accordance with an illustrative embodiment. The process illustrated in FIG. 13 may be implemented to perform data analysis 410 within dynamic network 406 in FIG. 4. The process illustrated in FIG. 13 may be performed by, for example, root node 414 in FIG. 4.

The process begins by identifying any nodes that are in communication with the root node as a set of child nodes of the root node (operation 1300). Thereafter, the root node creates a request message (operation 1301). In operation 1301, the request message is created having a payload that includes a requested action type and a number of parameters for this action. In this illustrative example, the requested action type is a query action. In other words, the request message contains a query request. This request message may be referred to as the original request message or the root request message.

The number of parameters in the request message is initialized when the request message is created. In this illustrative example, an originator parameter is initialized to the identifier of the root node. An identifier parameter is initialized to a unique identifier for the request message and, in particular, the query request contained in the request message. A visited nodes parameter is initialized to include the root node and each child node in the set of child nodes identified in operation 1300. A tracking parameter is initialized to zero. A type code parameter is initialized to "request." A provider parameter is initialized to the identifier of the root node. A depth parameter is initialized to zero.

The root node creates a record of the request message in a request tracking data structure managed by the root node (operation 1302). A record in this request tracking data structure may include a copy of the request message. In some cases, the record may include other information about the request message.

The process then initializes the data analysis process and a dynamic accounting algorithm for the data analysis process (operation 1304). This dynamic accounting algorithm may be, for example, dynamic accounting algorithm 142 in FIG. 1.

Next, the root node links a tree map to the record of the request message in the request tracking data structure (operation 1306). The root node initializes a paused parameter in the tree map to "false" (operation 1308). In other words, the root node indicates that the root node is in an unpaused state. Further, the root node adds each child node in the set of child nodes to the tree map (operation 1310). In operation 1310, for each child node added to the tree map, a response index and a request index for that child node are also included in the tree map. In other examples, however, the request index and response index for a child node may be linked to the child node in the tree map.

Then, the root node determines whether the set of child nodes is an empty set (operation 1312). If the set of child nodes is an empty set, the root node completes the data analysis process (operation 1314), with the process terminating thereafter. Otherwise, the root node sets a response index for each child node in the set of child nodes to zero and a request index for each child node in the set of child nodes to one (operation 1316). The root node then sends a copy of the request message to each child node in the set of child nodes identified (operation 1318).

Thereafter, the process receives messages from nodes within the dynamic network in which the messages include a set of response messages that contain the data to be used in the data analysis process (operation 1320). The root node performs analysis of the data received in the set of response messages as the data is received (operation 1322), with the process terminating thereafter.

Figure 14:
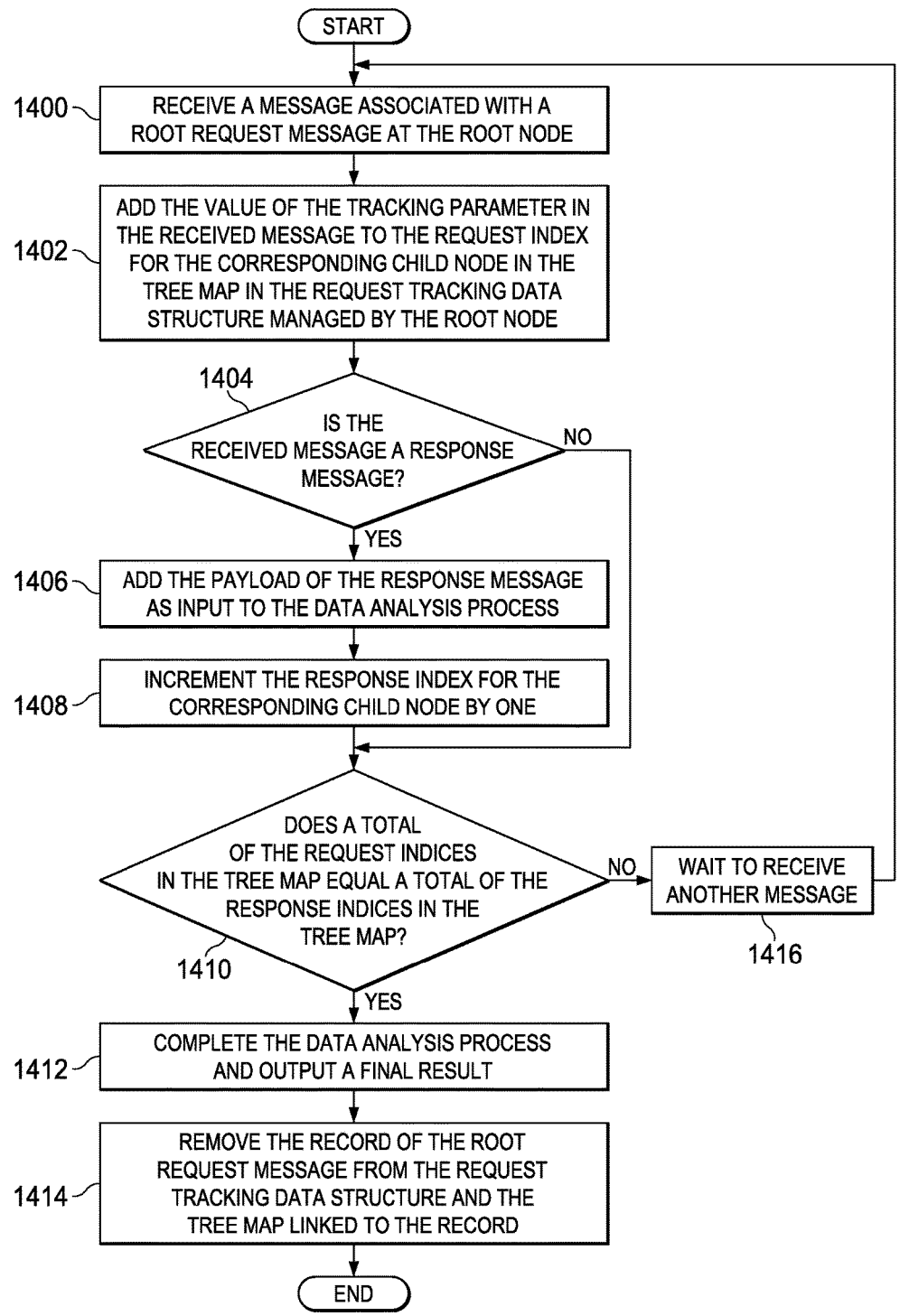
FIG. 14 is an illustration of a process for receiving and processing messages at the root node in the form of a flowchart in accordance with an illustrative embodiment.

With reference now to FIG. 14, an illustration of a process for receiving and processing messages at the root node is depicted in the form of a flowchart in accordance with an illustrative embodiment. The process illustrated in FIG. 14 may be implemented by root node 414 in FIG. 4 to perform operations 1320 and 1322 described in FIG. 13.

The process begins by receiving a message associated with the root request message at the root node (operation 1400). A message associated with the root request message is a message having a same identifier parameter as the request message originally created by the root node in operation 1301 in FIG. 13.

The process then adds the value of the tracking parameter in the received message to the request index for the corresponding child node in the tree map in the request tracking data structure managed by the root node (operation 1402). The corresponding child node is the child node identified by the sender parameter in the received message.

Next, the root node determines whether the received message is a response message (operation 1404). If the received message is a response message, the root node adds the payload of the response message as input to the data analysis process (operation 1406). The root node then increments the response index for the corresponding child node by one (operation 1408).

The root node determines whether a total of the request indices in the tree map equals a total of the response indices in the tree map (operation 1410). The total of the request indices is the sum of the request indices for all of the child nodes identified in the tree map linked to the record of the root request message. The total of the response indices is the sum of the response indices for all of the child nodes identified in the tree map linked to the record of the root request message.

If the total of the request indices equals the total of the response indices, the root node completes the data analysis process and outputs a final result (operation 1412). The root node then removes the record of the root request message from the request tracking data structure and the tree map linked to the record (operation 1414), with the process then terminating.

With reference again to operation 1410, if the total of the request indices does not equal the total of the response indices, the process waits to receive another message (operation 1416), with the process then returning to operation 1400 as described above. With reference again to operation 1404, if the received message is not a response message, the received message must be a duplicate message and the process proceeds directly to operation 1410 as described above.

Figure 15:
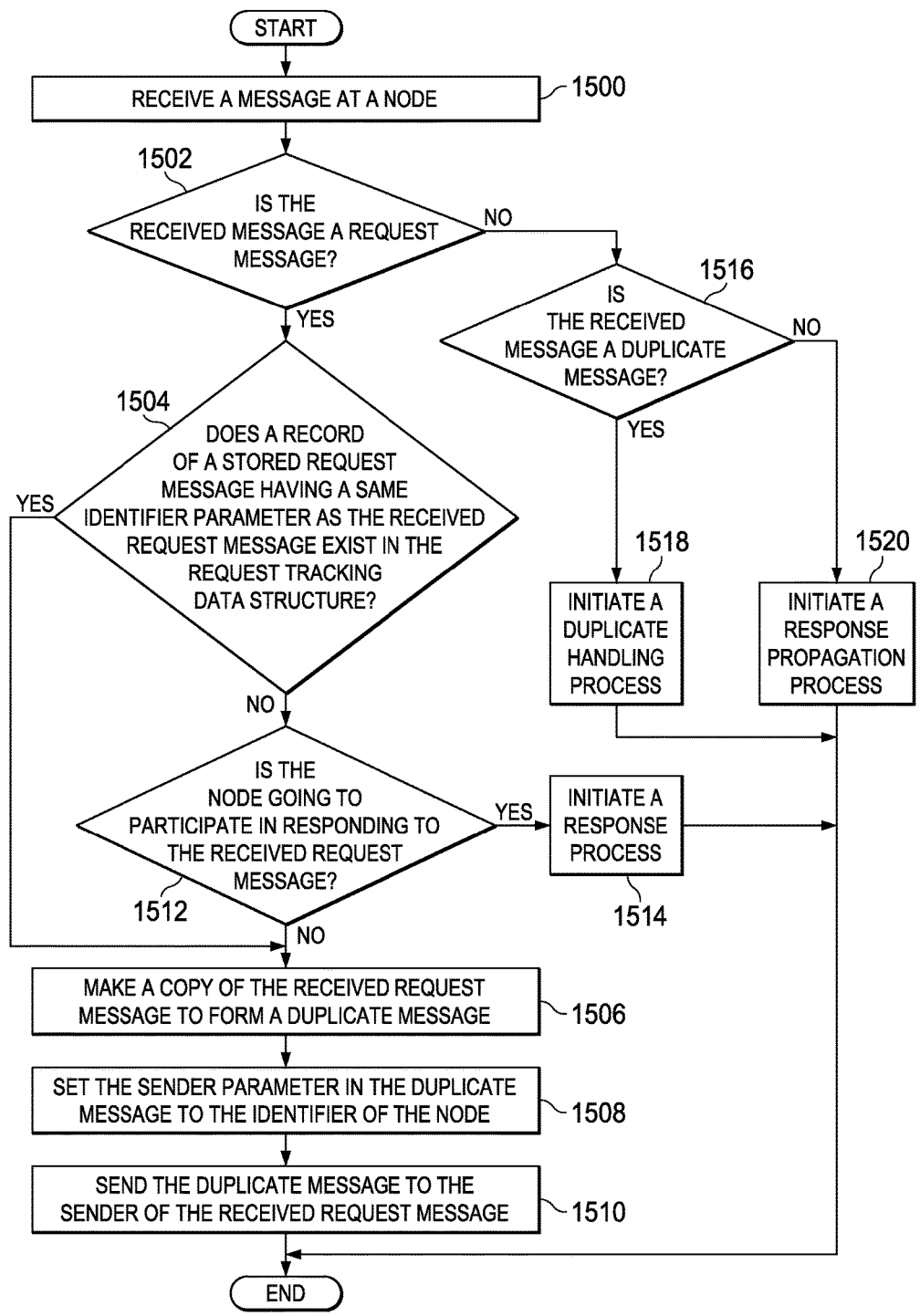
FIG. 15 is an illustration of a process for receiving and processing a message at a node within a dynamic network other than the root node in the form of a flowchart in accordance with an illustrative embodiment.

With reference now to FIG. 15, an illustration of a process for receiving and processing a message at a node within a dynamic network other than the root node is depicted in the form of a flowchart in accordance with an illustrative embodiment. The process illustrated in FIG. 15 may be implemented by any node, other than the root node, that receives a message within the dynamic network. The process illustrated in FIG. 15 may be implemented by, for example, without limitation, receiving node 144 in FIG. 1.

The process begins by receiving a message at a node (operation 1500). The node then determines whether the received message is a request message (operation 1502). If the received message is a request message, a record of a request message having a same identifier parameter as the received request message may or may not exist in the request tracking data structure managed by the node.

With reference to operation 1502, if the received message is a request message, the node determines whether a record of a stored request message having a same identifier parameter as the received request message exists in the request tracking data structure (operation 1504). If the record exists, the node makes a copy of the received request message to form a duplicate message (operation 1506). The node sets the sender parameter in the duplicate message to the identifier of the node (operation 1508). The node then sends the duplicate message to the sender of the received message (operation 1510), with the process terminating thereafter.

With reference again to operation 1504, if the record does not exist, a determination is made as to whether the node is going to participate in responding to the received request message (operation 1512). If the node is not going to participate in responding to the received request message, the process proceeds to operation 1506 as described above. Otherwise, if the node decides to participate in responding to the received request message, the node initiates a response process (operation 1514), with the process terminating thereafter.

With reference again to operation 1502, if the received message is not a request message, the node determines whether the received message is a duplicate message (operation 1516). When the received message is a duplicate message, a record of a stored request message having a same identifier parameter as the duplicate message must exist. If the message is a duplicate message, the node initiates a duplicate handling process (operation 1518), with the process terminating thereafter.

With reference again to operation 1516, if the received message is not a duplicate message, the message is a response message and the node initiates a response propagation process (operation 1520), with the process terminating thereafter. When the received message is a response message, a record of a stored request message having a same identifier parameter as the response message must exist.

Figure 16B:
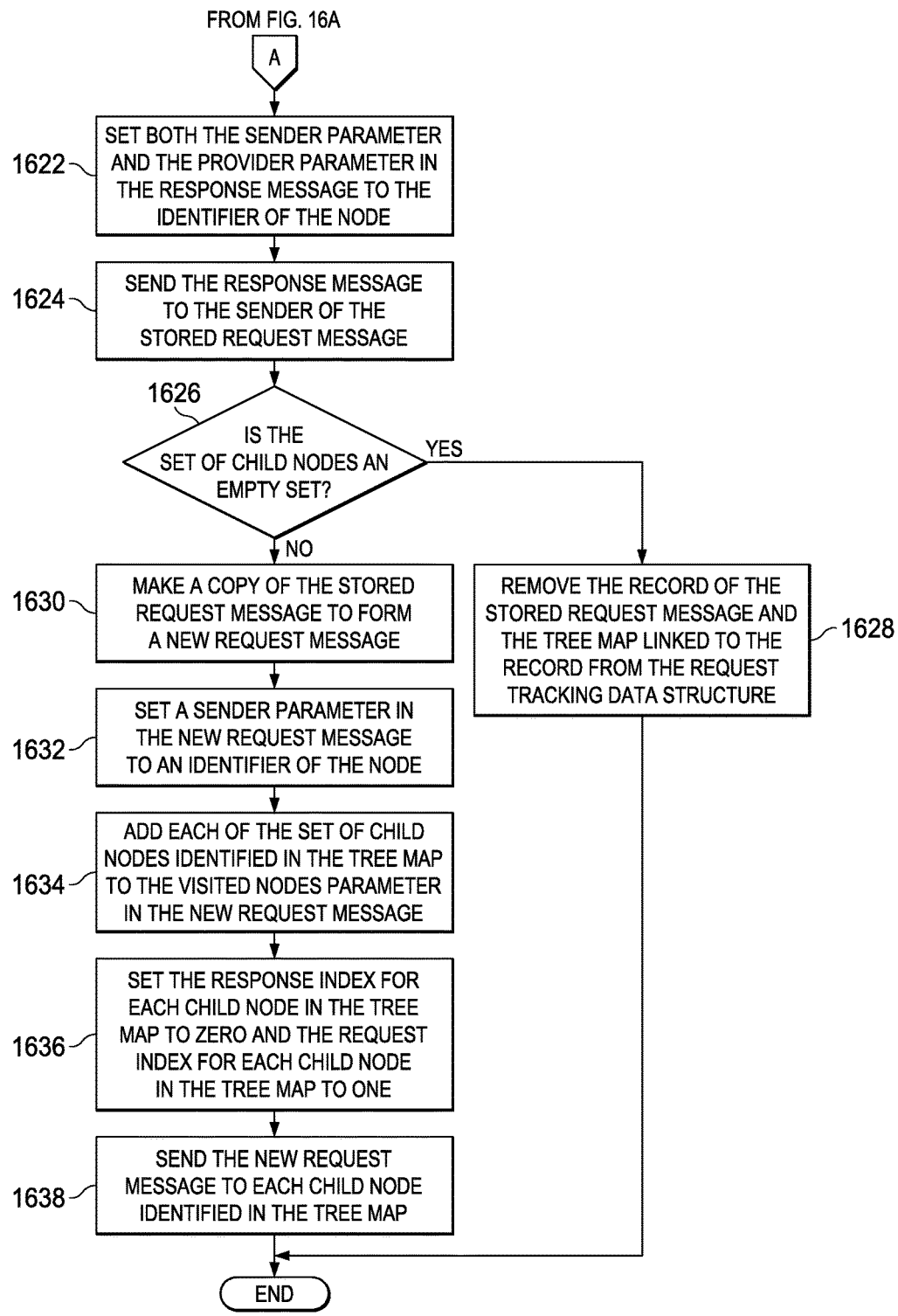

With reference now to FIGS. 16A and 16B, an illustration of a response process is depicted in the form of a flowchart in accordance with an illustrative embodiment. The process illustrated in FIGS. 16A and 16B may be an example of one implementation for the response process initiated in operation 1514 in FIG. 15 when the message received at the node is a request message.

The process begins by saving a copy of the received request message in a new record in the request tracking data structure managed by the node (operation 1600). In operation 1600, the copy of the request message saved in this new record may be referred to as the stored request message.

The node increases the value of the depth parameter in the stored request message by one (operation 1602). The node identifies any nodes in communication with the node as a set of neighboring nodes for the node (operation 1604). The node then identifies a set of child nodes as the set of neighboring nodes excluding the nodes identified in the visited nodes parameter in the received request message (operation 1606).

The node links a tree map to the record of the stored request message in the request tracking data structure (operation 1608). The node initializes a paused parameter in the tree map to "false" (operation 1610). In other words, the node indicates that the node is in an unpaused state. Further, the node adds each child node in the set of child nodes identified to the tree map (operation 1612). In operation 1612, for each child node added to the tree map, a response index and a request index for that child node are also included in the tree map. In other examples, however, the request index and response index for a child node may be linked to the child node in the tree map.

The node then processes the payload of the stored request message to generate response data (operation 1614). The node then makes a copy of the stored request message to form a response message (operation 1616). The node assigns the response data to the payload of the response message (operation 1618).

Next, the node sets the tracking parameter in the response message to the number of child nodes in the set of child nodes (operation 1620). Further, the node sets both the sender parameter and the provider parameter in the response message to the identifier of the node (operation 1622). The node then sends the response message to the sender of the stored request message (operation 1624).

Thereafter, the node determines whether the set of child nodes is an empty set (operation 1626). If the set of child nodes is an empty set, the node removes the record of the stored request message and the tree map linked to the record from the request tracking data structure (operation 1628), with the process then terminating. Once operation 1628 has been performed, the node is done with all responsibilities associated with the stored request message and may be able to perform any cleanup operations required.

With reference again to operation 1626, if the set of child nodes is not an empty set, the node makes a copy of the stored request message to form a new request message (operation 1630). The node sets a sender parameter in the new request message to an identifier of the node (operation 1632). Then, the node adds each of the set of child nodes identified in the tree map to the visited nodes parameter in the new request message (operation 1634).

Next, the node sets the response index for each child node in the tree map to zero and the request index for each child node in the tree map to one (operation 1636). Thereafter, the node sends the new request message to each child node identified in the tree map (operation 1638), with the process terminating thereafter.

With reference now to FIG. 17, an illustration of a duplicate handling process is depicted in the form of a flowchart in accordance with an illustrative embodiment. The process illustrated in FIG. 17 may be an example of one implementation for the duplicate handling process initiated in operation 1518 in FIG. 15 when the message received at the node is a duplicate message.

When the received message is a duplicate message, a record in the request tracking data structure managed by the node contains a stored request message having a same identifier parameter as the duplicate message. This stored request message is considered as corresponding to the duplicate message.

The process begins by determining whether the tracking parameter in the received duplicate message is zero (operation 1700). If the tracking parameter in the received duplicate message is zero, the node reduces the tracking parameter in the stored request message corresponding to the received duplicate message by one (operation 1702).

Further, the node reduces the request index for the corresponding child node in the tree map in the request tracking data structure managed by the node by one (operation 1704). The corresponding child node is the child node in the tree map identified by the sender parameter in the received duplicate message. The node then removes the corresponding child node from the tree map in the request tracking data structure (operation 1706).

The process then determines whether the total of the request indices in the tree map equals the total of the response indices in the tree map (operation 1708). The total of the request indices is the sum of the request indices for all child nodes in the tree map linked to the record of the stored request message corresponding to the received duplicate message. The total of the response indices is the sum of the response indices for all child nodes in the tree map linked to the record of the stored request message corresponding to the received duplicate message.

If the total of the request indices does not equal the total of the response indices, the process terminates. Otherwise, the node makes a copy of the received duplicate message to form a new duplicate message (operation 1710). The node sets a sender parameter in the new duplicate message to the identifier of the node (operation 1712). The node then sends the new duplicate message to the sender of the stored request message corresponding to the received duplicate message (operation 1714). The node removes the record of the stored request message and the tree map linked to the record from the request tracking data structure (operation 1716), with the process terminating thereafter. The node has now finished handling all responsibilities associated with this stored request message.

With reference again to operation 1700, if the tracking parameter in the received duplicate message is not zero, the node adds the value of the tracking parameter in the duplicate message to the tracking parameter in the stored request message (operation 1718). Further, the node adds the value of the tracking parameter in the duplicate message to the request index for the corresponding child node in the tree map (operation 1720). The process then proceeds to operation 1708 as described above.

With reference now to FIG. 18, an illustration of a response propagation process is depicted in the form of a flowchart in accordance with an illustrative embodiment. The process illustrated in FIG. 18 may be an example of one implementation for the response propagation process initiated in operation 1520 in FIG. 15 when the message received at the node is a response message.

When the message is a response message, a record in the request tracking data structure managed by the node contains a stored request message having a same identifier parameter as the response message. This stored request message is considered as corresponding to the duplicate message.

The process begins by increasing a response index for the corresponding child node in the tree map in the request data tracking structure by one (operation 1800). The corresponding child node is the child node in the tree map having an identifier that matches the identifier parameter in the received response message. The node then adds the value of the tracking parameter in the received response message to the request index for the corresponding child node (operation 1802).

Next, the node makes a copy of the received response message to form a new response message (operation 1804). The node sets the value of the tracking parameter in the new response message to the sum of the tracking parameter in the received response message and the tracking parameter in the stored request message corresponding to the received response message (operation 1806). Further, the node sets the sender parameter in the new response message to the identifier of the node (operation 1808). The node then sends the new response message to the sender of the stored request message (operation 1810).

Thereafter, the node resets the tracking parameter in the stored request message to zero (operation 1812). The node then determines whether the total of the response indices in the tree map linked to the record of the stored request message equals the total of the response indices in the tree map (operation 1814).

If the total of the response indices does not equal the total of the request indices, the process terminates. Otherwise, the node removes the record of the stored request message and the tree map linked to the record from the request tracking data structure (operation 1816), with the process terminating thereafter.

Turning now to FIGS. 19-28, illustrations of processes that may be used for monitoring for and handling undesired events that may occur within a dynamic network while data analysis is being performed are depicted in accordance with an illustrative embodiment. In particular, these processes may be used to handle undesired events that may occur while data analysis is being performed according to the processes described in FIGS. 13-18.

Figure 19:
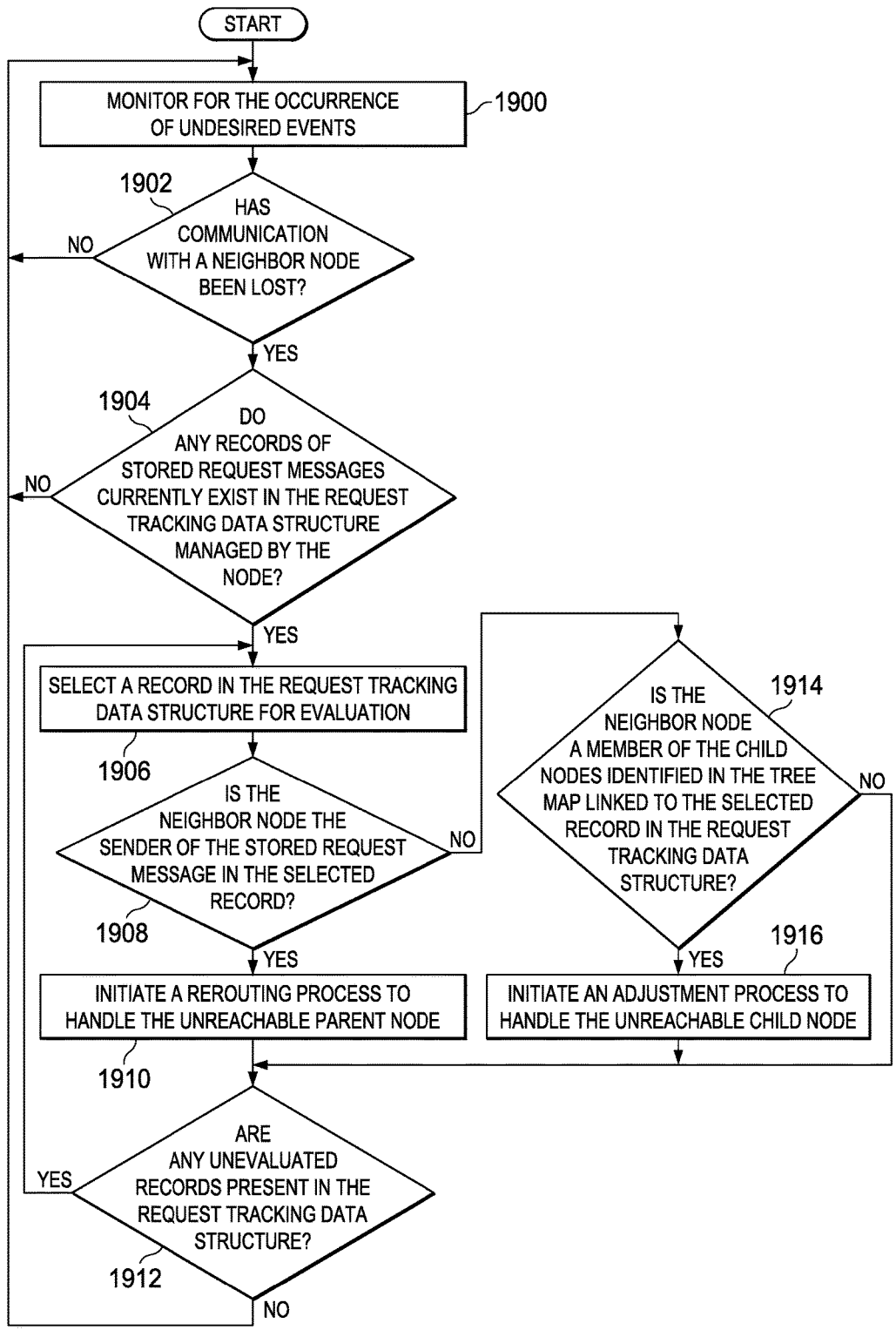
FIG. 19 is an illustration of a process for monitoring for undesired events in the form of a flowchart in accordance with an illustrative embodiment.

With reference now to FIG. 19, an illustration of a process for monitoring for undesired events is depicted in the form of a flowchart in accordance with an illustrative embodiment. The process illustrated in FIG. 19 may be implemented by any node within dynamic network 406 in FIG. 4 while data analysis 410 is being performed within dynamic network 406.

The process begins by the node monitoring for the occurrence of undesired events (operation 1900). An undesired event may be, for example, without limitation, loss of communication with a neighbor node due to an issue with the neighbor node or the communications link between the node and the neighbor node. The neighbor node may be a node that was previously in direct communication with the node. A neighbor node with which communication has been lost may be referred to as an unreachable node or an unreachable neighbor node.

The node determines whether communication with a neighbor node has been lost (operation 1902). If communication with a neighbor node has not been lost, the process returns to operation 1900 as described above. Otherwise, the node determines whether any records of stored request messages currently exist in the request tracking data structure managed by the node (operation 1904). If no such records currently exist, the process returns to operation 1900 as described above.

If any such records currently exist, the node selects a record in the request tracking data structure for evaluation (operation 1906). The node determines whether the neighbor node is the sender of the stored request message in the selected record (operation 1908). In other words, the node determines whether the neighbor node is the parent node of the stored request message. When the neighbor node is the parent node, the neighbor node may be referred to as an unreachable parent node.

With reference to operation 1908, if the neighbor node is the sender of the stored request message in the selected record, the node initiates a rerouting process to handle the unreachable parent node (operation 1910). The node then determines whether any unevaluated records are present in the request tracking data structure (operation 1912). If any unevaluated records are present, the node returns to operation 1906 as described above. Otherwise, the process returns to operation 1900 as described above.

With reference again to operation 1908, if the neighbor node is not the sender of the stored request message in the selected record, the node determines whether the neighbor node is a member of the child nodes identified in the tree map linked to the selected record in the request tracking data structure (operation 1914). When the neighbor node is one of the child nodes identified in the tree map, the neighbor node may be referred to as an unreachable child node.

If the neighbor node is not one of the child nodes identified in the tree map, the process proceeds directly to operation 1912 as described above. Otherwise, if the neighbor node is one of the child nodes identified in the tree map, the node initiates an adjustment process to handle the unreachable child node (operation 1916), with the process then proceeding to operation 1912 as described above.

Figure 20B:
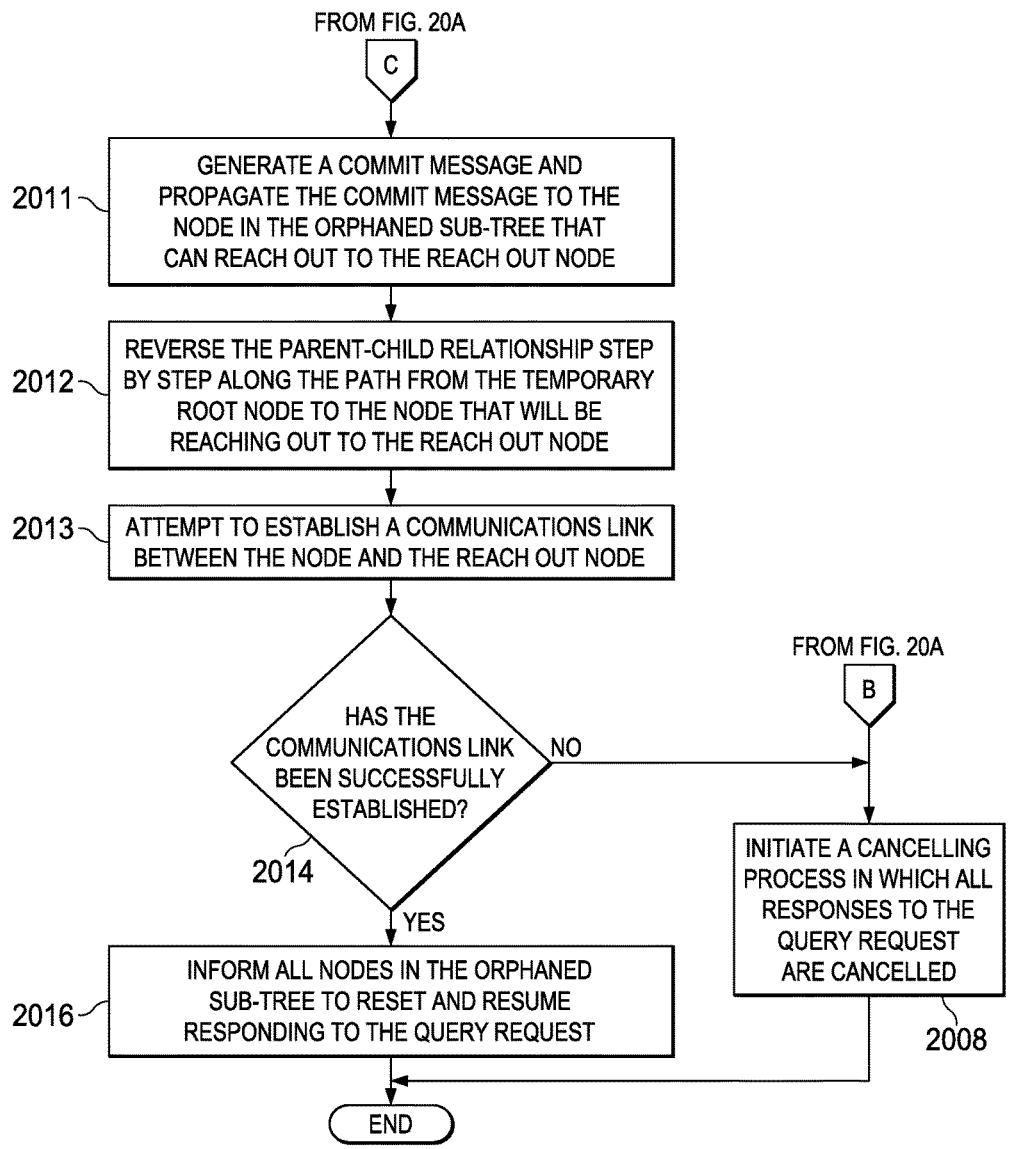

With reference now to FIGS. 20A and 20B, an illustration of a rerouting process for handling an unreachable parent node is depicted in the form of a flowchart in accordance with an illustrative embodiment. The process illustrated in FIGS. 20A and 20B may be an example of one implementation for the rerouting process initiated in operation 1910 in FIG. 19. The node that is handling the unreachable parent node may be considered a temporary root node. The temporary root node and all direct and indirect children of the temporary root node may be referred to as an orphaned sub-tree.

The process begins by the temporary root node informing the other nodes in the orphaned sub-tree to pause any response to the query request in the stored request message sent to the temporary root node by the unreachable parent node (operation 2000). The stored request message is the stored request message in the record selected in operation 1906.

The temporary root node then informs the other nodes in the orphaned sub-tree to find the best local reach out connection to the root node that originated the query request in the stored request message (operation 2002). Next, the temporary root node identifies its own candidate reach out node and collects and processes feedback messages received from the set of child nodes of the temporary root node to form a set of candidate reach out nodes capable of reaching out to the root node (operation 2004).

The temporary root node determines whether reaching out to the root node is possible using any one of the candidate reach out nodes identified (operation 2006). If reaching out is not possible, a cancelling process is initiated in which all responses to the request message are cancelled (operation 2008), with the process terminating thereafter. However, if reaching out is possible, the temporary root node selects the best candidate reach out node from the set of candidate reach out nodes as the reach out node to use based on a set of selected criteria (operation 2010). The temporary root node then generates a commit message and propagates this commit message to the node in the orphaned sub-tree that can reach out to the reach out node (operation 2011). The parent-child relationship is reversed step by step along the path from the temporary root node to the node that will be reaching out to the reach out node (operation 2012). In operation 2012, the parent-child relationship is reversed until the node that will reach out to the reach out node becomes the new temporary root node of the orphaned sub-tree.

When the node that will reach out to the reach out node receives the commit message, the node attempts to establish a communications link between the node and the reach out node (operation 2013). In operation 2013, the reach out node is the node that originally agreed to accept a reach out connection from this node. In other words, the reach out node was the best candidate reach out node identified by the node.

A determination is made as to whether the communications link has been successfully established (operation 2014). If the communications link has been successfully established, the reach out node informs all nodes in the orphaned sub-tree to reset and resume responding to the query request (operation 2016), with the process terminating thereafter. Otherwise, if the communications link has not been successfully established, the process proceeds to operation 2008 as described above.

Figure 21:
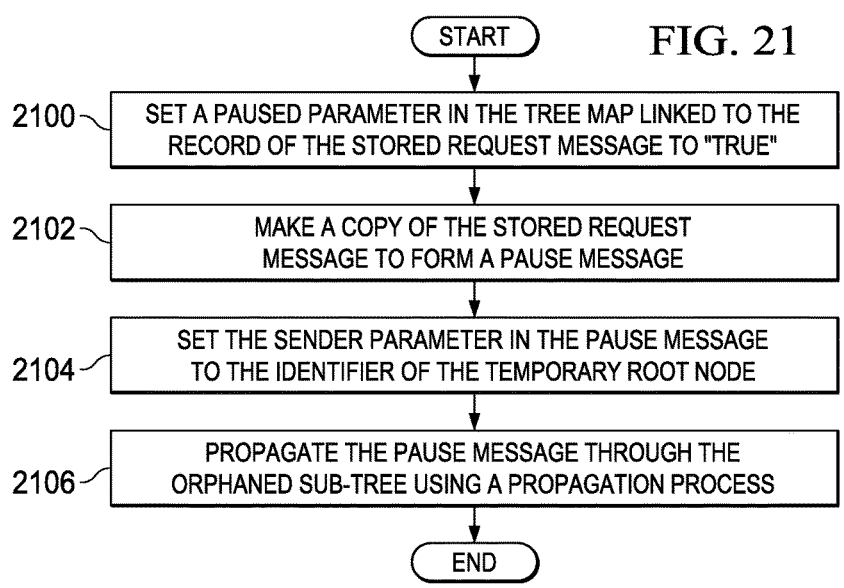
FIG. 21 is an illustration of a process for pausing responses to a query request in the form of a flowchart in accordance with an illustrative embodiment.

With reference now to FIG. 21, an illustration of a process for pausing responses to a query request is depicted in the form of a flowchart in accordance with an illustrative embodiment. The process illustrated in FIG. 21 may be used to implement operation 2000 in FIG. 20A. This process may be performed by the temporary root node.

The temporary root node sets a paused parameter in the tree map linked to the record of the stored request message to "true" (operation 2100). In other words, the temporary root node enters a paused state. Next, the temporary root node makes a copy of the stored request message to form a pause message (operation 2102). The temporary root node sets the sender parameter in the pause message to the identifier of the temporary root node (operation 2104). The temporary root node then propagates the pause message through the orphaned sub-tree using a propagation process (operation 2106), with the process terminating thereafter. This propagation process is described in FIG. 29 below.

Figure 22:
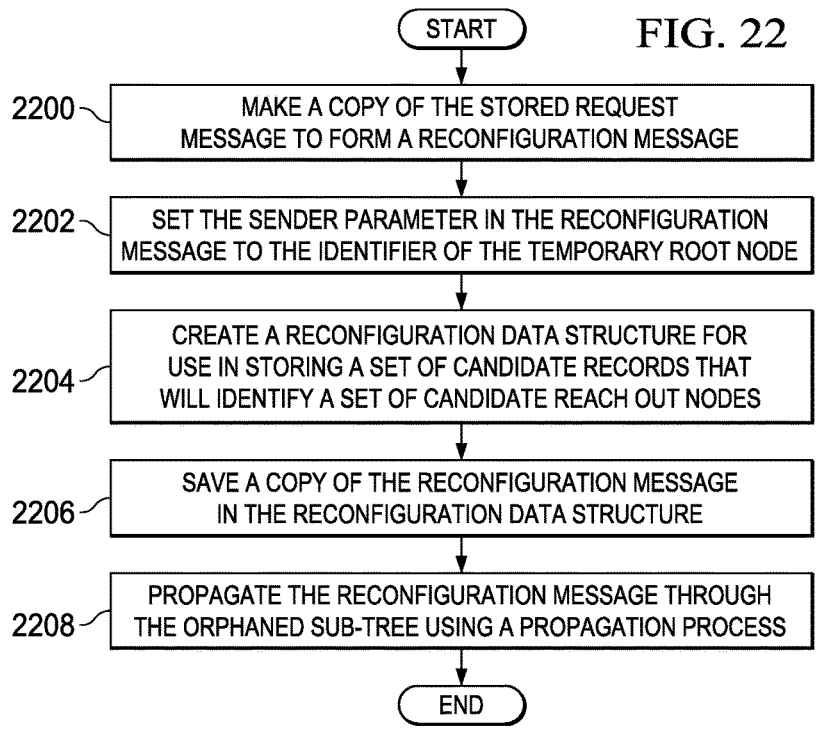
FIG. 22 is an illustration of a process for requesting nodes to identify candidate reach out nodes for reaching out to the root node in the form of a flowchart in accordance with an illustrative embodiment.

With reference now to FIG. 22, an illustration of a process for requesting nodes to identify candidate reach out nodes for reaching out to the root node is depicted in the form of a flowchart in accordance with an illustrative embodiment. The process illustrated in FIG. 22 may be used to implement operation 2002 in FIG. 20A. This process may be performed by the temporary root node.

The temporary root node makes a copy of the stored request message to form a reconfiguration message (operation 2200). The temporary root node sets the sender parameter in the reconfiguration message to the identifier of the temporary root node (operation 2202). The temporary root node creates a reconfiguration data structure for use in storing a set of candidate records that will identify a set of candidate reach out nodes (operation 2204). Each candidate record is for a candidate reach out node.

A candidate record in the reconfiguration data structure identifies a source, a target, and a utility value. The source is the node in the orphaned sub-tree from which reaching out would be performed. In other words, the source is the node in the orphaned sub-tree that identified the candidate reach out node that is outside of the orphaned sub-tree but still within the dynamically formed sub-tree and that has agreed to accept a reach out connection. The target is the candidate reach out node identified by the source. The utility value is a non-negative utility value calculated by the node attempting to reach out to the candidate reach out node for the candidate reach out node. In other words, the utility value is the value that was calculated by the source for the target.

The temporary root node saves a copy of the reconfiguration message in the reconfiguration data structure (operation 2206). Next, the reconfiguration message is propagated through the orphaned sub-tree using a propagation process (operation 2208), with the process terminating thereafter. This propagation process is described in FIG. 29 below.

With reference now to FIGS. 23A and 23B, an illustration of a process for the temporary root node to identify its own candidate reach out node is depicted in the form of a flowchart in accordance with an illustrative embodiment. The process illustrated in FIG. 22 may be used by the temporary root node to identify its own candidate reach out node in operation 2004 in FIG. 20A. This process may be performed by the temporary root node.

The temporary root node identifies a set of neighboring nodes (operation 2300). The temporary root node then identifies a set of potential candidates as the set of neighboring nodes excluding the set of child nodes of the temporary root node and the sender of the stored request message (operation 2302). A potential candidate may be a node outside the orphaned sub-tree but within the originally, dynamically formed spanning tree to which the temporary root node may reach out in order to reach the root node.

The temporary root node then sets the value of the tracking parameter in the stored reconfiguration message in the reconfiguration data structure to zero and the provider parameter in the stored reconfiguration message to "null" (operation 2304). Thereafter, a determination is made as to whether the set of potential candidates is an empty set (operation 2306). If the set of potential candidates is not an empty set, the temporary root node makes a copy of the stored reconfiguration message to form a reach out message (operation 2308). The temporary root node sets the sender parameter in the reach out message to the identifier of the temporary root node (operation 2310).

The reach out message is then sent to each potential candidate in the set of potential candidates (operation 2312). The temporary root node waits to receive a response containing a depth value from a potential candidate (operation 2314). The depth value will be a positive value if the sender of the response has agreed to accept a reach out connection.

Otherwise, the depth value will be a negative value. The depth value is a depth of the potential candidate relative to the root node. In other words, the depth value indicates how many communications steps are needed to reach the root node from the potential candidate.

The temporary root node determines whether the depth value is greater than or equal to zero (operation 2316). If the depth value is greater than or equal to zero, the temporary root node calculates a utility value for the potential candidate based on the depth value using a utility algorithm (operation 2318). The utility value is calculated because the potential candidate has agreed to accept a reach out connection. The utility value is a measure of how good a potential candidate is for reaching out to the root node.

In one illustrative example, the utility algorithm includes calculating the utility value as the reciprocal of the depth value, d, returned from the potential candidate. In other words, the utility value is:

$$U=1/d,$$

where U is the utility value and d is the depth value returned from the potential candidate.

In another illustrative example, how good a potential candidate is may depend on the total communications cost associated with using the potential candidate. The total communications cost may be a function of the depth of the potential candidate relative to the root node. In other words, the total communications cost may be a function of the number of communications steps needed for all nodes in the orphaned sub-tree to reach the root node. In this illustrative example, the higher the utility value, the lower the communications cost associated with using the potential candidate. The lower the utility value, the higher the communications cost associated with using the potential candidate.

In this illustrative example, a node within the orphaned sub-tree, such as temporary root node, may calculate the utility value for a potential candidate to which the node may reach out as follows:

$$U=1/(c+(d+1)\times(n+1)),$$

where c is the communications cost of the orphaned sub-tree rooted at the node performing the calculation, d is the depth value of the potential candidate relative to the root node, and n is the number of descendant nodes of the node performing the calculation.

The descendant nodes, or descendants, of a particular node may include all direct and indirect child nodes of that particular node. The number of descendant nodes of a particular node can be calculated hierarchically. A node that does not have any direct child nodes is referred to as a leaf node. A leaf node's number of descendant nodes is 0.

The communications cost, c, of the sub-tree rooted at the node performing the calculation may be the total number of communications steps needed for all nodes in the sub-tree to send responses to the node performing the calculation. A single communications step may be the sending of a message from one node to another node. The communications cost, c, of the sub-tree rooted at the node, can be calculated hierarchically as the total number of communications steps needed for each direct or indirect child of the node at which the sub-tree is rooted to communicate with the node.

The temporary root node then determines whether the utility value for the potential candidate is greater than the value of the tracking parameter in the stored reconfiguration message (operation 2320). In other words, in operation 2320, a determination is made as to whether the utility value for the potential candidate is better than the value of the tracking parameter in the stored reconfiguration message. If the utility value is greater than the value of the tracking parameter in the stored reconfiguration message, the temporary root node sets the tracking parameter in the stored reconfiguration message to the utility value and the provider parameter in the stored reconfiguration message to the identifier of the potential candidate that sent the response (operation 2322).

Thereafter, a determination may be made as to whether a response has been received from each of the set of potential candidates (operation 2324). If a response has not been received from each of the set of potential candidates, the process proceeds to operation 2314 as described above. In this manner, through operations 2314-2324, each potential candidate that sends a response agreeing to accept a reach out connection is considered for selection as the candidate reach out node to which a reaching node will reach out and connect. The potential candidate having the highest, or best, utility value is the potential candidate that is identified as the candidate reach out node for the temporary root node. In other words, this potential candidate is considered the target with which the candidate reach out node will attempt to form a reach out connection.

With reference again to operation 2324, if a response has been received from each of the set of potential candidates, the temporary root node adds a new candidate record to the reconfiguration data structure based on the stored reconfiguration message (operation 2326), with the process terminating thereafter. In operation 2326, the identifier of the temporary root node is identified as the source in the new candidate record, the final value of the provider parameter in the stored reconfiguration message is identified as the target in the new candidate record, and the final value of the tracking parameter in the stored reconfiguration message is identified as the utility value in the new candidate record. The final value of the provider parameter in the stored reconfiguration message identifies the best candidate reach out node selected by the temporary root node.

With reference again to operation 2320, if the utility value of the potential candidate is not greater than the value of the tracking parameter in the stored reconfiguration message, the process proceeds to operation 2324 directly. Further, with reference again to operation 2316, if the depth value is not greater than or equal to zero, the process proceeds to operation 2324 directly. With reference again to operation 2306, if the set of candidate reach out nodes is an empty set, the process terminates since no reach out is possible from the temporary root node, with the default record having the tracking parameter set to 0 and the provider parameter set to "NULL" being kept in the reconfiguration data structure.

Figure 24:
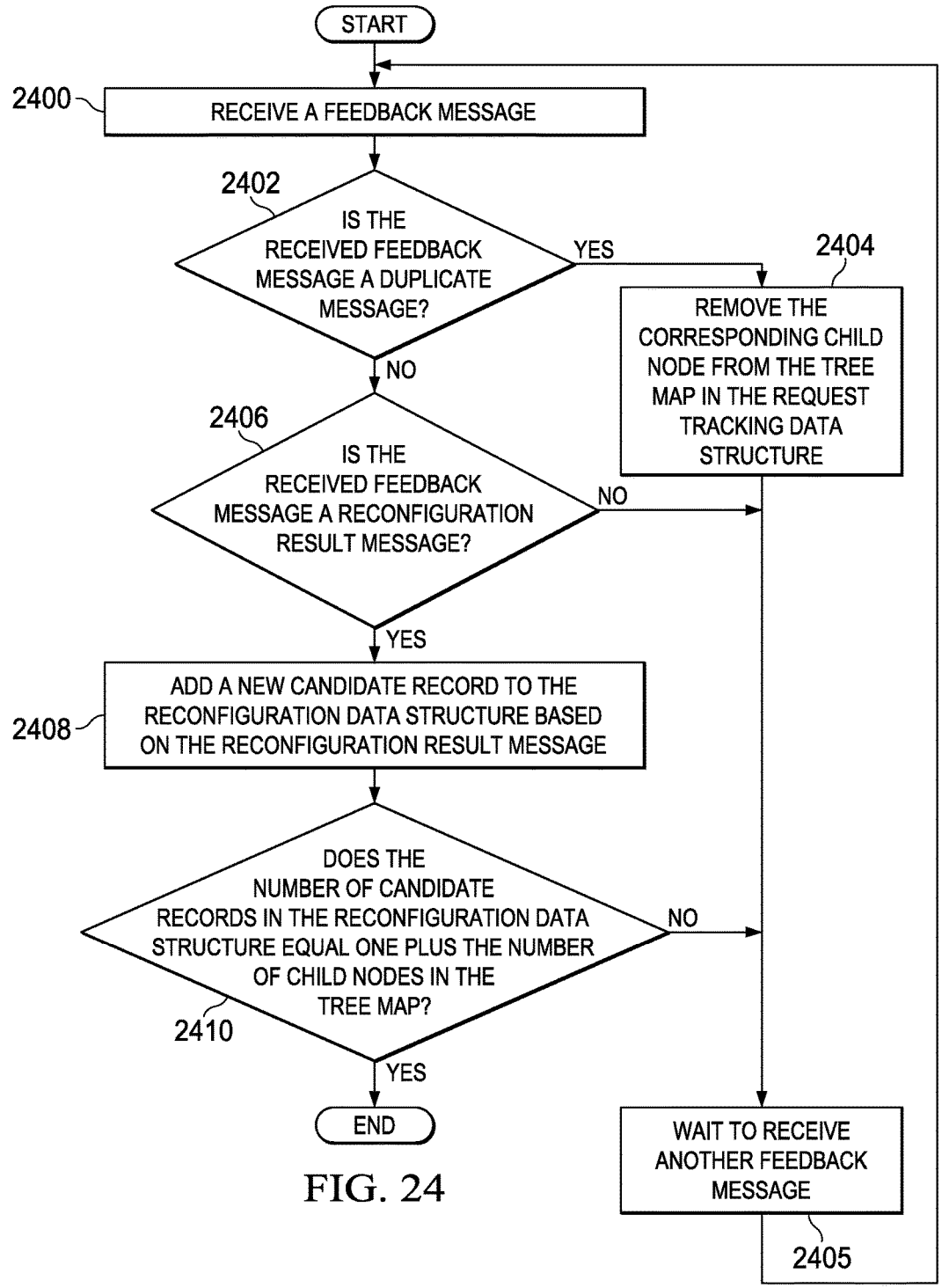
FIG. 24 is an illustration of a process for collecting and processing feedback messages in the form of a flowchart in accordance with an illustrative embodiment.

With reference now to FIG. 24, an illustration of a process for collecting and processing feedback messages is depicted in accordance with an illustrative embodiment. The process illustrated in FIG. 24 may be used to implement the collection and processing of feedback messages in operation 2004 in FIG. 20A. This process may be performed to receive and process each feedback message received at the temporary root node in response to the reconfiguration message sent from the temporary root node.

A feedback message may be either a duplicate message or a reconfiguration result message. A reconfiguration result message may be a response to a reconfiguration message.

The process begins by receiving a feedback message (operation 2400). The temporary root node determines whether the received feedback message is a duplicate message (operation 2402). A duplicate message may be received from a node when the node has decided not to participate in the rerouting process due to, for example, without limitation, the node previously having sent a response message in response to a request message and the node having already cleared the record of this request message from the request tracking data structure managed by the node.

With reference to operation 2402, if the received feedback message is a duplicate message, the temporary root node removes the corresponding child node from the tree map in the request tracking data structure (operation 2404). The corresponding child node is the child node in the tree map as identified by the sender parameter in the received duplicate message. The temporary root node then waits to receive a feedback message (operation 2405), with the process then returning to operation 2400 as described above.

Otherwise, if the received feedback message is not a duplicate message, the temporary root node determines whether the received feedback message is a reconfiguration result message (operation 2406). A reconfiguration result message may be received from a node as a response to a reconfiguration message received at that node. If the received feedback message is not a reconfiguration result message, the process proceeds to operation 2405 as described above.

Otherwise, if the received feedback message is a reconfiguration result message, the temporary root node adds a new candidate record based on the reconfiguration result message to the reconfiguration data structure (operation 2408). In operation 2408, the values of the sender parameter, the provider parameter, and the tracking parameter in the reconfiguration result message are used as the source, the target, and the utility value, respectively, for the new candidate record. When the tracking parameter in the reconfiguration result message is zero, this indicates that the sender of the reconfiguration result message was unable to identify a candidate reach out node.

A determination is then made as to whether the number of candidate records in the reconfiguration data structure equals one plus the number of child nodes in the tree map (operation 2410). In other words, in operation 2410, a determination is made as to whether all nodes have finished identifying candidate reach out nodes and responded with a reconfiguration result message, including one candidate reach out node for the temporary root node itself and one candidate reach out node for each child node identified in the tree map.

If the number of candidate records in the reconfiguration data structure equals one plus the number of child nodes in the tree map, the process terminates. Otherwise, the process proceeds to operation 2405 as described above.

In some cases, the process described in FIG. 24 and the process described in FIGS. 23A and 23B may be performed concurrently. The check for determining whether the number of candidate records in the reconfiguration data structure equals one plus the number of child nodes in the tree map may be performed each time a candidate record is added to the reconfiguration data structure. For example, operation 2410 may also be performed after operation 2326 in FIG. 23B. If, after operation 2326 in FIG. 23B, the number of candidate records in the reconfiguration data structure equals one plus the number of child nodes in the tree map, the process may terminate. Otherwise, the process may proceed to operation 2405 in FIG. 24.

Figure 25:
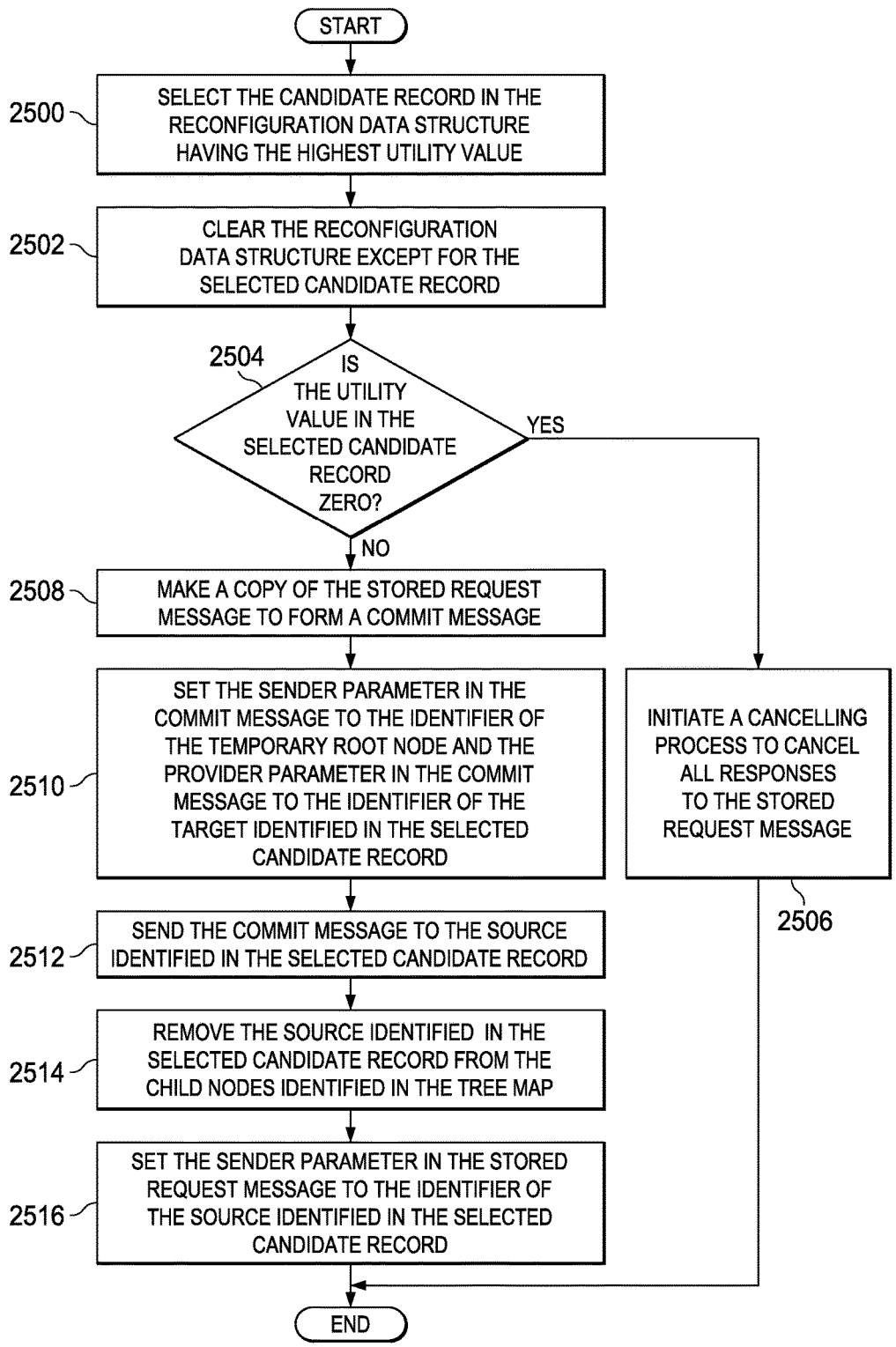
FIG. 25 is an illustration of a process for identifying the reach out node to be used in the form of a flowchart in accordance with an illustrative embodiment.
Figures 1, 26A:
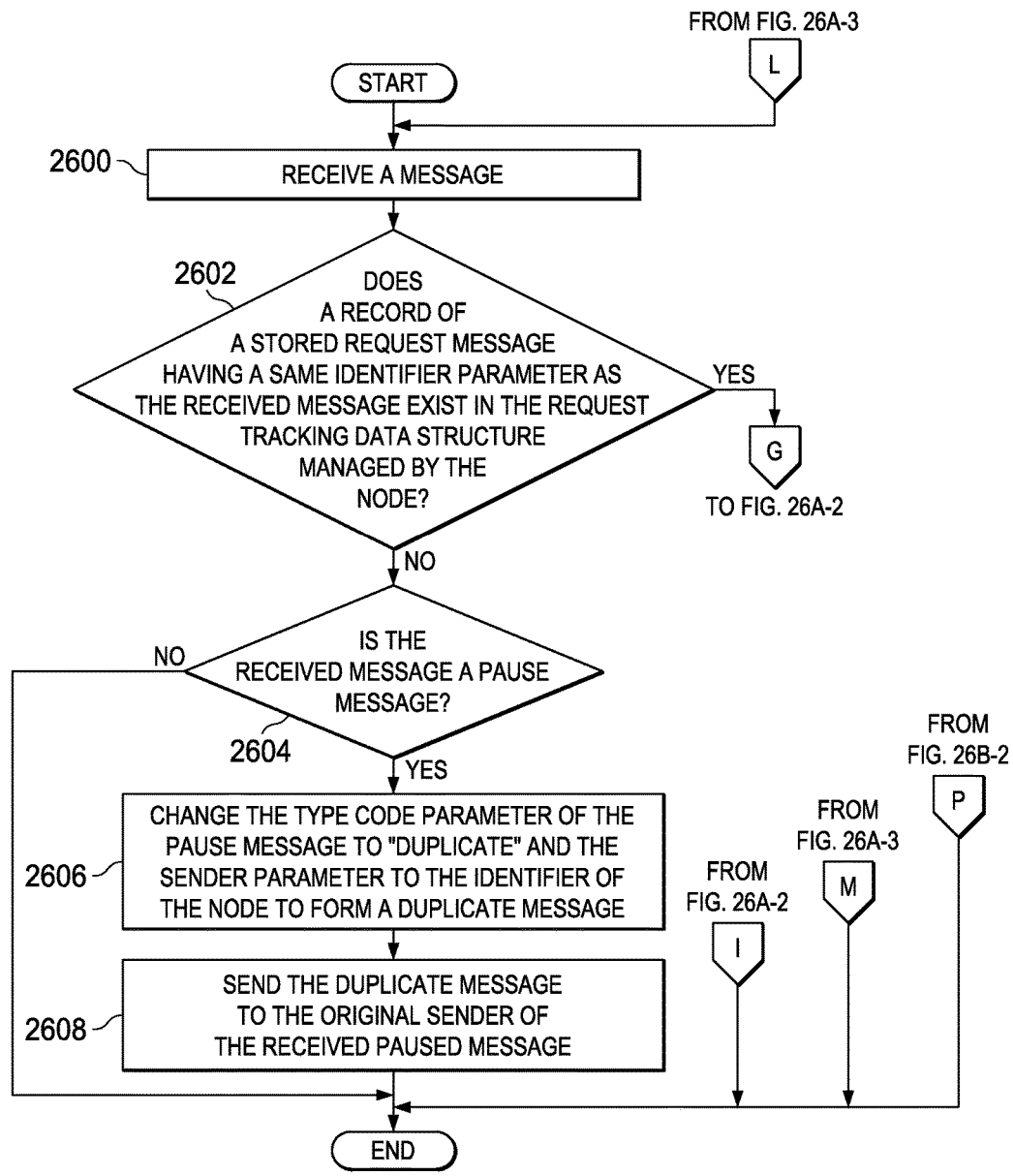
Figures 2, 26A:
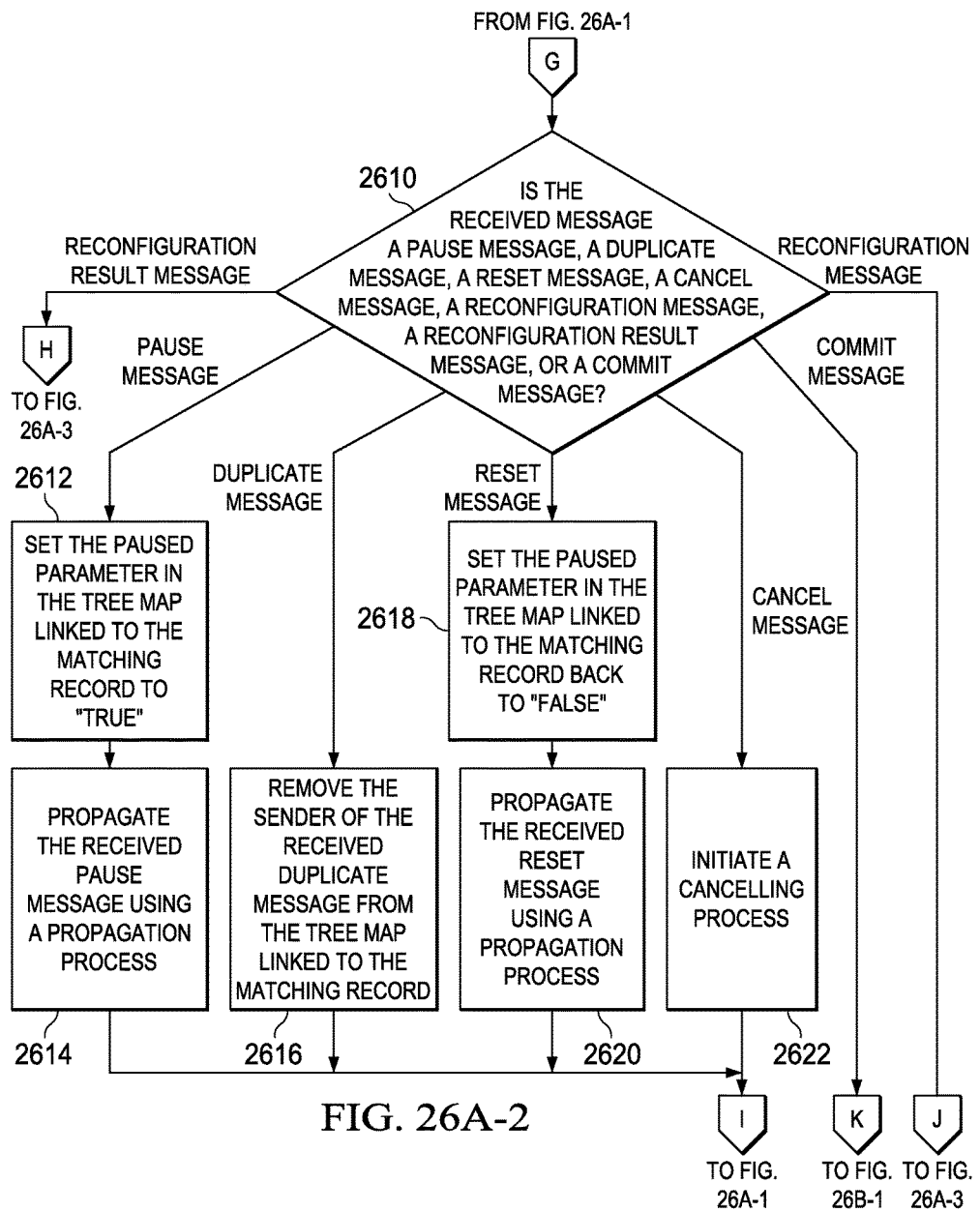
Figures 3, 26A:
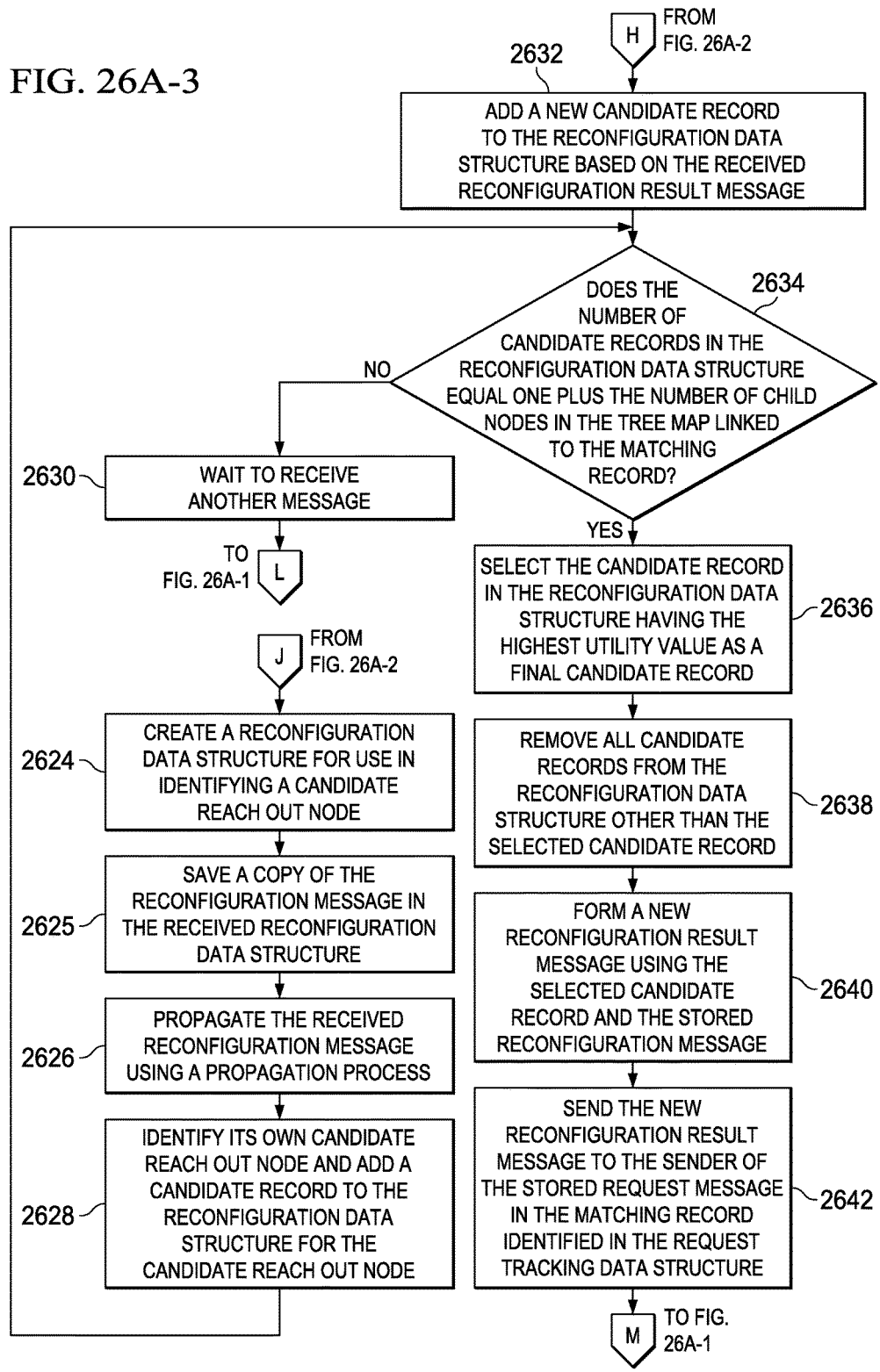
Figures 2, 26B:
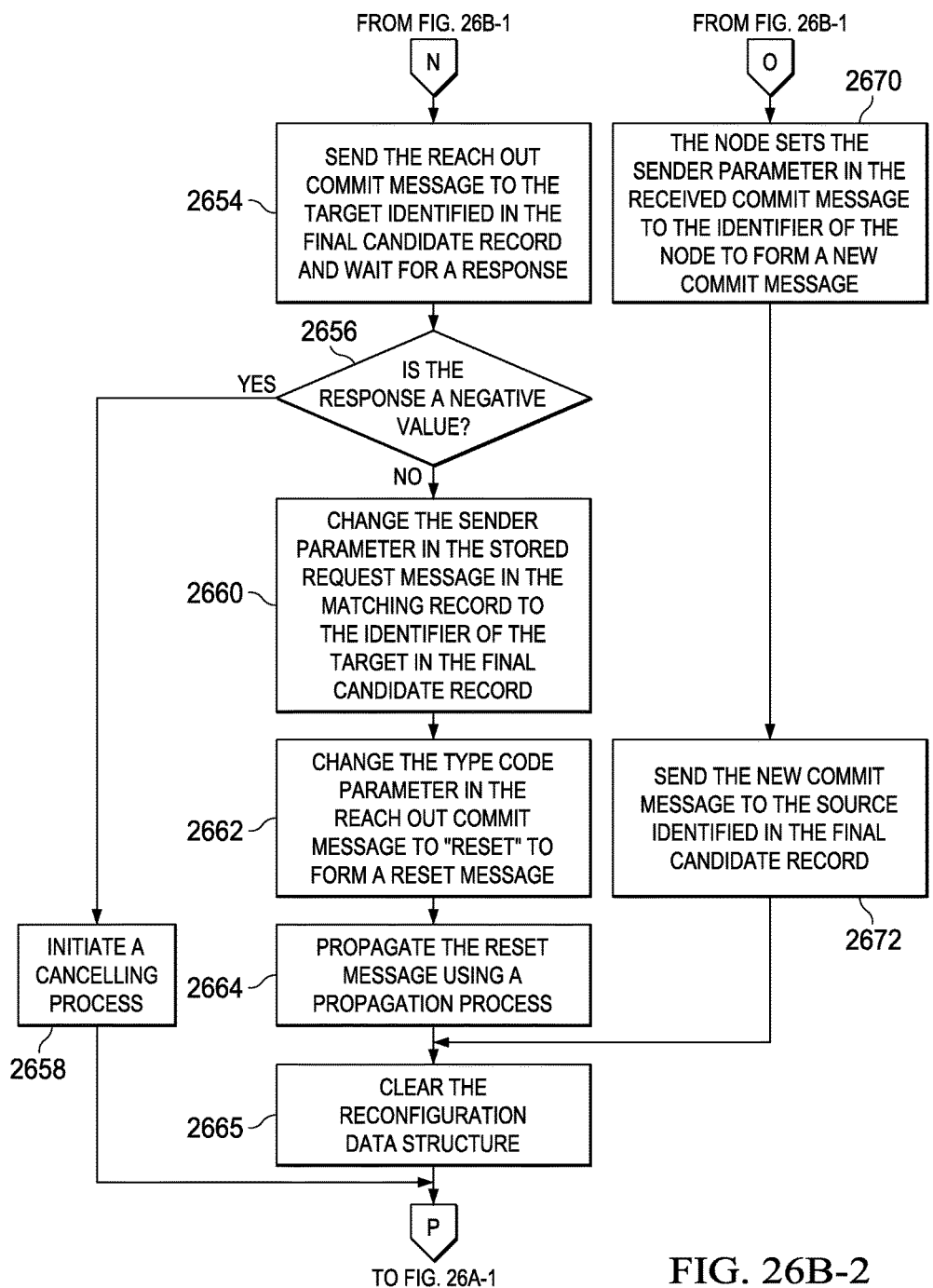

With reference now to FIG. 25, an illustration of a process for identifying the reach out node to be used is depicted in the form of a flowchart in accordance with an illustrative embodiment. The process illustrated in FIG. 25 may be used to implement operation 2006 in FIG. 20A. This process may be performed once the process described in FIG. 24 has been completed.

The process begins by selecting the candidate record in the reconfiguration data structure having the highest utility value (operation 2500). In operation 2500, if the utility values of all the candidate records are zero, the temporary root node selects the first candidate record. Next, the temporary root node clears the reconfiguration data structure (operation 2502). In operation 2502, the reconfiguration data structure is made an empty data structure.

A determination is then made as to whether the utility value in the selected candidate record is zero (operation 2504). If this utility value is zero, the temporary root node initiates a cancelling process to cancel all responses to the stored request message (operation 2506), with the process terminating thereafter.

Otherwise, if the utility value is not zero, the temporary root node makes a copy of the stored request message to form a commit message (operation 2508). The temporary root node sets the sender parameter in the commit message to the identifier of the temporary root node and the provider parameter in the commit message to the identifier of the target identified in the selected candidate record (operation 2510). The temporary root node then sends the commit message to the source identified in the selected candidate record (operation 2512).

The source identified in the selected candidate record may be the node in the orphaned sub-tree that is able to form the best reach out connection with a node outside the orphaned sub-tree or may be the direct or indirect parent of the node that is able to form the best reach out connection. The process by which the commit message reaches the node having the best reach out connection is described in FIGS. 26A-1, 26A-2, 26A-3, 26B-1, and 26B-2.

Thereafter, the temporary root node removes the source identified in the selected candidate record from the child nodes identified in the tree map (operation 2514). Thereafter, the temporary root node sets the sender parameter in the stored request message to the identifier of the source identified in the selected candidate record (operation 2516), with the process terminating thereafter. Operations 2512, 2514, and 2516 are used to reverse the parent-child relationship until a new temporary root node is reached for the orphaned sub-tree. The process then terminates.

With reference now to FIGS. 26A-1, 26A-2, 26A-3, 26B-1, and 26B-2, an illustration of a process for receiving and responding to messages involved in the rerouting process is depicted in the form of a flowchart in accordance with an illustrative embodiment. The process illustrated in FIGS. 26A-1, 26A-2, 26A-3, 26B-1, and 26B-2 may be implemented when a node receives a message that is part of the rerouting process.

This type of message may be referred to as an orchestration message in some cases. The orchestration message may be, for example, without limitation, a pause message, a duplicate message, a reconfiguration message, a reconfiguration result message, a commit message, a reset message, a cancel message, or some other type of message. The process described in FIGS. 26A-1, 26A-2, 26A-3, 26B-1, and 26B-2 may be implemented by any node in the orphaned sub-tree other than the temporary root node.

The process begins by a node receiving a message (operation 2600). The node then determines whether a record of a stored request message having a same identifier parameter as the received message exists in the request tracking data structure managed by the node (operation 2602). The record may not exist when the node has already responded to the query request and has cleared the record from the request tracking data structure by the time the message is received at the node.

If the record does not exist, the node determines whether the received message is a pause message (operation 2604). If the received message is not a pause message, the process terminates. Otherwise, the node changes the type code parameter of the pause message to "duplicate" and the sender parameter to the identifier of the node to form a duplicate message (operation 2606). The node then sends the duplicate message to the original sender of the received pause message (operation 2608), with the process terminating thereafter. By sending the duplicate message to the sender of the received pause message, the node informs the sender that the node cannot participate in the rerouting process.

With reference again to operation 2602, if the record exists, the node determines whether the received message is a pause message, a duplicate message, a reset message, a cancel message, a reconfiguration message, a reconfiguration result message, or a commit message (operation 2610). The record that exists may herein be referred to as the matching record.

In operation 2610, if the received message is a pause message, the node sets the paused parameter in the tree map linked to the matching record to "true" (operation 2612). In this manner, the node enters a pause state in which any responding to the stored request message is paused. Thereafter, the node propagates the received pause message using a propagation process (operation 2614), with the process terminating thereafter.

With reference again to operation 2610, if the received message is a duplicate message, the node removes the sender of the received duplicate message from the tree map linked to the matching record (operation 2616). The process then terminates. If, in operation 2610, the received message is determined to be a reset message, the node sets the paused parameter in the tree map linked to the matching record back to "false" (operation 2618). In other words, the node returns to an unpaused state. The node then propagates the received reset message using a propagation process (operation 2620), with the process then terminating. If, in operation 2610, the received message is determined to be a cancel message, the node initiates a cancelling process (operation 2622), with the process terminating thereafter.

With reference again to operation 2610, if the received message is a reconfiguration message, the node creates a reconfiguration data structure for use in identifying a candidate reach out node (operation 2624). The node saves a copy of the received reconfiguration message in the reconfiguration data structure (operation 2625). The reconfiguration message stored in the reconfiguration data structure may be referred to as a stored reconfiguration message.

The node propagates the received reconfiguration message using a propagation process (operation 2626). Further, the node then identifies its own candidate reach out node and adds a candidate record to the reconfiguration data structure for the candidate reach out node (operation 2628). Operation 2628 may be performed in a manner similar to the manner in which the temporary root node identifies its own candidate reach out node in the process described in FIGS. 23A and 23B.

Further, the node waits to receive another message (operation 2630), with the process then returning to operation 2600 as described above. The message received may be, for example, another orchestration message. The orchestration message may be, for example, a feedback message from a child node of the node that takes the form of either a duplicate message or a reconfiguration result message.

With reference again to operation 2610, if the received message is a reconfiguration result message, the node adds a new candidate record to the reconfiguration data structure based on the received reconfiguration result message (operation 2632). In particular, in operation 2632, the values of the sender parameter, the provider parameter, and the tracking parameter in the reconfiguration result message are used as the source, the target, and the utility value, respectively, for the new candidate record.

The node then determines whether the number of candidate records in the reconfiguration data structure equals one plus the number of child nodes in the tree map linked to the matching record (operation 2634). If the number of candidate records in the reconfiguration data structure does not equal one plus the number of child nodes in the tree map, the process proceeds to operation 2630 as described above.

Otherwise, the node selects the candidate record in the reconfiguration data structure having the highest utility value as a final candidate record (operation 2636). In operation 2636, if the utility values of all the candidate records are zero, the node selects the first candidate record in the reconfiguration data structure.

Next, the node clears the reconfiguration data structure except for the final candidate record (operation 2638). The remaining candidate record may be referred to as the final candidate record. The node forms a new reconfiguration result message using the final candidate record and the stored reconfiguration message (operation 2640). The stored reconfiguration message is the reconfiguration message to which the received reconfiguration result message is responding.

In operation 2640, the node makes a copy of the stored reconfiguration message to form the new reconfiguration result message. Further, in operation 2640, the node sets the provider parameter in the new reconfiguration result message to the identifier of the node identified as the target in the selected candidate record. The node sets the type code parameter in the new reconfiguration result message to "reconfiguration result" and the sender parameter in the new reconfiguration result message to the identifier of the node. Further, the node sets the tracking parameter in the new reconfiguration result message to the utility value in the selected candidate record.

Thereafter, the node sends the new reconfiguration result message to the sender of the stored request message in the matching record identified in the request tracking data structure (operation 2642). The process then terminates.

With reference again to operation 2610, if the received message is a commit message, the node adds the sender of the received commit message to the child nodes identified in the tree map as a new child node (operation 2644). The node then initializes a new parent-child relationship by setting the request index for the new child node to one and the response index for the new child node to zero (operation 2646).

The node determines whether the value of the provider parameter in the received commit message matches the identifier of the target in the final candidate record in the reconfiguration data structure and whether the node itself is identified as the source in the final candidate record in the reconfiguration data structure (operation 2648). If both conditions in operation 2648 are determined to be true, the node makes a copy of the received commit message to form a reach out commit message (operation 2650). In operation 2650, the node is now the new temporary root node of this orphaned sub-tree. The node sets the sender parameter in the reach out commit message to the identifier of the node (operation 2652).

The node then sends the reach out commit message to the target identified in the final candidate record and waits for a response (operation 2654). The node determines whether the response is a negative value (operation 2656). When the response is a negative value, such as negative one, the reach out connection from the node to the node identified as the target in the final candidate record has not succeeded.

With reference to operation 2656, if the response is a negative value, the node initiates a cancelling process (operation 2658), with the process terminating thereafter. If the response is not a negative value, the node changes the sender parameter in the stored request message in the matching record to the identifier of the target identified in the final candidate record (operation 2660). Operation 2660 establishes a child-parent relationship from the node to the target such that the target is now the parent of the node.

The node then changes the type code parameter in the reach out commit message to "reset" to form a reset message (operation 2662). The node propagates the reset message using a propagation process (operation 2664). The process then clears the reconfiguration data structure (operation 2665), with the process terminating thereafter.

With reference again to operation 2648, if at least one of the conditions is not true, the node removes the source identified in the final candidate record from the child nodes in the tree map (operation 2666). The node then sets the sender parameter in the stored request message in the matching record to the identifier of the source identified in the final candidate record (operation 2668). The node sets the sender parameter in the received commit message to the identifier of the node to form a new commit message (operation 2670). The node then sends the new commit message to the source identified in the final candidate record (operation 2672). The process then proceeds to operation 2665 as described above.

Figure 27:
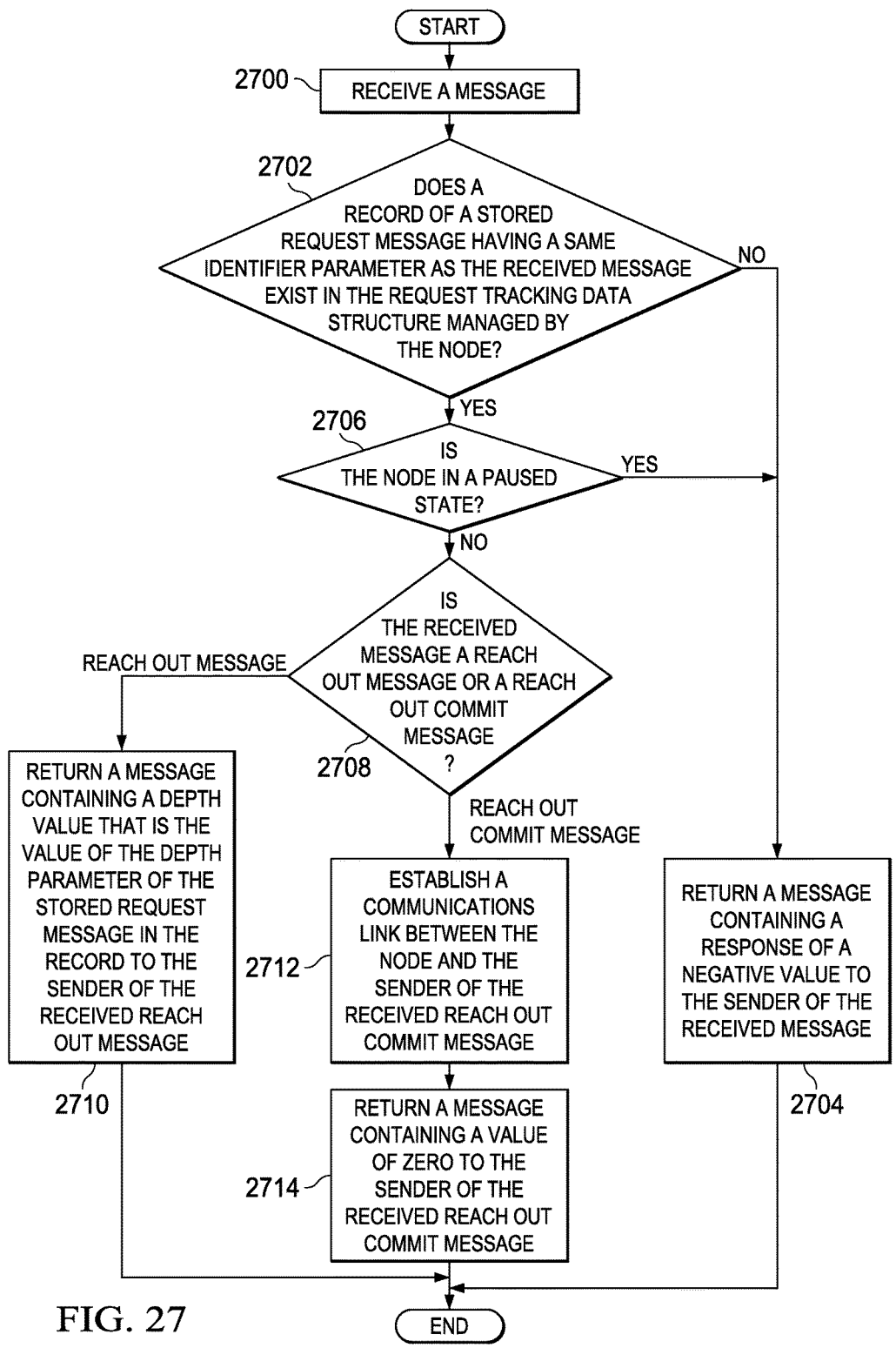
FIG. 27 is an illustration of a process for responding to reach out and reach out commit messages received at a node in the form of a flowchart in accordance with an illustrative embodiment.

With reference now to FIG. 27, an illustration of a process for responding to reach out and reach out commit messages received at a node is depicted in the form of a flowchart in accordance with an illustrative embodiment. The process described in FIG. 27 may be implemented by a node outside of the orphaned sub-tree. This process may be performed by a node outside the orphaned sub-tree that is a potential candidate for accepting a reach out connection or a node that has already been selected as a candidate reach out node, for example.

The process begins by the node receiving a message (operation 2700). The received message may be a reach out message or a reach out commit message.

The node then determines whether a record of a stored request message having a same identifier parameter as the received message exists in the request tracking data structure managed by the node (operation 2702). If the record does not exist, the node returns a message containing a response of a negative value to the sender of the received message (operation 2704), with the process terminating thereafter. The negative value may be, for example, negative one. This negative value indicates that the node cannot be a candidate reach out node for the sender of the received message.

With reference again to operation 2702, if the record does exist, the node determines whether the node is in a paused state (operation 2706). This determination is made by determining whether the paused parameter in the tree map linked to the record is set to "true." If the node is in a paused state, the process proceeds to operation 2704 as described above. Otherwise, the node determines whether the received message is a reach out message or a reach out commit message (operation 2708).

If the received message is a reach out message, the node returns a message containing a depth value that is the value of the depth parameter of the stored request message in the record to the sender of the received reach out message (operation 2710), with the process terminating thereafter. If the received message is a reach out commit message, the node establishes a communications link between the node and the sender of the received reach out commit message (operation 2712). The node then returns a message containing a value of zero to the sender of the received reach out commit message (operation 2714), with the process terminating thereafter.

Figure 28:
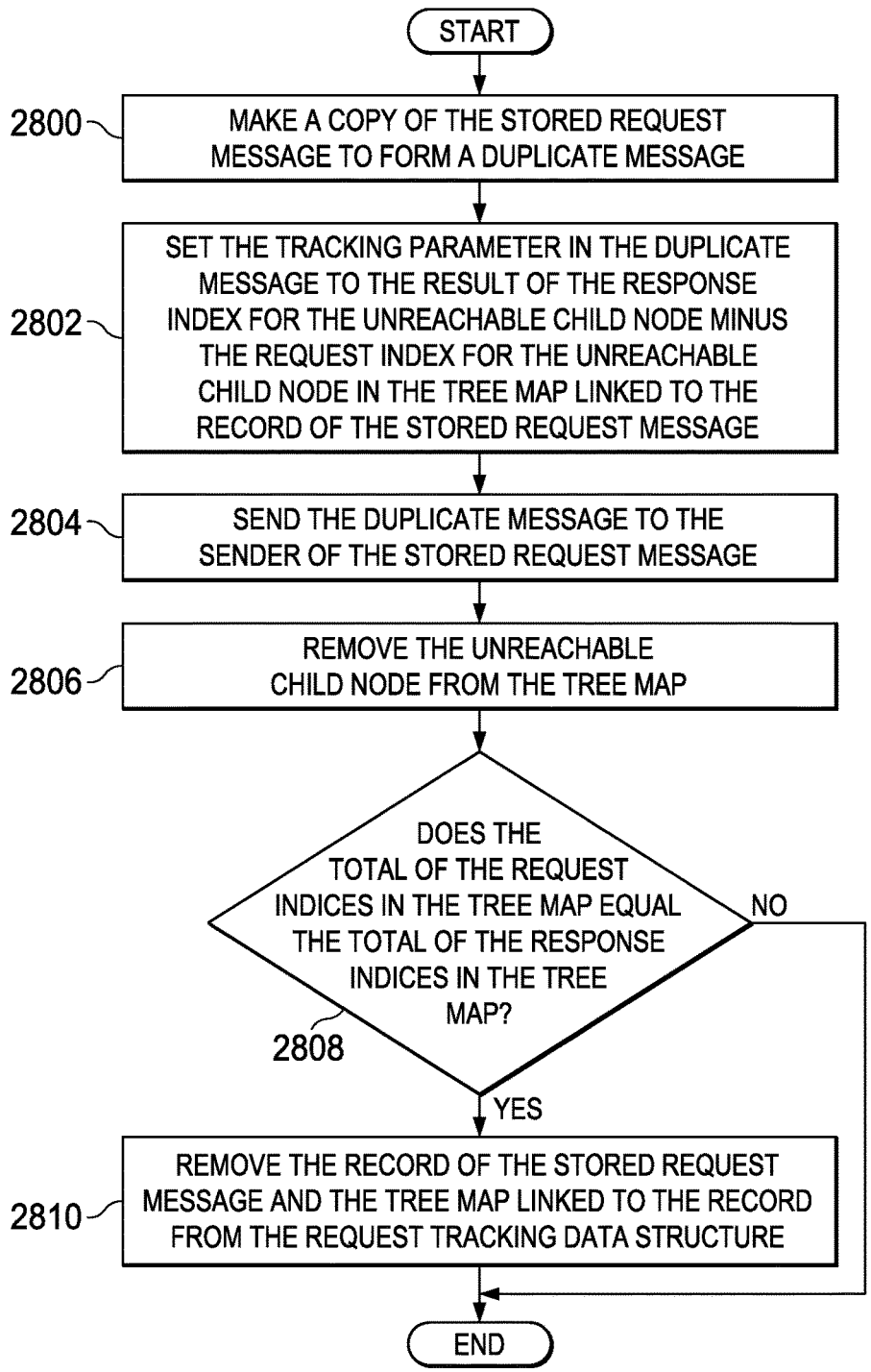
FIG. 28 is an illustration of an adjustment process for handling an unreachable child node in the form of a flowchart in accordance with an illustrative embodiment.

With reference now to FIG. 28, an illustration of an adjustment process for handling an unreachable child node is depicted in accordance with an illustrative embodiment. The process illustrated in FIG. 28 may be an example of one implementation for the adjustment process initiated in operation 1916 in FIG. 19 for handling an unreachable child node. The unreachable child node may be one of the child nodes identified in the tree map linked to the record of the stored request message in the request tracking data structure managed by the node.

The process begins by making a copy of the stored request message to form a duplicate message (operation 2800). The node sets the tracking parameter in the duplicate message to the result of the response index for the unreachable child node minus the request index for the unreachable child node in the tree map linked to the record of the stored request message (operation 2802).

The node then sends the duplicate message to the sender of the stored request message (operation 2804). Further, the node removes the unreachable child node from the tree map (operation 2806). In other words, the node adjusts the tree map.

The node then determines whether the total of the request indices in the tree map equals the total of the response indices in the tree map (operation 2808). If the total of the request indices does not equal the total of the response indices, the process terminates. Otherwise, the node removes the record of the stored request message and the tree map linked to the record from the request tracking data structure (operation 2810), with the process terminating thereafter. Operation 2810 may be performed such that the unreachable node is removed from the spanning tree and such that any remaining response messages from the unreachable child node and any descendent nodes of the unreachable child node are no longer expected at the node.

In this manner, using the process described in FIG. 28, the result calculated in operation 2802 may be propagated in the tracking parameter in the duplicate message to all parent nodes of the node such that each of the parent nodes can adjust a respective request index that accounts for the unreachable child node by the result such that any remaining response messages from the unreachable child node and descendants of the unreachable child node are no longer expected at the parent nodes.

Figure 29:
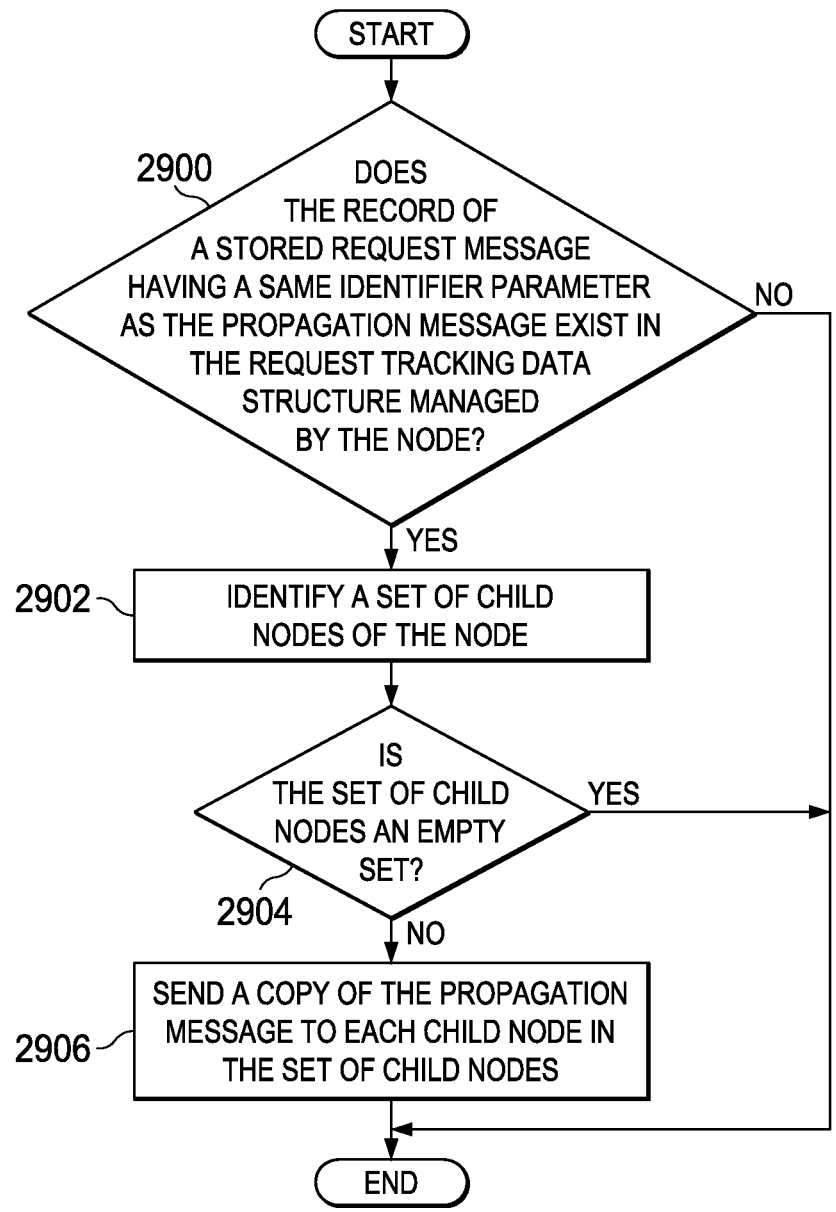
FIG. 29 is an illustration of a propagation process in the form of a flowchart in accordance with an illustrative embodiment.

With reference now to FIG. 29, an illustration of a propagation process is depicted in the form of a flowchart in accordance with an illustrative embodiment. The process described in FIG. 29 may be an example of one manner in which the propagation processes described in operation 2106 in FIG. 21, operation 2208 in FIG. 22, and operations 2614, 2620, 2626, and 2664 in FIGS. 26A-2, 26A-3, and 26B-2 may be implemented. This process is used to propagate a message from a node to any child nodes of the node. The message to be propagated may herein be referred to as the propagation message.

The process begins by determining whether a record of a stored request message having a same identifier parameter as the propagation message exists in the request tracking data structure managed by the node (operation 2900). If the record does not exist, the process terminates. Otherwise, the node identifies a set of child nodes of the node (operation 2902). The node determines whether the set of child nodes is an empty set (operation 2904). If the set of child nodes is an empty set, the process terminates. Otherwise, the node sends a copy of the propagation message to each child node in the set of child nodes (operation 2906), with the process terminating thereafter.

Figure 30:
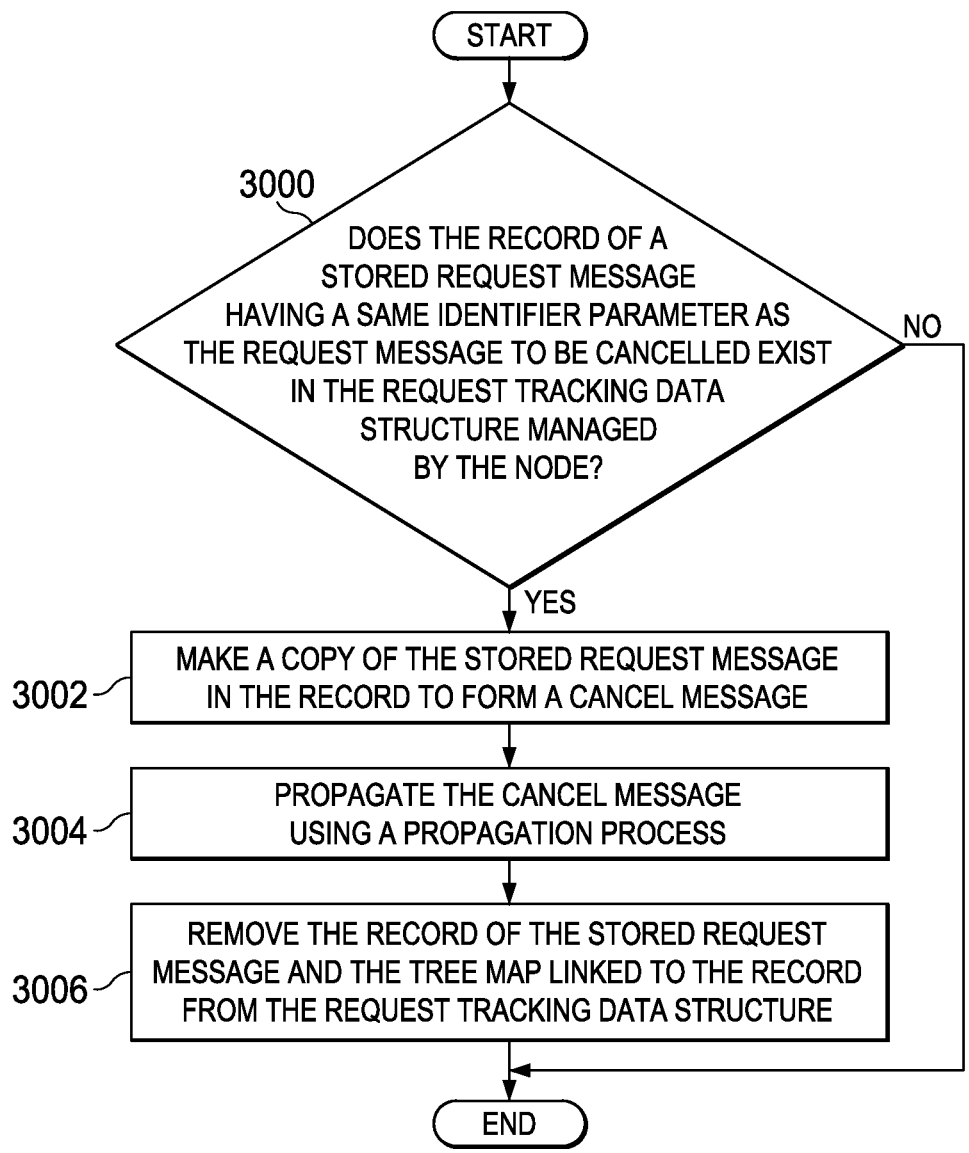
FIG. 30 is an illustration of a cancelling process in the form of a flowchart in accordance with an illustrative embodiment.

With reference now to FIG. 30, an illustration of a cancelling process is depicted in the form of a flowchart in accordance with an illustrative embodiment. The process described in FIG. 30 may be an example of one manner in which the cancelling processes described in operation 2008 in FIG. 20B, operation 2506 in FIG. 25, and operations 2622 and 2658 in FIGS. 26A-2 and 26B-2 may be implemented. This process is used by a node to cancel the responding of any child node of the node to a request message.

The process begins by determining whether a record of a stored request message having a same identifier parameter as the request message to be cancelled exists in the request tracking data structure managed by the node (operation 3000). If the record does not exist, the process terminates. Otherwise, the node makes a copy of the stored request message in the record to form a cancel message (operation 3002). The node then propagates the cancel message using a propagation process (operation 3004). Operation 3004 may be performed using the propagation process described in FIG. 2929.

Thereafter, the node removes the record of the stored request message and the tree map linked to the record from the request tracking data structure (operation 3006), with the process terminating thereafter.

The overall process for performing data analysis as described in FIGS. 6-12 and the overall process for performing data analysis described in FIGS. 13-18 may be examples of how data analysis may be performed within a dynamic network, such as dynamic network 406 in FIG. 4. Further, the overall process for handling undesired events as described in FIGS. 19-30 may be examples of how undesired events that occur within dynamic network 406 in FIG. 4 may be handled.

Further, FIGS. 6-30 are not meant to imply any limitations to the manner in which an illustrative embodiment may be implemented. One or more of the operations described in FIGS. 6-30 may be combined, divided, or combined and divided into different operations when implemented in a different illustrative embodiment. Further, one or more operations may be performed prior to one or more other operations or performed concurrently with one or more other operations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A dynamic network comprising:
   a plurality of nodes; and
   a root node in the plurality of nodes in which the root node is configured to generate a query request and propagate the query request through the plurality of nodes in a number of request messages,
     wherein the root node is configured to receive a number of response messages responding to the query request from other nodes in the dynamic network and to perform data analysis using data contained in the number of response messages;
     wherein each response message in the number of response messages includes a tracking parameter that is used to update a request index that keeps count of the number of request messages propagated through the dynamic network;
     wherein the root node increments a response index keeping count of the number of response messages received at the root node each time a response message is received at the root node; and
     wherein the data analysis is completed when the request index equals the response index.

2. The dynamic network of claim 1, wherein a size of the dynamic network changes over time.

3. The dynamic network of claim 1, wherein the number of request messages is propagated through the dynamic network in a manner that forms a dynamically formed spanning tree that is rooted at the root node.

4. The dynamic network of claim 1, wherein multiple query requests generated by multiple root nodes in the plurality of nodes may be propagated through the dynamic network concurrently in which propagation of each of the multiple query requests from one of the multiple root nodes dynamically forms a spanning tree that is rooted at the one of the multiple root nodes.

5. The dynamic network of claim 1, wherein a node in the plurality of nodes is configured to detect an occurrence of an undesired event.

6. The dynamic network of claim 5, wherein the node is configured to initiate a rerouting process when the undesired event is an unreachable parent node and an adjustment process when the undesired event is an unreachable child node.

7. The dynamic network of claim 6, wherein the rerouting process is used to identify a reach out node for use in sending messages to the root node, and to reconfigure an orphaned sub-tree to be rooted at the reach out node, wherein the orphaned sub-tree was previously rooted at the unreachable parent node.

8. The dynamic network of claim 6, wherein the adjustment process calculates a result of subtracting the request index for the unreachable child node from a response index for the unreachable child node; propagates the result in the tracking parameter to parent nodes of the node such that each of the parent nodes can adjust a respective request index that accounts for the unreachable child node by the result such that remaining response messages from the unreachable child node and any descendants of the unreachable child node are no longer expected at the parent nodes; and removes the unreachable child node from a tree map managed by the node such that a response message from the unreachable child node is no longer expected at the node.

9. The dynamic network of claim 1 further comprising:
a node in the plurality of nodes configured to at least one of send and receive a message, wherein the message has a message structure comprising a payload and a number of parameters in which the number of parameters include at least one of an originator parameter, an identifier parameter, a type code parameter, a sender parameter, a visited nodes parameter, a tracking parameter, a provider parameter, and a depth parameter.

10. The dynamic network of claim 9, wherein the type code parameter has a value that indicates that the message is one of a request message, a duplicate message, a response message, a reconfiguration message, a reconfiguration result message, a pause message, a commit message, a reach out message, a reach out commit message, a reset message, and a cancel message.

11. A dynamic network comprising:
a plurality of nodes; and
a root node in the plurality of nodes in which the root node is configured to generate a query request and propagate the query request through the plurality of nodes in a number of request messages in a manner that forms a dynamically formed spanning tree that is rooted at the root node,
wherein the root node is configured to receive a number of response messages responding to the query request from other nodes in the dynamic network and to perform data analysis using data contained in the number of response messages;
wherein each response message in the number of response messages includes a tracking parameter that is used to update a request index that keeps count of the number of request messages propagated through the dynamic network;
wherein the root node increments a response index keeping count of the number of response messages received at the root node each time a response message is received at the root node; and
wherein the data analysis is completed when the request index equals the response index.

12. A method for performing data analysis within a dynamic network, the method comprising:
propagate a query request generated by a root node in the dynamic network through other nodes in the dynamic network in a number of request messages;
receiving a number of response messages responding to the query request from the other nodes in the dynamic network at the root node;
performing the data analysis at the root node using data contained in the number of response messages as the number of response messages is received;
updating a request index that keeps count of the number of request messages propagated through the dynamic network using a tracking parameter in each of the number of response messages;
incrementing a response index used to keep count of the number of response messages received at the root node each time a response message is received at the root node; and
determining the data analysis is complete in response to a determination that the request index equals the response index.

13. The method of claim 12 further comprising:
detecting, at a node within the dynamic network, an occurrence of an undesired event within a spanning tree formed within the dynamic network;
determining whether the undesired event is an unreachable parent node of the node or an unreachable child node of the node;
performing a rerouting process in response to a determination that the undesired event is the unreachable parent node; and
performing an adjustment process in response to a determination that the undesired event is the unreachable child node.

14. The method of claim 13, wherein performing the rerouting process in response to the determination that the undesired event is the unreachable parent node comprises:
identifying a set of candidate reach out nodes for use in reaching out to the root node from an orphaned sub-tree rooted at the node;
selecting one of the set of candidate reach out nodes as a reach out node to use in reaching out to the root node; and
reconfiguring the orphaned sub-tree to be rooted at the reach out node.

15. The method of claim 13, wherein performing the adjustment process in response to the determination that the undesired event is the unreachable child node comprises:
calculating a result of subtracting the request index for the unreachable child node from a response index for the unreachable child node;
propagating the result in the tracking parameter to parent nodes of the node such that each of the parent nodes can adjust a respective request index that accounts for the unreachable child node by the result such that remaining response messages from the unreachable child node and any descendants of the unreachable child node are no longer expected at the parent nodes; and
removing the unreachable child node from the spanning tree such that any remaining response messages from the unreachable child node and any descendent nodes of the unreachable child node are no longer expected at the node.

16. The method of claim 12, wherein propagating the query request generated by the root node in the dynamic network through the other nodes in the dynamic network in the number of request messages comprises:
propagating the query request generated by the root node in the dynamic network through the other nodes in the dynamic network in the number of request messages in a manner that forms a dynamically formed spanning tree rooted at the root node.

17. The dynamic network of claim 7, wherein the reach out node is a node in a set of candidate reach out nodes that has a shortest path to the root node.

18. The method of claim 14, wherein selecting one of the set of candidate reach out nodes as the reach out node to use in reaching out to the root node comprises selecting a node of the candidate reach out nodes that can send responses to the root node the most quickly as the reach out node.

19. The method of claim 12 further comprising:
receiving a request message of the number of request messages at a first node;
making a determination as to whether a record of a stored request message having a same identifier parameter as the request message exists in a request tracking data structure;
making a determination as to whether the first node is going to participate in responding to the request message;
making a copy of the request message to form a duplicate message if a record of a stored request message having the same identifier parameter as the request message exists in the request tracking data structure or if the node is not going to participate in responding to the request message; and
sending the duplicate message to a sender of the received message.

20. The method of claim 19 further comprising:
receiving the duplicate message at a second node;
reducing a tracking parameter in a stored request message corresponding to the duplicate message by one;
reducing a request index for the first node in a tree map in the request tracking data structure managed by the second node by one;
making a copy of the duplicate message to form a new duplicate message;
sending the new duplicate message to a sender of the stored request message corresponding to the duplicate message.

* * * * *